(12) United States Patent
Dion et al.

(10) Patent No.: US 10,196,218 B2
(45) Date of Patent: Feb. 5, 2019

(54) STACKING SYSTEMS FOR STRUCTURAL COMPONENTS

(71) Applicant: ASC Machine Tools, Inc., Spokane Valley, WA (US)

(72) Inventors: Robert David Dion, Spokane Valley, WA (US); David Joshua Pettis, Spokane, WA (US); Andrew Damon Flack, Valleyford, WA (US)

(73) Assignee: ASC Machine Tools, Inc., Spokane Valley, WA (US)

( * ) Notice: Subject to any disclaimer, the term of this patent is extended or adjusted under 35 U.S.C. 154(b) by 0 days.

(21) Appl. No.: 15/273,262

(22) Filed: Sep. 22, 2016

(65) Prior Publication Data

US 2017/0088370 A1    Mar. 30, 2017

Related U.S. Application Data

(60) Provisional application No. 62/232,745, filed on Sep. 25, 2015.

(51) Int. Cl.
    *B65G 57/16*     (2006.01)
    *B65G 57/081*    (2006.01)
    *B65G 57/18*     (2006.01)

(52) U.S. Cl.
    CPC ......... *B65G 57/165* (2013.01); *B65G 57/081* (2013.01); *B65G 57/18* (2013.01)

(58) Field of Classification Search
    CPC ..... B65G 57/18; B65G 57/081; B65G 57/165
    USPC ...................................................... 414/788.2
    See application file for complete search history.

(56) References Cited

U.S. PATENT DOCUMENTS

| | | | | |
|---|---|---|---|---|
| 3,887,066 A | * | 6/1975 | Houtsager | B65G 47/252 198/403 |
| 4,020,941 A | * | 5/1977 | Kennedy | B65G 47/252 198/402 |
| 4,175,655 A | * | 11/1979 | Baldwin | B65G 47/252 198/403 |
| 4,484,675 A | * | 11/1984 | Doherty | B65G 47/252 198/403 |
| 4,829,863 A | * | 5/1989 | Milholen | B65G 57/081 414/791.4 |
| 5,013,212 A | * | 5/1991 | Castellani | B65G 57/081 414/788.2 |
| 5,027,700 A | * | 7/1991 | Tschesche | B65B 27/10 100/14 |
| 5,327,072 A | * | 7/1994 | Savignac | G05F 3/205 323/313 |
| 6,488,465 B1 | * | 12/2002 | Overington | B65G 57/183 414/783 |
| 7,621,712 B2 | * | 11/2009 | Simmons | B65G 57/005 198/370.1 |

(Continued)

OTHER PUBLICATIONS

Competetive Advantages, Form Section Stacker, Aug. 28, 2015, 2 pages.

(Continued)

*Primary Examiner* — Lynn E Schwenning
(74) *Attorney, Agent, or Firm* — Lee & Hayes, PC

(57) ABSTRACT

A stacking system including an inverting arm arranged above the stacking system for selectively overturning a first elongated metal member into a second elongated metal member or not overturning the first elongated metal member into the second elongated metal member.

14 Claims, 45 Drawing Sheets

(56) References Cited

U.S. PATENT DOCUMENTS

| | | | |
|---|---|---|---|
| 7,703,596 B1* | 4/2010 | Grollitsch | B65G 47/252 |
| | | | 193/48 |
| 9,511,887 B2* | 12/2016 | Barone | B65B 27/10 |
| 2009/0263231 A1* | 10/2009 | Ghosh | B65G 57/183 |
| | | | 414/816 |

OTHER PUBLICATIONS

"Stacking System Layout Sidersa stacker", ASC Maheine Tools, Apr. 5, 2010, 2 pages.

* cited by examiner

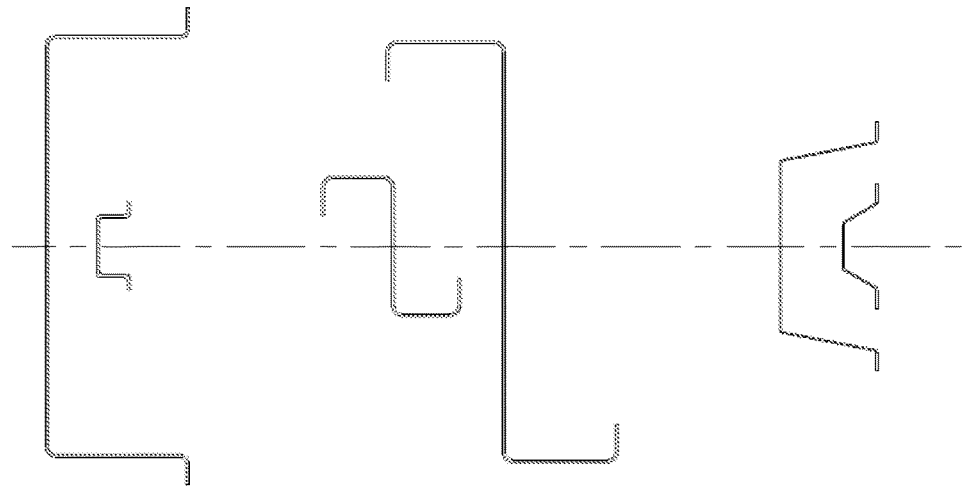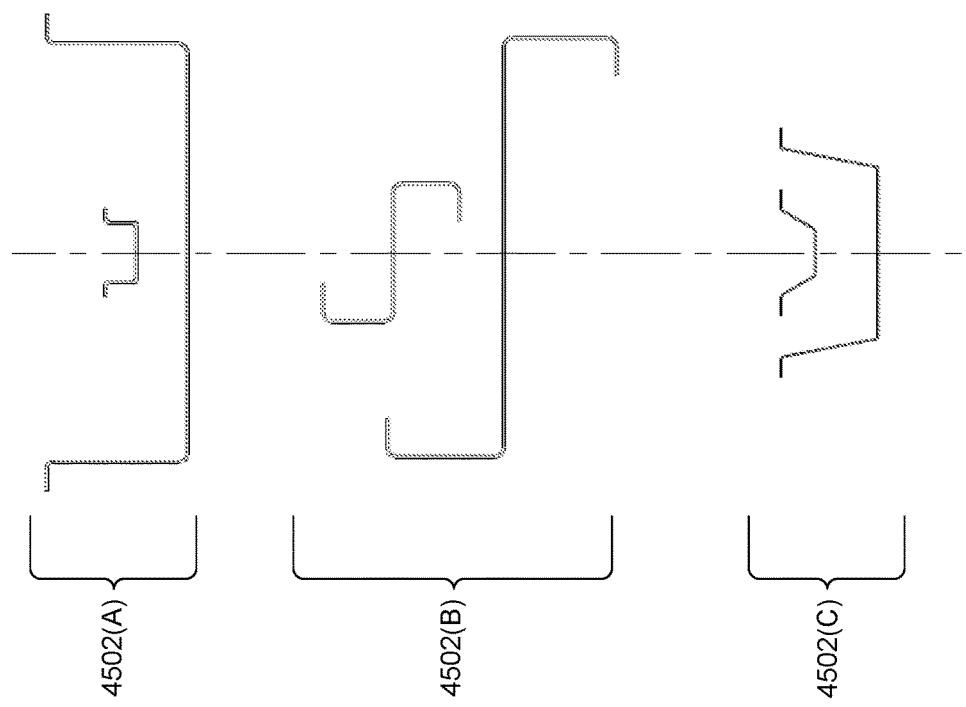
FIG. 45

STACKING SYSTEMS FOR STRUCTURAL COMPONENTS

CROSS REFERENCE TO RELATED APPLICATIONS

This application is based on and claims priority to U.S. Provisional Application No. 62/232,745, filed on Sep. 25, 2015, entitled, "Stacking Systems For Structural Components," the contents of which are herein incorporated by reference.

BACKGROUND

Stacking systems exist for stacking structural components for the metal industry. For example, stacking systems exist that are capable of stacking structural components produced by purlin roll formers. Purlin roll formers cut and form sheet metal strips into purlins of various lengths. Manufactures of these purlin roll forming machines continue to make these purlin roll forming machines more automatic, to operate at higher speeds and to have faster set up times for different parts.

Typical purlin roll forming line forms component parts of a variety of sizes and cross-sectional shapes, and some such parts require orientation in order to nest and stack adjacent parts. Because of the variables involved in stacking and bundling the parts for shipment, such part orientation and stacking has heretofore been largely a manual operation. In practice, purlin roll formers turn out part lengths of between about 2 to 70 feet. A 40-foot part of maximum thickness (typically 10 gage) and size can weigh up to about 400 pounds or more, and such parts can be produced at a rate of 5 per minute, and a smaller part length part, such as a 10 foot purlin, can be produced at 20 per minute with each weighing up to 100 pounds.

Most purlin roll forming lines require 2 to 3 people stacking the parts. In many instances the line will incur frequent shut downs to wait for the stacking area to clear. The extremely heavy parts may be made of steel and may have sharp edges and points, and are hazardous to persons handling these parts. Thus, labor costs, turnover rates and liability for personal injuries can all be high.

Some machinery manufacturers have designed rudimentary stackers for one type of part but are unable to stack the full range of sizes and shapes. Such stackers, being slow, noisy and damaging to painted part surfaces, require extensive operator intervention.

Thus, there remains a need for improved stacking systems for handling and stacking purlin components, and ideally, such stacking systems would be 1) fully automatic, having operator inputs of load sizes and quantities, and capable of 2) stacking all part sizes manufactured on purlin roll formers and of handling parts coming out of a roll former with part orientation of either flanges up or flanges down.

The system would 3) handle part lengths from 2 to 70 feet, and be capable of 4) stacking cee, zee, U, angle, sigma, etc. purlin cross-sections. It would have a 5) compact design of minimum floor space, extending less than the length of the processing line on the operator side of the line; and it would 6) handle bundle sizes up to about 10,000 pounds or more. Preferably, 7) stack bundles would be tight and square for banding, and the system would 8) avoid damaging painted part surfaces. Finally, the system would be 9) economical to purchase and operate, and it would 10) operate quietly, that is, within an acceptable range of noise generation for its factory surrounding.

SUMMARY

This summary is provided to introduce simplified concepts of stacking systems and methods, which are further described below in the Detailed Description. This summary is not intended to identify essential features of the claimed subject matter, nor is it intended for use in determining the scope of the claimed subject matter. Stacking systems according to this disclosure are configured to stack a plurality of elongated metal members (e.g., a metal purlin, a metal beam, a metal stud, a metal rafter, a metal joist, a metal truss, a metal post, etc.). The stacking systems are capable of stacking elongated metal members having different cross-sectional shapes (e.g., cee, zee, U, angle, sigma, etc. cross-sectional shapes) automatically, having very little operator inputs (e.g., load size and quantities).

In one example, a system for stacking a plurality of elongated metal members received from a rollformer includes a stacking system. The stacking system can receive a first elongated metal member of the plurality of elongated metal members and a second elongated metal member of the plurality of elongated metal members from a rollformer. The stacking system may include an inverting arm arranged a distance above the stacking system. The inverting arm can selectively overturn the first elongated metal member into the second elongated metal member or not overturn the first elongated metal member into the second elongated metal member. The stacking system may include a stripper mechanism. The stripper mechanism can selectively hold the first elongated metal member overturned into the second elongated metal member at a desired position, or selectively hold the first elongated metal member not overturned into the second elongated metal member at a desired position, and selectively hold the second elongated metal member at a desired position.

In another example, a system may include a conveyor for receiving a plurality of elongated metal members from a rollformer. The conveyor may displace the plurality of elongated metal members in a first direction. The system may include a stacking system for receiving the plurality of elongated metal members and displacing the plurality of elongated metal members in a second direction substantially perpendicular to the first direction. The system may include at least a portion of an inverting arm arranged a distance above the stacking system. The inverting arm for catching hold of a first elongated metal member of the plurality of elongated metal members being displaced in the second direction and overturning the first elongated metal member into a second elongated metal member of the plurality of elongated metal members arranged adjacent to the first elongated metal member.

In another example, a system may include a stacking system having a loading zone and an unloading zone. The stacking system can displace respective ones of a plurality of elongated metal members in a direction from the loading zone to the unloading zone. The system may include at least a portion of an inverting arm arranged a distance above the stacking system. The inverting arm for catching hold of a first elongated metal member of the plurality of elongated metal members being displaced in the direction and overturning the first elongated metal member into a second elongated metal member of the plurality of elongated metal members arranged adjacent to the first elongated metal member.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity. Furthermore, dimensions illustrated in the drawings are example dimensions and other dimensions are possible.

FIG. 45 depicts additional cross-sections of elongated metal members.

DETAILED DESCRIPTION

Overview

Figure 1:
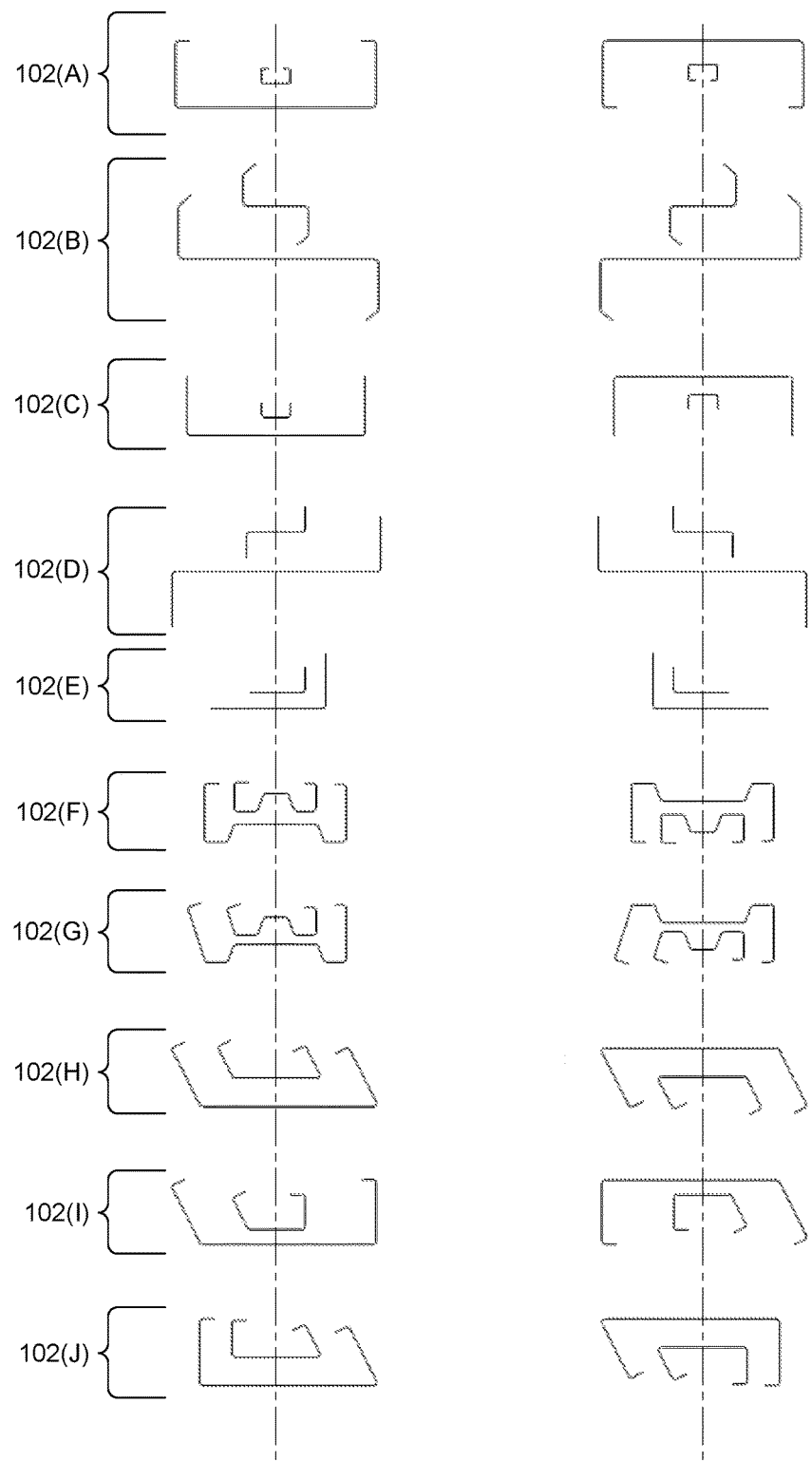
FIG. 1 illustrates cross-sections of elongated metal members.

This disclosure is directed to stacking systems that stack a plurality of elongated metal members (e.g., metal purlins, metal beams, metal studs, metal rafters, metal joists, metal trusses, metal posts, etc.) having different cross-sectional shapes (e.g., cee, zee, U, lipless zee, angle, sigma, sigma eave, double slope eave, single slope eave, etc. cross-sectional shapes) automatically with very little operator inputs. For example, the stacking systems may include at least a portion of an inverting arm arranged a distance above the stacking system and the inverting arm can selectively overturn a first elongated metal member into a second elongated metal member, or the inverting arm can selectively not overturn the first elongated metal member into the second elongated metal member. The inverting arm can selectively catch and hold the first elongated metal member and selectively overturn the first elongated metal member into the second elongated metal member. The stacking system may include a stripper mechanism that can selectively hold the first elongated metal member overturned into the second elongated metal member at a desired position, selectively hold the first elongated metal member not overturned into the second elongated metal member at a desired position, or selectively hold the second elongated metal member at a desired position.

The stacking systems may have a loading zone and an unloading zone. For example, the stacking systems may have a loading zone where respective ones of a plurality of elongated member members can be received and an unloading zone where respective ones of elongated members and/or nested pairs of elongated members are can be discharged from the stacking system. A first elongated metal member overturned into a second elongated metal member may define a nested pair of elongated metal members. The stacking system can displace respective ones of the plurality of elongated metal members in a direction from the loading zone to the unloading zone.

The stacking system may include a nesting conveyor for positioning the first and/or second elongated metal members as the first and/or second elongated metal member are displaced in the direction from the loading zone to the unloading zone. The nesting conveyor can position the second elongated metal member adjacent to the first elongated metal member as the second elongated metal member is displaced in the direction from the loading zone to the unloading zone. The nesting conveyor may include a drive cog that contacts a trailing edge of the first elongated metal member to displace the first elongated metal member in the direction from the loading zone to the unloading zone. The inverting arm arranged above the stacking system can catch hold of a leading edge of the first elongated metal member and pivot the trailing edge of the first elongated metal member on the drive cog as the inverting arm overturns the first elongated metal member into the second elongated metal member.

The inverting arm may include a brake mechanism arranged with the inverting arm to hold the inverting arm in a raised position and selectively prevent the inverting arm from being displaced down toward the stacking system.

The stacking system may include a fork coupled with the stacking conveyor for slideably displacing a nested pair of elongated metal members onto a lift, a crate, a pallet, a cart, etc.

These and other aspects of the stacking system will be discussed below with reference to the figures.

Illustrative Stacking Systems

FIG. 1 illustrates cross-sections 102(A), 102(B), 102(C), 102(D), 102(E), 102(F), 102(G), 102(H), 102(I) and 102(J) of elongated metal members that the stacking system may stack (discussed in detail below). Cross-section 102(A) illustrates a cee cross-section of an elongated metal member, 102(B) illustrates a zee cross-section of an elongated metal member, 102(C) illustrates a "U" cross-section of an elongated metal member, 102(D) illustrates a lipless zee cross-section of an elongated metal member, 102(E) illustrates a angle cross-section of an elongated metal member, 102(F) illustrates a sigma cross-section of an elongated metal member, 102(G) illustrates a sigma eave cross-section of an elongated metal member, 102(H) illustrates a double slope eave cross-section of an elongated metal member, 102(I) illustrates a single slope eave cross-section of an elongated metal member and 102(J) illustrates a single slope eave cross-section of an elongated metal member. Cross-sections 102(A)-102(J) may have a width of at least about 2 inches (5 centimeters) to at most about 21 inches (53 centimeters). In one example, cross-sections 102(A)-102(J) may have a width of at least about 4 inches (10 centimeters) to at most about 14 inches (35 centimeters). In another example, cross-sections 102(A)-102(J) may have a width of at least about 2 inches (5 centimeters) to at most about 5 inches (13 centimeters). While FIG. 1 illustrates cross-sections 102(A)-102(J) other cross-sections are contemplated.

Figure 2:
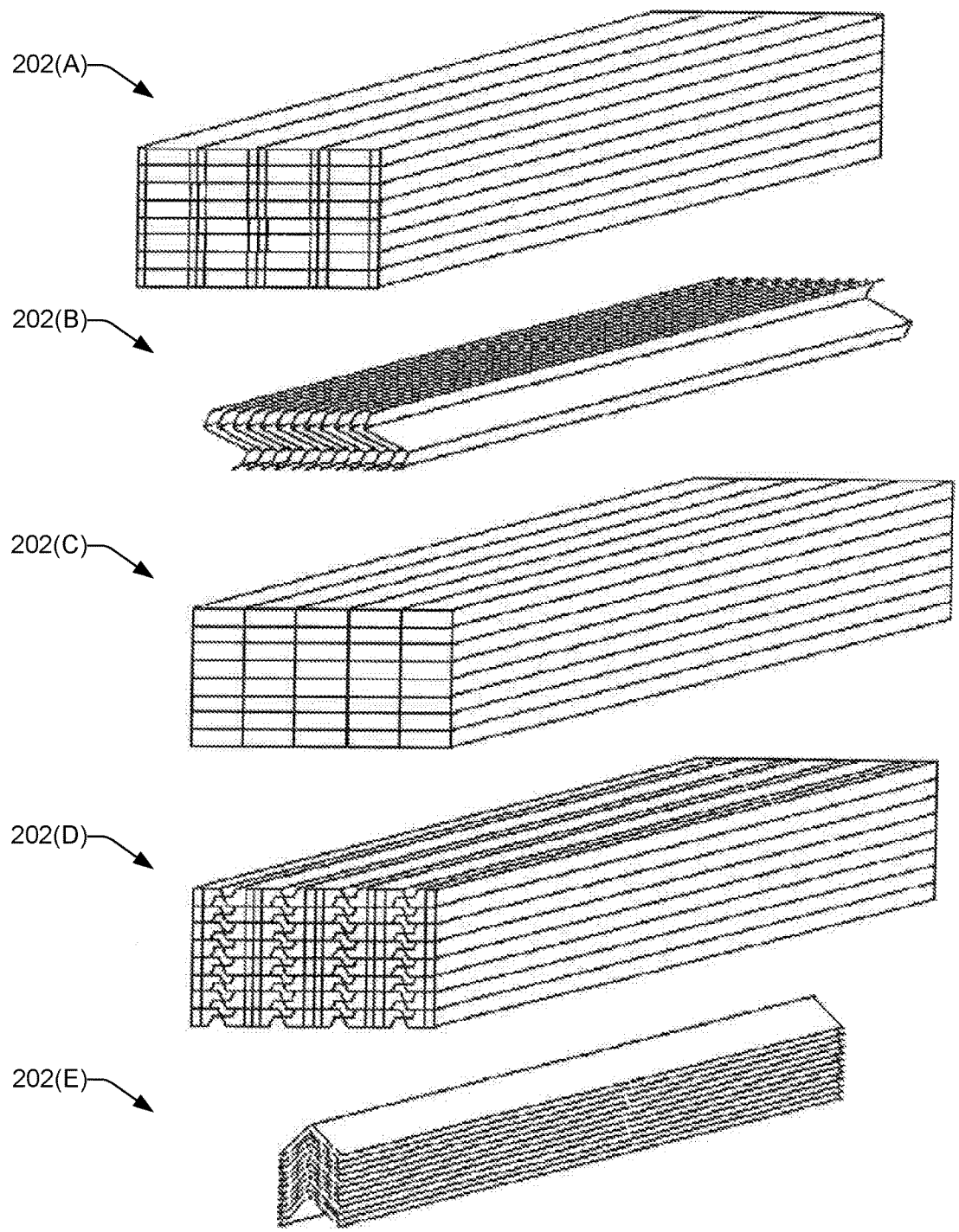
FIG. 2 illustrates typical bundle configurations of the elongated metal members illustrated in FIG. 1.

FIG. 2 illustrates typical bundle configurations of the elongated metal members illustrated in FIG. 1. For example, FIG. 2 illustrates a typical bundle 202(A) of a plurality of elongated metal members having the cee cross-section 102(A), a typical bundle 202(B) of a plurality of elongated metal members having the zee cross-section 102(B), a typical bundle 202(C) of a plurality of elongated metal members having the "U" cross-section 102(C), a typical bundle 202(D) of a plurality of elongated metal members having the sigma cross-section 102(F) and a typical bundle 202(E) of a plurality of elongated metal members having the angle cross-section 102(E).

Figure 3:
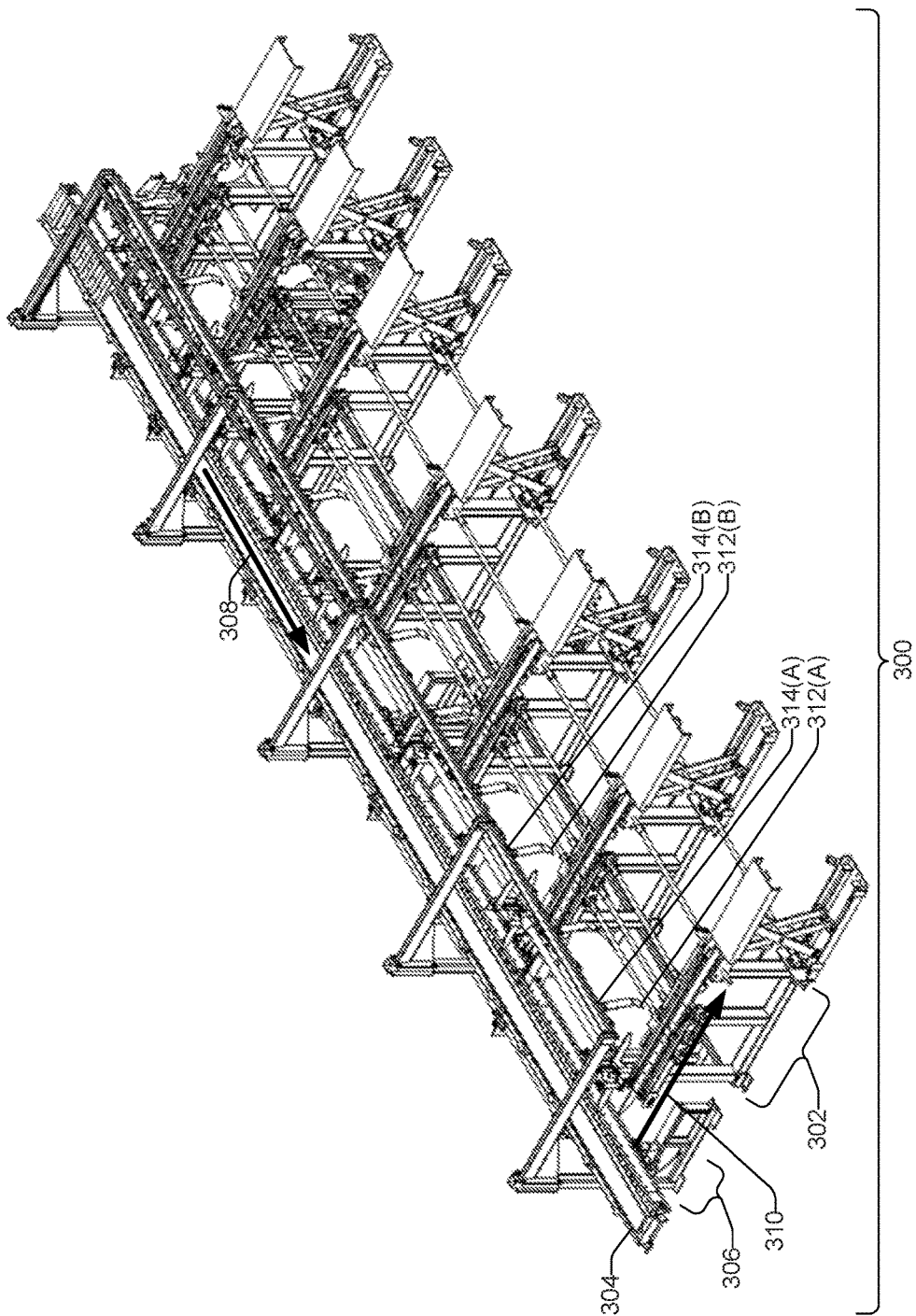
FIG. 3 illustrates a perspective view of an example stacking system arranged to receive pre-cut elongated metal members including a first elongated metal member, with legs down that exited a rollformer (not shown).

FIG. 3 illustrates a perspective view 300 of an example stacking system 302 arranged to receive pre-cut elongated metal members including a first elongated metal member 304, with legs down that exited a rollformer (not shown). While FIG. 3 illustrates the stacking system 302 arranged to receive the first elongated metal member 304 having the cee cross-section 102(A), the stacking system 302 may receive an elongated metal member having any of the cross-sections 102(A)-102(J) described above with respect to FIG. 1. FIG. 3 illustrates a conveyor 306 for receiving the plurality of elongated metal members from the rollformer. The conveyor 306 may displace the plurality of elongated metal members in a first direction 308. For example, the conveyor 306 may displace the first elongated metal member 304 in the first direction 308 along the length of the conveyor 306 as the conveyor 306 receives the first elongated metal member 304 from a rollformer arranged at an end of the conveyor 306. In this way, the conveyor 308 may receive a plurality of elongated metal members from a rollformer. In one example, the conveyor 306 may be a powered entry conveyor. In another example, the conveyor 306 may be a gravity conveyor. The stacking system 302 may receive the elongated metal members in a second direction 310 substantially perpendicular to the first direction 308. The stacking systems 302 may include a first inverting arm 312(A), a first brake mechanism 314(A), a second inverting arm 312(B), and a second brake mechanism 314(B).

Figure 4:
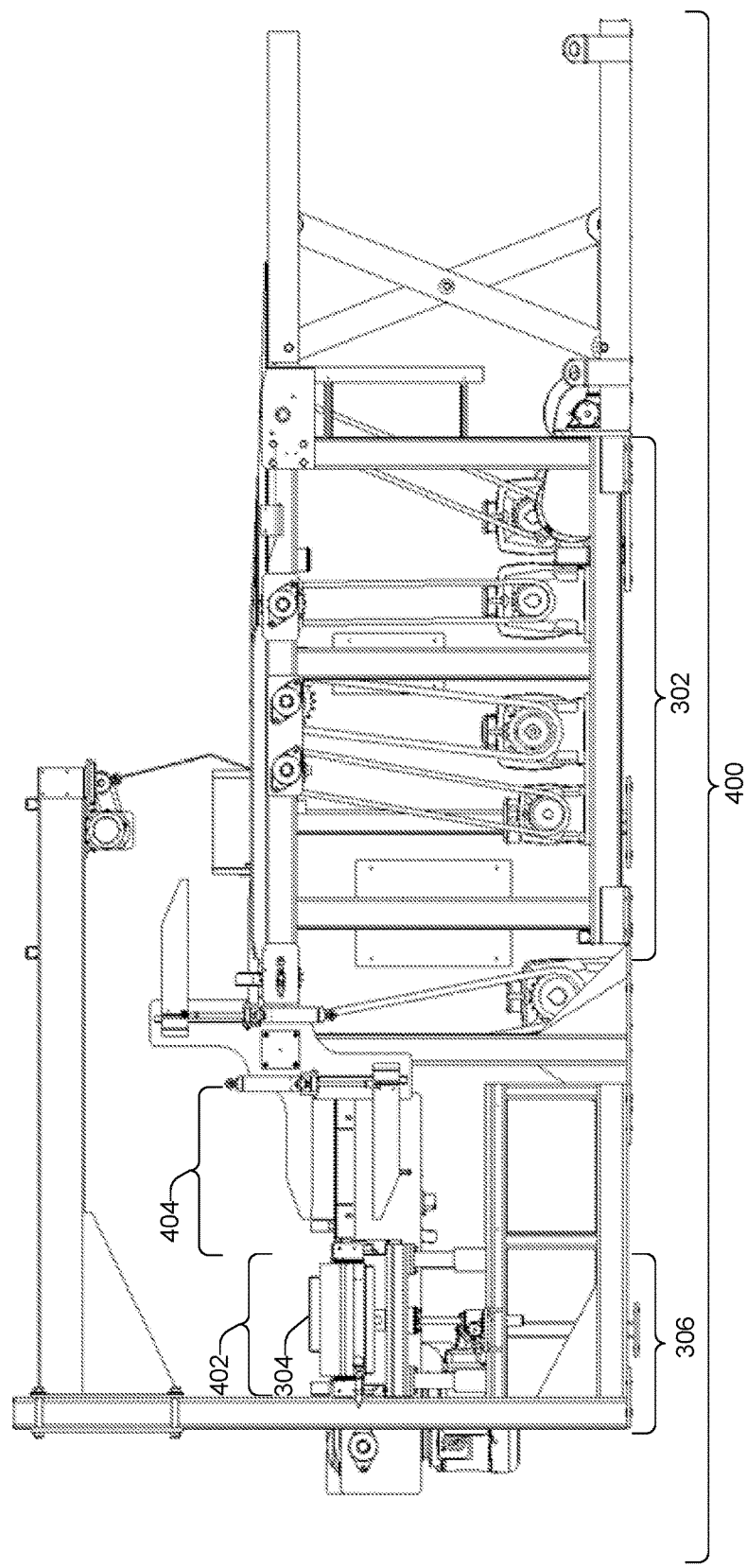
FIG. 4 illustrates a side view of the example stacking system illustrated in FIG. 3 and the first elongated metal member arranged in Zone 1 with legs down.

FIG. 4 illustrates a side view 400 of the example stacking system 302 illustrated in FIG. 3 and the first elongated metal member 304 arranged in a Zone 1 402 with legs down. Once the first elongated metal member 304 is correctly located or positioned on the conveyor 306, side transfer chains (not shown) cycle one zone and move the first elongated metal member 304 from Zone 1 402 to a Zone 2 404 (illustrated in FIG. 5).

Figure 5:
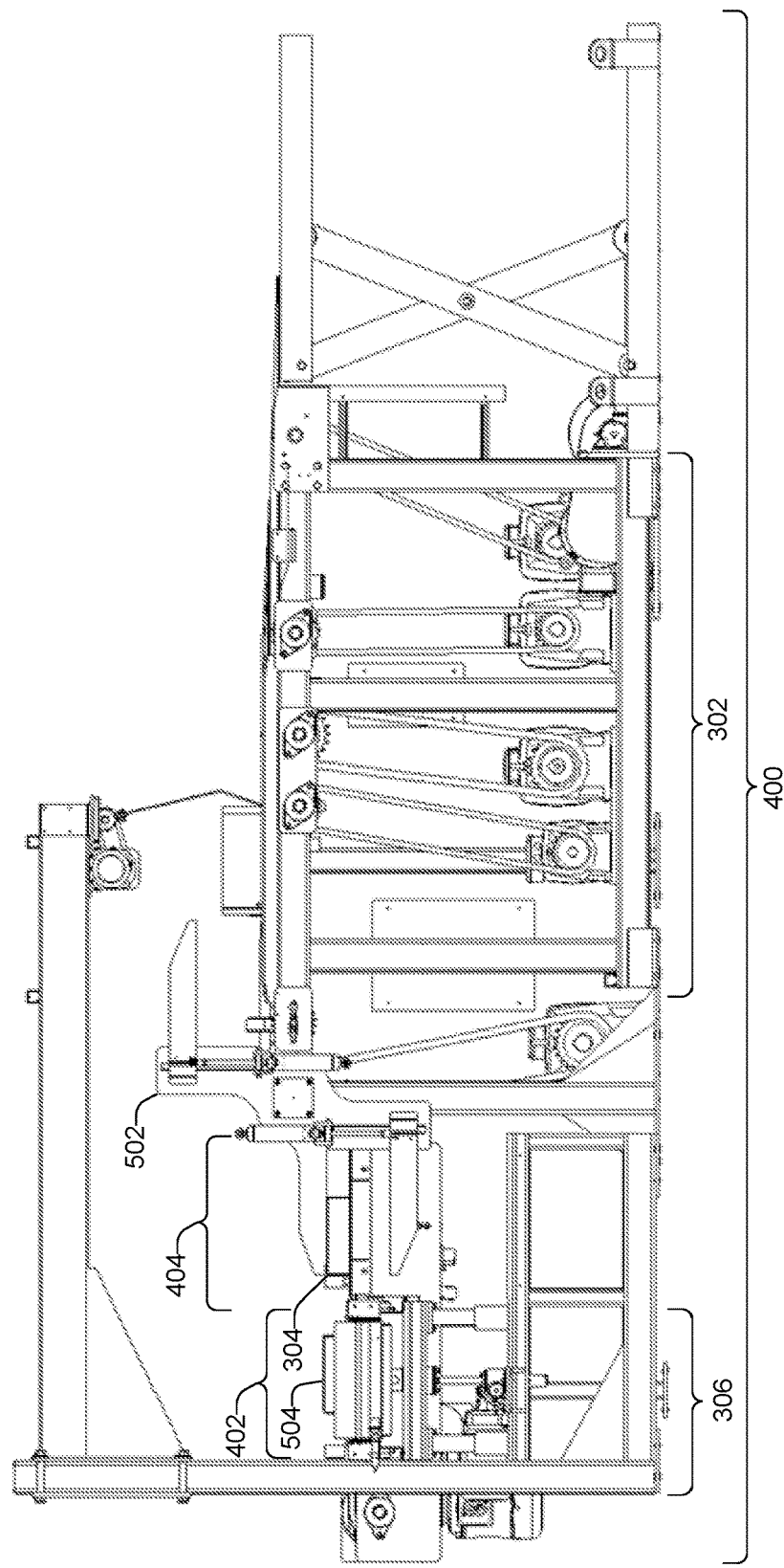
FIG. 5 illustrates the side view of the example stacking system illustrated in FIG. 4 and the first elongated metal member arranged in Zone 2, with legs down, and in an inverting elevator.

FIG. 5 illustrates the side view 400 of the example stacking system 302 illustrated in FIG. 4 and the first elongated metal member 304 arranged in Zone 2 404, with legs down, and in an inverting elevator 502. Once the transfer of the first elongated metal member 304 is complete, a second elongated metal member 504 begins coming onto the conveyor 306 in Zone 1 402.

Figure 6:
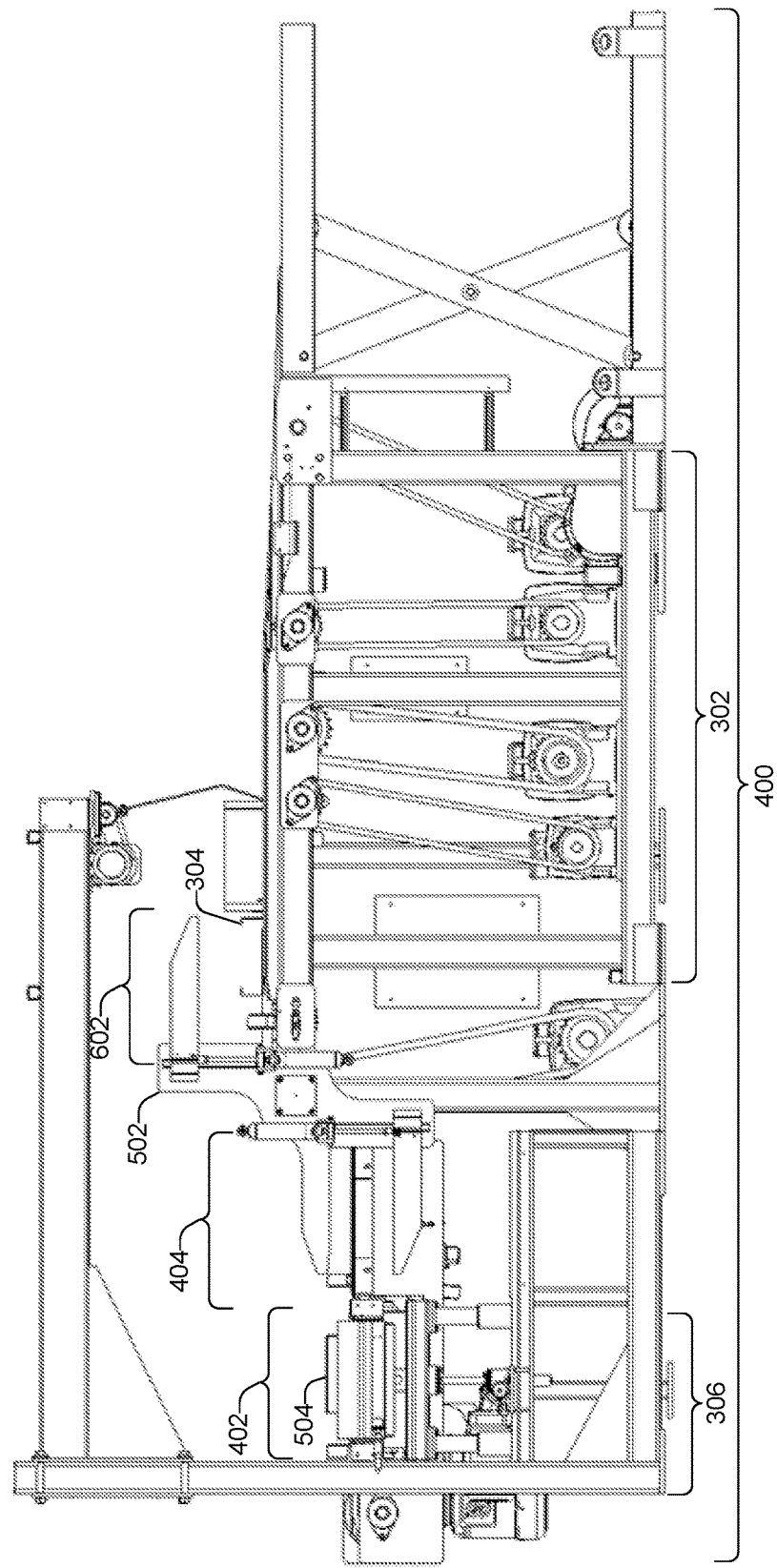
FIG. 6 illustrates the side view of the example stacking system illustrated in FIG. 4 and the inverting elevator cycled 180 degrees and the first elongated metal member arranged in Zone 3 with legs up.

FIG. 6 illustrates the side view 400 of the example stacking system 302 illustrated in FIG. 4 and the inverting elevator 502 cycled 180 degrees and the first elongated metal member 304 arranged in Zone 3 602 with legs up.

Figure 7:
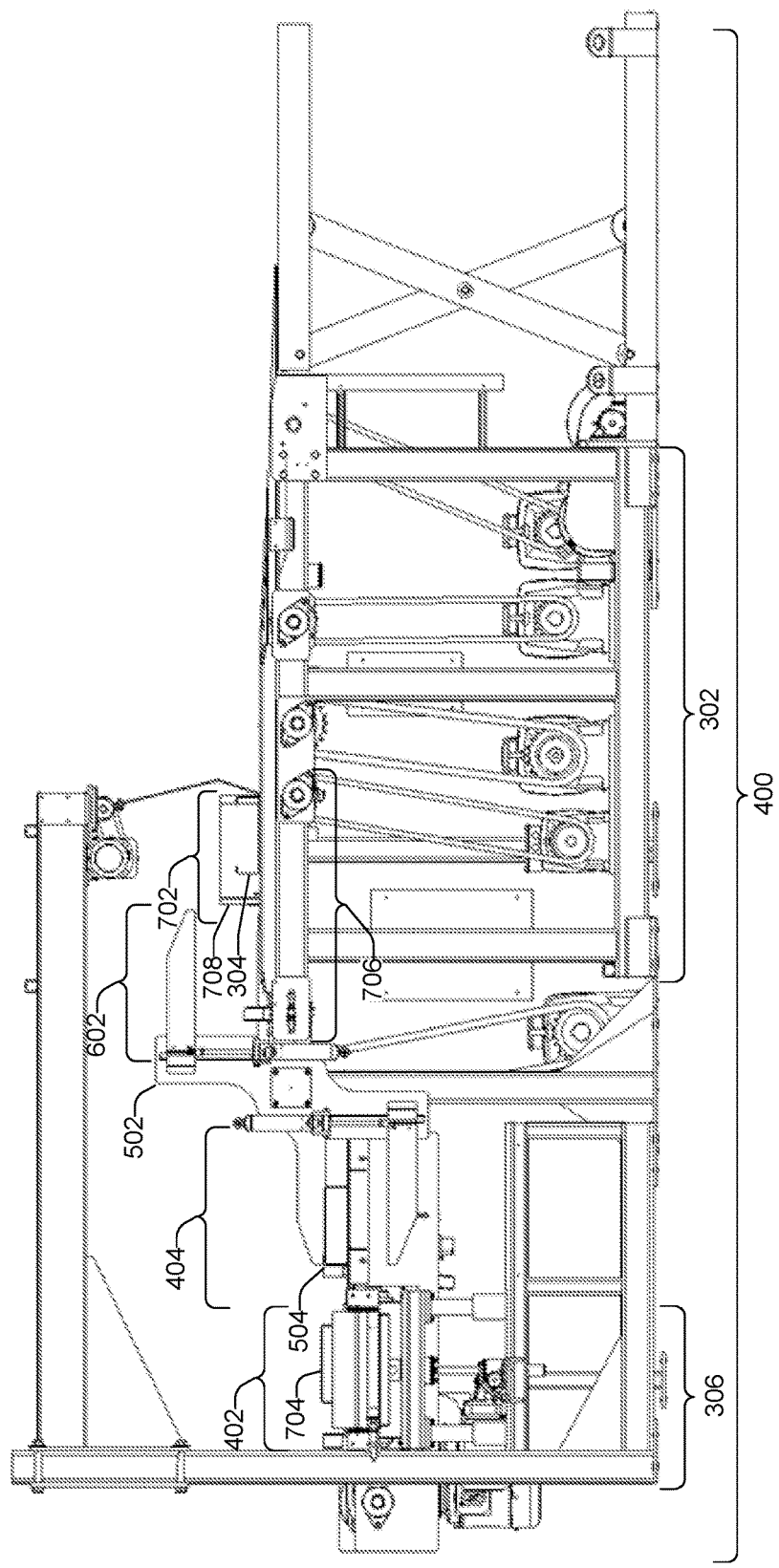
FIG. 7 illustrates the side view of the example stacking conveyor illustrated in FIG. 4 with the first elongated metal member arranged in Zone 4 via a spacing conveyor.

FIG. 7 illustrates the side view 400 of the example stacking system 302 illustrated in FIG. 4 with the first elongated metal member 304 arranged in Zone 4 702 via a nesting conveyor. The second elongated metal member 504 is side transferred to Zone 2 404 and a third elongated metal member 704 begins to come onto the conveyor 306 in Zone 1 402. The first elongated metal member 304 may be transferred from Zone 3 602 to Zone 4 702 via a spacing conveyor 706. During this transfer, the first elongated metal member 304 is end aligned by a fixed end aligner 708.

Figure 8:
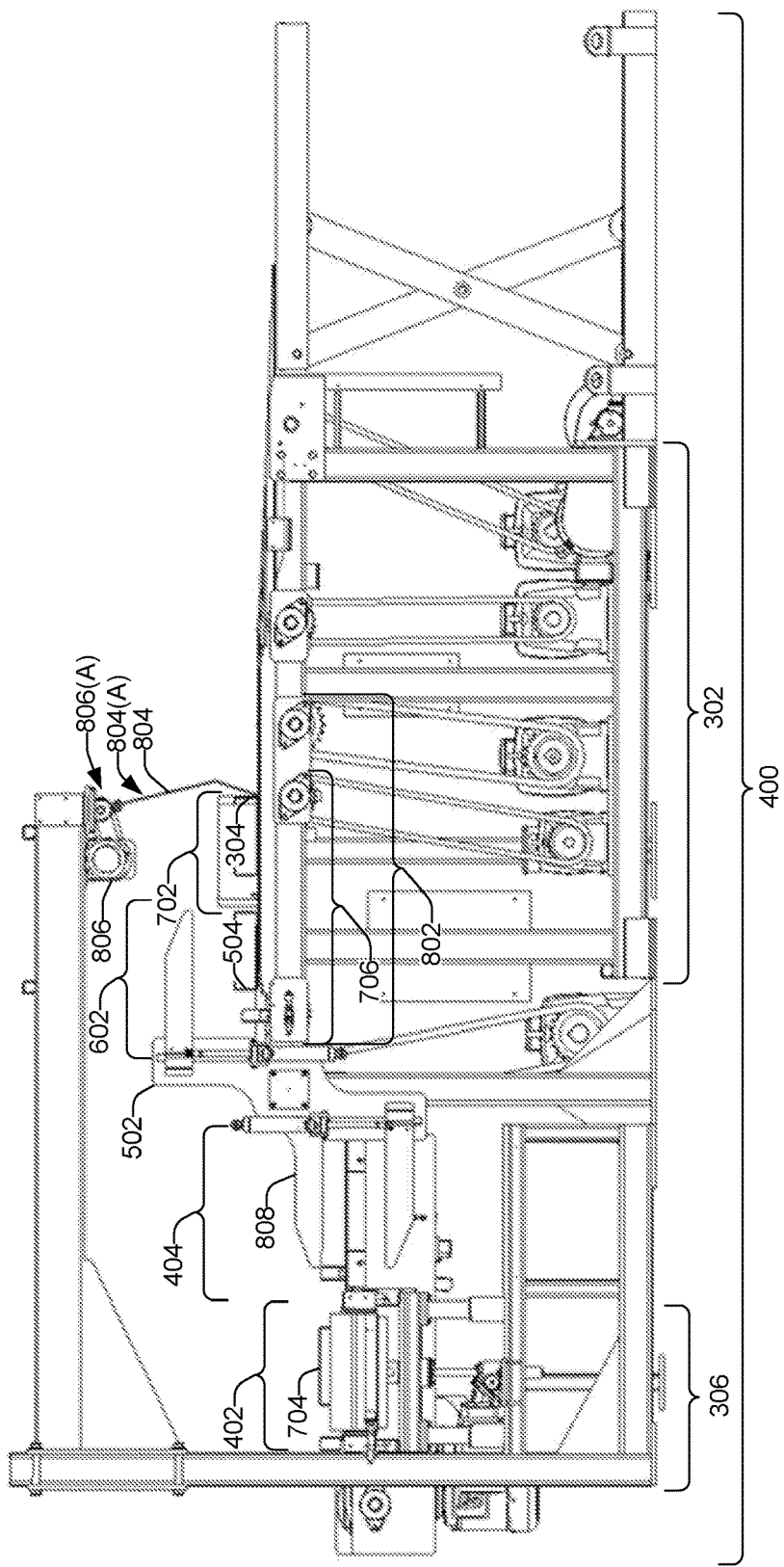
FIG. 8 illustrates the side view of the example stacking conveyor illustrated in FIG. 4 with the inverting elevator cycled 180 degrees with a second elongated metal member arranged in Zone 3 with legs up.

FIG. 8 illustrates the side view 400 of the example stacking system 302 illustrated in FIG. 4 with the inverting elevator 502 cycled 180 degrees with the second elongated metal member 504 arranged in Zone 3 602 with legs up. When overturning the first elongated metal member 304 into the second elongated metal member 504, a side transfer conveyor 802 moves synchronously with the spacing conveyor 706, and an inverting arm 804 overturns the first elongated metal member 304 into the second elongated metal member 504 (described in more detail below with regards to FIGS. 26-33). For example, the side transfer conveyor 802 may position the second elongated metal member 504 a distance from the first elongated metal member 304 and subsequent to the positioning of the second elongated metal member at the distance, the side transfer conveyor 802 displaces the second elongated metal member 504 synchronously with the first elongated metal member 304 being displaced by the spacing conveyor 706. The side transfer conveyor 802 and the spacing conveyor 706 displace the first and second elongated metal members 304 and 504 synchronously as the inverting arm overturns the first elongated metal member 304 into the second elongated metal member 504. The spacing conveyor 706 and the side transfer conveyor 802 may define a nesting conveyor. The distance between the first and second elongated metal members may vary depending on a geometry of the elongated metal members being overturned. In one example the distance may be about 1.5 inches (4 centimeters) from a trailing edge of the first elongated metal member 304 to a leading edge of the second elongated metal member 504. In this example, where the distance is about 1.5 inches (4 centimeters), about 1 inch (2.5 centimeters) of the 1.5 inches (4 centimeters) may be associated with a geometry of the elongated metal members (e.g., a geometry of a leg, a lip, a wall of the elongated metal members) being overturned and about 0.5 inches (1 centimeter) of the 1.5 inches (4 centimeters) may be associated with a geometry of a cog the elongated metal members pivot on as the elongated metal members are overturned. In another example the distance may be at least about 0.5 inches (1 centimeter) from a trailing edge of the first elongated metal member 304 to a leading edge of the second elongated metal member 504 to at most about 6 inches (15 centimeters) from a trailing edge of the first elongated metal member 304 to a leading edge of the second elongated metal member 504.

While FIG. 8 illustrates one inverting arm 804 overturning the first elongated metal member 304 a plurality of inverting arms may overturn the first elongated metal member 304. For example, the stacking system 302 may have about 12 inverting arms 804 arranged to overturn the first elongated metal member 304. FIG. 8 shows a brake mechanism 806 arranged with the inverting arm 804 to hold the inverting arm 804 in a raised position and selectively prevent the inverting arm from being displaced down toward the stacking system 302. For example, the inverting arm 804 may be pushed up away from the stacking system 302 by the first elongated metal member 304 during the overturning of the first elongated metal member 304 into the second elongated metal member 504 and the brake mechanism 804 may selectively hold the inverting arm 804 in the pushed up position. The brake mechanism 806 may selectively hold the inverting arm 804 in the raised position to prevent the inverting arm 804 from interfacing with or dragging and/or marring with the overturned pair of first and second elongated metal members. Moreover, the brake mechanism 806 may also provide for the inverting arm 804 to be raised up into a raised position and selectively held in the raised position for elongated metal member having cross-sectional profiles (e.g., zee cross-sectional profile 102(B)) that are selectively not overturned by the inverting arm 804 during stacking. The brake mechanism 806 may be pneumatically operated, electro/mechanically operated, mechanically operated, etc. In one example, the brake mechanism 806 may be pneumatic cylinder with both the rod end and the blind end pressurized and each inverting arm may be attached to a respective pneumatic cylinder. In another example, the brake mechanism 806 may comprise a common line shaft with each inverting arm connected by way of a one-way bearing. The line shaft may be driven by an electric gearmotor. In another example, the brake mechanism 806 may comprise an overrunning clutch, motor and torque shaft arranged with each inverting arm. In another example, the brake mechanism 806 may comprise a torque shaft with an overrunning clutch and motor. In other examples, the brake mechanism 806 may comprise electric, pneumatic, hydraulic, servo, motors or gearmotors having integrated brakes and/or clutches. In another example, the brake mechanism 806 may comprise external electrical brakes, external pneumatic brakes, or external hydraulic brakes.

The inverting arm 804 may comprises a first inverting arm, and the stacking system 302 may further include at least a second inverting arm 804(A) and a second brake mechanism 806(A) arranged with the second inverting arm to hold the second inverting arm in a raised position and selectively prevent the second inverting arm from being displaced down toward the stacking system 302. Alternatively, the inverting arm 804 may comprise a first inverting arm, and the stacking system 302 may further comprise at least a second inverting arm 804(A), and the brake mechanism 806 may be arranged with the first inverting arm 804 and the second inverting arm 804(A) to hold both the first inverting arm and the second inverting arm in a raised position and selectively prevent the first inverting arm 804 and the second inverting arm 804(A) from being displaced down toward the stacking system 302. FIG. 8 illustrates the inverting elevator 502 may include a jaw 808. The jaw 808 to grip a respective one of the plurality of elongated metal members positioned on the conveyor and rotatably displace and elevate the respective one of the plurality of elongated metal members onto the stacking system.

Figure 9:
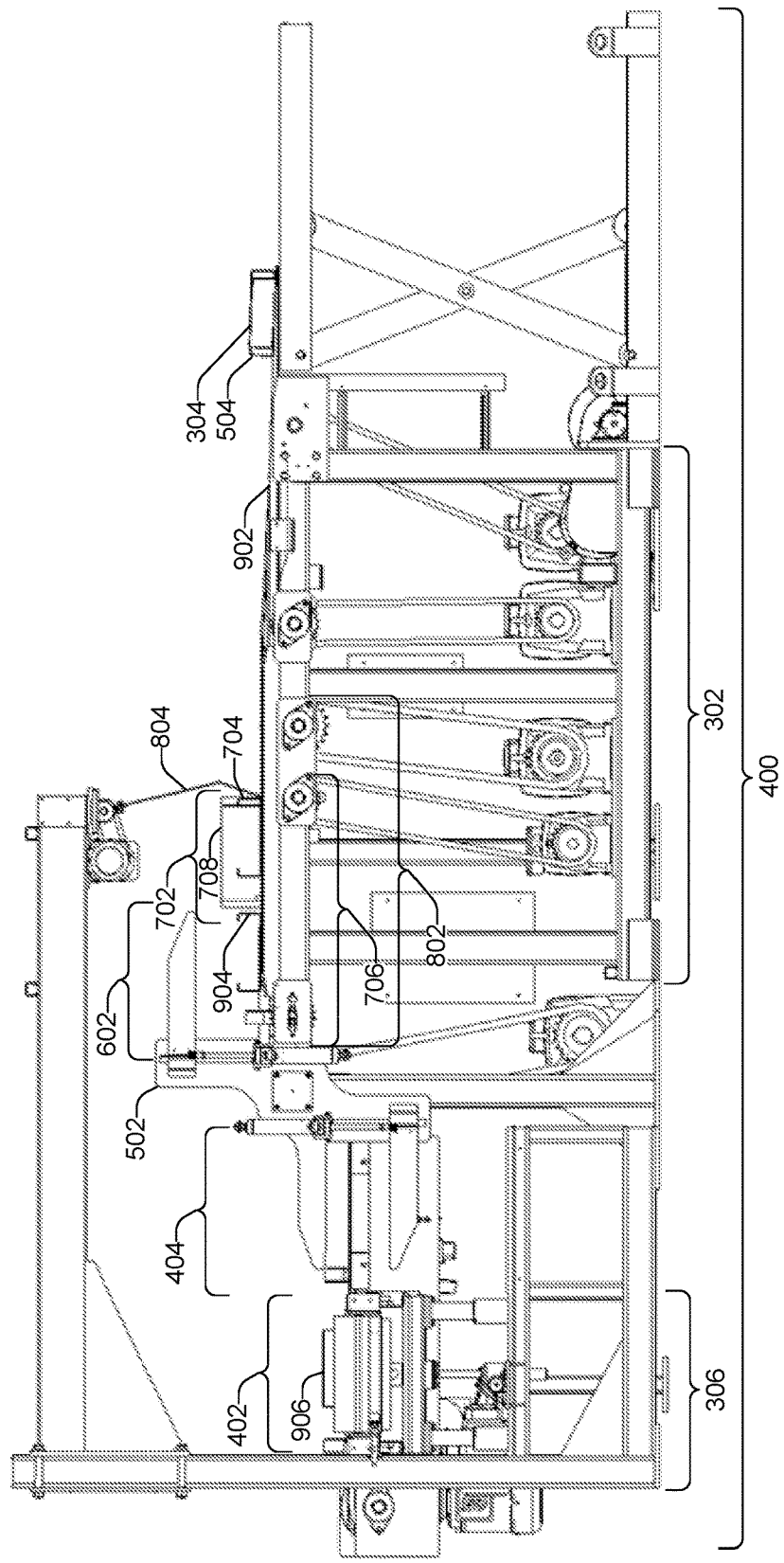
FIG. 9 illustrates the side view of the example stacking system illustrated in FIG. 4 with the first elongated metal member overturned, via an inverting arm, into the second elongated metal member and arranged on a fork.

FIG. 9 illustrates the side view 400 of the example stacking system 302 illustrated in FIG. 4 with the first elongated metal member 304 overturned, via the inverting arm 804, into the second elongated metal member 504 and arranged on a fork 902. The side transfer conveyor 802 discharges the overturned pair of the first elongated metal member 304 overturned in the second elongated metal member 504 onto the fork 902. The fork 902 may be a tier fork and may slideably displace the nested pair of elongated metal members 304 and 504. The fork 902 may be coupled with the stacking system 302 via an under constrained rack and pinion actuator, under constrained hydraulic cylinder, under constrained pneumatic cylinder, an under constrained screw and nut drive, a belt, a chain, a rope, etc.

The third elongated metal member 704 is transferred from Zone 1 402 to Zone 2 404 and a fourth elongated metal member 904 begins coming onto the conveyor 306 in Zone 1 402. The fork 902 indexes out to make room for a next flipped pair of elongated metal members on the fork 902. During this time the third elongated metal member 704 is transferred to Zone 3 602 by the inverting elevator 502, the fourth elongated metal member 904 moves to Zone 2 404, and a fifth elongated metal member 906 begins coming onto the conveyor 306 in Zone 1 402. The third elongated metal member 704 is transferred from Zone 3 602 to Zone 4 702 by the spacing conveyor 706. During this transfer, the third elongated metal member 704 is end aligned by the fixed end aligner 708. The inverter elevator 502 cycles 180 degrees. The fourth elongated metal member 904 is now in Zone 3 602 and in legs up position.

Figure 10:
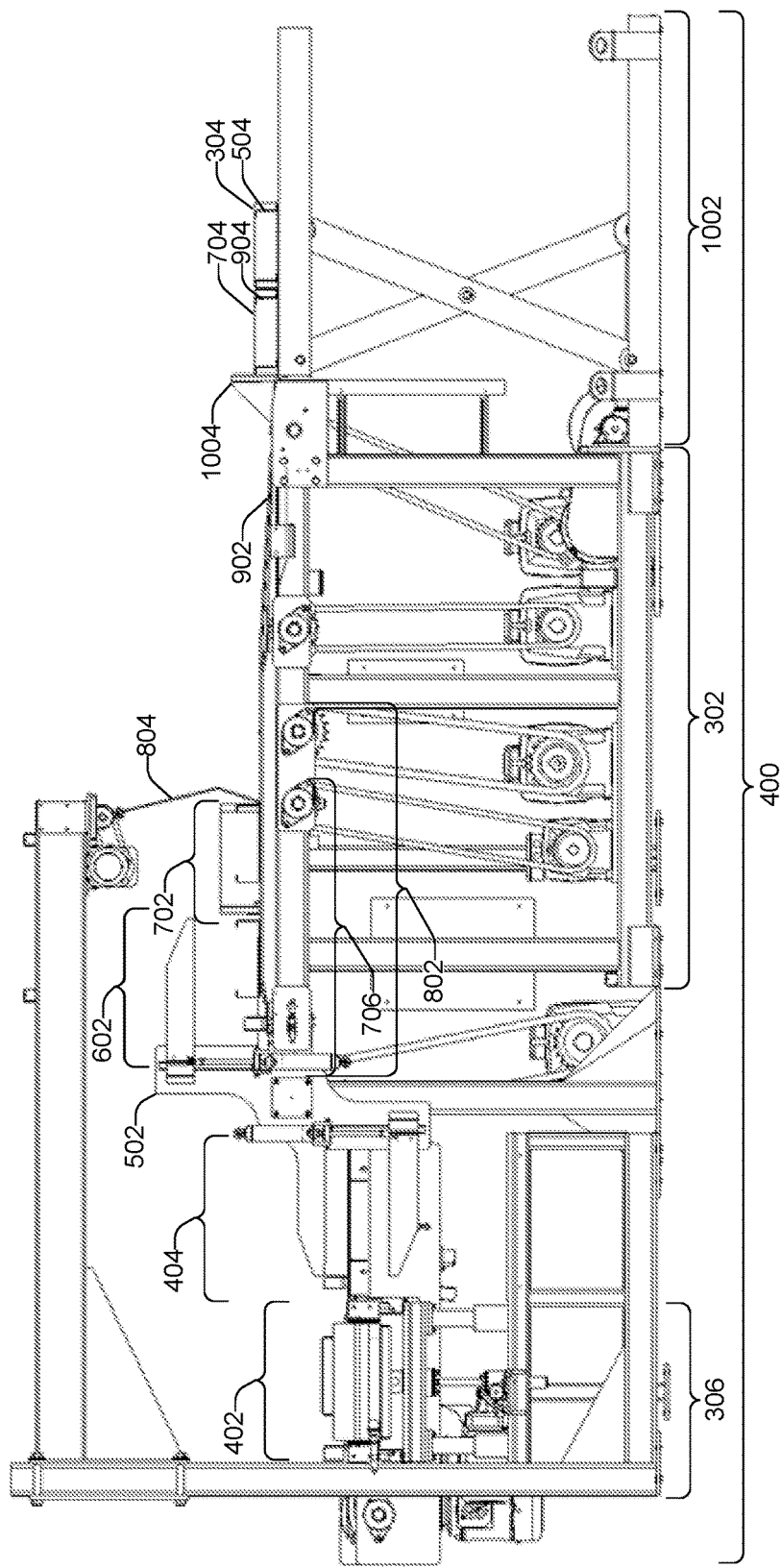
FIG. 10 illustrates the side view of the example stacking system illustrated in FIG. 4 with a third elongated metal member overturned, via the inverting arm, into a fourth elongated metal member and arranged adjacent to the first elongated member overturned into the second elongated member on a lift.

FIG. 10 illustrates the side view 400 of the example stacking system 302 illustrated in FIG. 4 with the third elongated metal member 704 overturned, via the inverting arm 804, into the fourth elongated metal member 904 and arranged adjacent to the first elongated metal member 304 overturned into the second elongated member 504 on a lift 1002. The side transfer conveyor 802 moves synchronously with the spacing conveyor 706, and the inverting arm 804 overturns the third elongated metal member 704 into the fourth elongated metal member 904. Side transfer conveyor 802 discharges overturned pair of the third and fourth elongated metal members 704 and 904 onto the fork 902. A stripper mechanism 1004 may selectively hold the nested pair of elongated metal members at a predefined position. While FIG. 10 illustrates the stripper mechanism 1004 may comprise a post extending up to strip the completed tier onto the lift 1002 the stripper mechanism 1004 may comprise a pushing member that extends to strip the completed tier onto the lift 1002. For example, the pushing member may be a bar slideably received in a tube having a cam that can selectively hold nested pairs of elongated metal members at a predefined position. In this example, where the pushing member comprises a bar slideably received in a tube having a cam, the bar may be coupled to an actuator comprising a rack and pinion actuator, a hydraulic cylinder, a pneumatic cylinder, a screw and nut drive, a belt, a chain, a rope, etc. Further, in the example where the stripper mechanism 1004 comprises a bar slideably received in a tube having a cam, the stripper mechanism 1004 may nest elongated metal members having a cross-sectional shape that does not get overturned by the inverting arm 804. For example, the stripper mechanism 1004 may selectively hold a first elongated metal member having the zee cross-sectional shape 102(B) at a predefined position to nest the first elongated metal member having the zee cross-sectional shape 102(B) into a second elongated metal member having the zee cross-sectional shape 102(B).

The machine operations for pre-cut elongated metal members having cross-section 102(A) or 102(B) or other cross-section with legs up may be similar to the machine operations described above for the pre-cut elongated metal members with legs down. For example, with elongated metal members having legs up, the inverting elevator 502 may be removed or replaced with an intermediate transfer conveyor. The intermediate transfer conveyor may allow for the conveyor 306 to change elevation for elongated metal members having the zee cross-section 102(B), and/or gain elevation for the rest of the stacker assembly.

Figure 11:
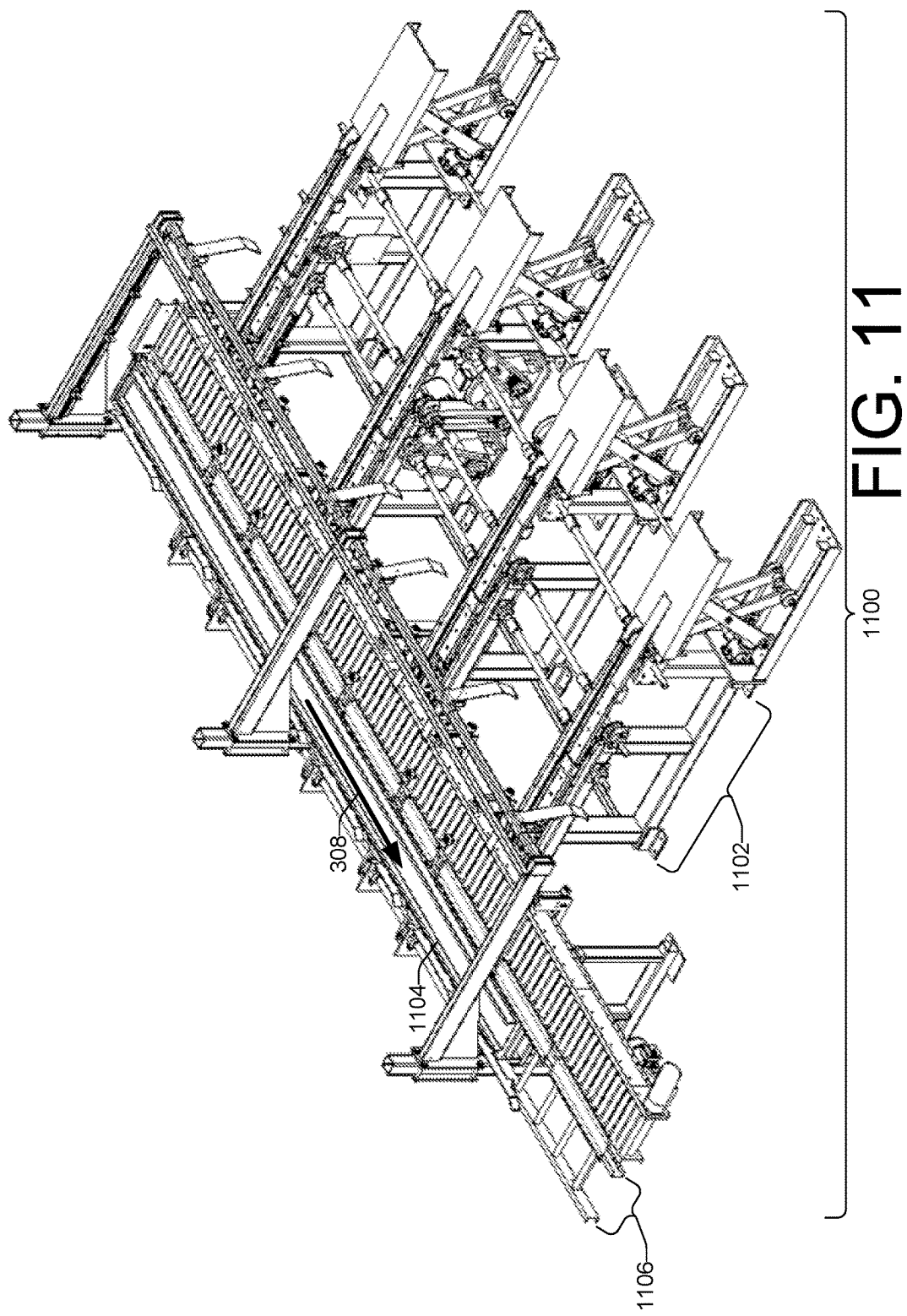
FIG. 11 illustrates a perspective view of an example stacking system arranged to receive post-cut elongated metal members including a first elongated metal member, with legs up that exited a rollformer (not shown) and cutoff by a flying post-cut shear (not shown).

FIG. 11 illustrates a perspective view 1100 of an example stacking system 1102 arranged to receive post-cut elongated metal members including a first elongated metal member 1104, with legs up that exited a rollformer (not shown) and cutoff by a flying post-cut shear (not shown). While FIG. 11 illustrates the stacking system 1102 arranged to receive the first elongated metal member 1104 having the cee cross-section 102(A), the stacking system 1104 may receive an elongated metal member having any of the cross-sections 102(A)-102(J) described above with respect to FIG. 1. FIG. 11 illustrates a conveyor 1106 for receiving the plurality of elongated metal members from the rollformer. The conveyor 1106 may displace the plurality of elongated metal members in a first direction 308. For example, the conveyor 306 may displace the first elongated metal member 304 in the first direction 308 along the length of the conveyor 1106 as the conveyor 1106 receives the first elongated metal member 1104 from a rollformer arranged at an end of the conveyor 1106. In this way, the conveyor 1106 may receive a plurality of elongated metal members 1104 from a rollformer. In one example, the conveyor 1106 may be a powered entry conveyor. In another example, the conveyor 1106 may be a gravity conveyor.

Figure 12:
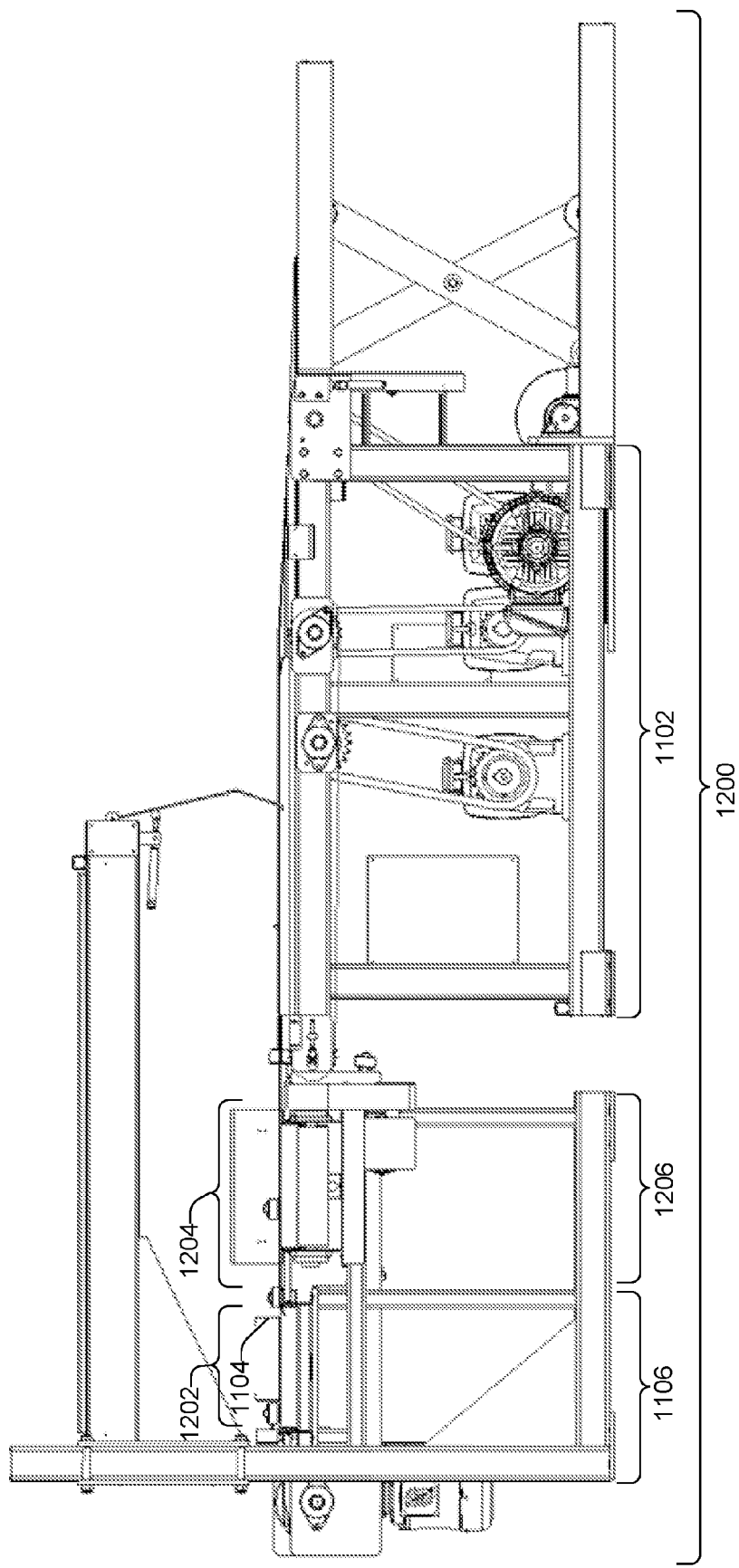
FIG. 12 illustrates a side view of the example stacking system illustrated in FIG. 11 including the first elongated metal member arranged in Zone 1 with legs up.

FIG. 12 illustrates a side view 1200 of the example stacking system 1102 illustrated in FIG. 11 including the first elongated metal member 1104 arranged in Zone 1 1202 with legs up. Once the first elongated metal member 1104 is fully on the conveyor 1106, side transfer chains (not shown) cycle one zone and move the first elongated metal member 1104 from Zone 1 1202 to Zone 2 1204 (illustrated in FIG. 5) onto an aligning conveyor 1206.

Figure 13:
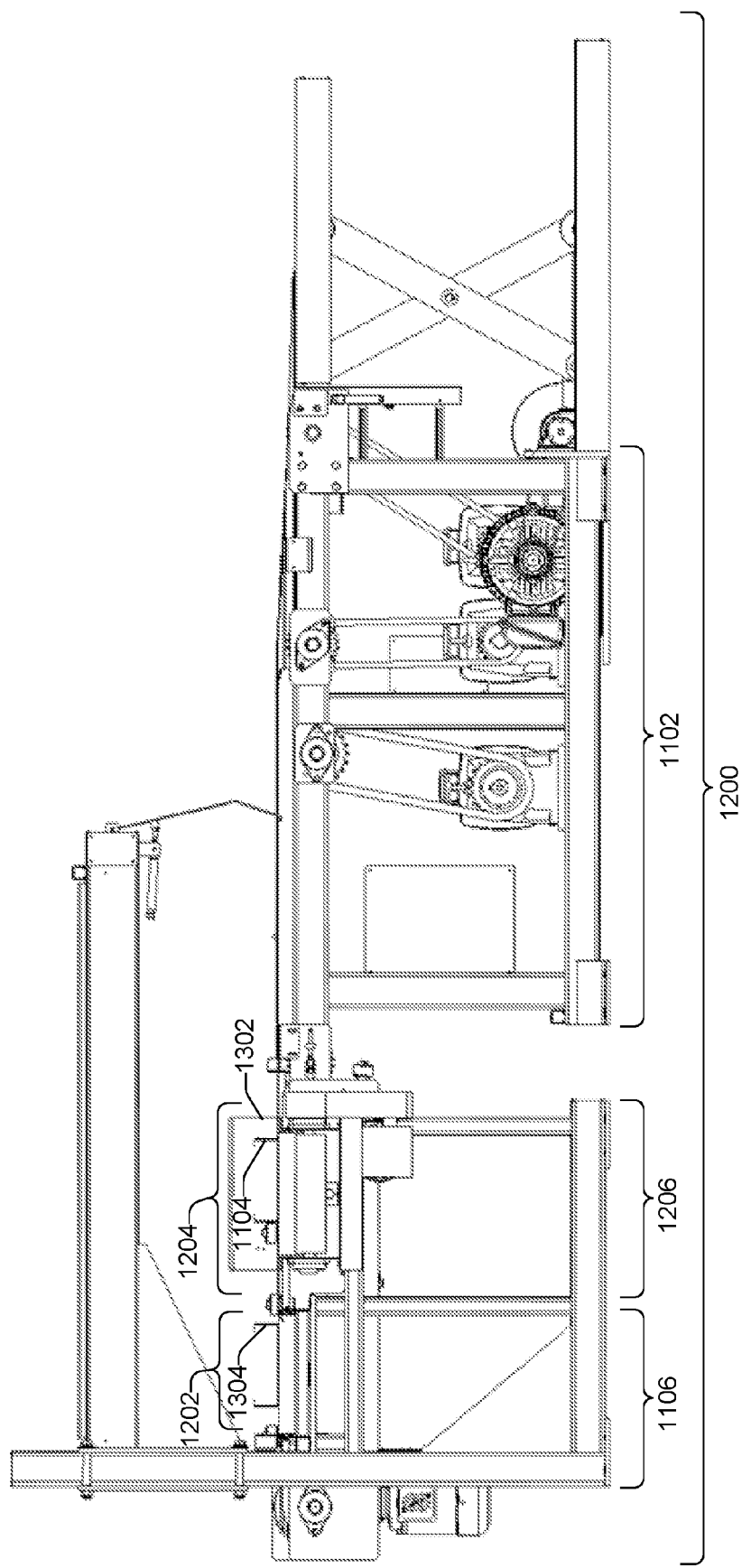
FIG. 13 illustrates the side view of the example stacking system illustrated in FIG. 12 with the first elongated metal member arranged in Zone 2, with legs up, and on an aligning conveyor.

FIG. 13 illustrates the side view 1200 of the example stacking system 1102 illustrated in FIG. 12 with the first elongated metal member 1104 arranged in Zone 2 1204, with legs up, and on the aligning conveyor 1206. Aligning conveyor 1206 justifies the first elongated metal member against a backstop 1302 while a second elongated metal member 1304 is coming onto the conveyor 1106. Once the second elongated metal member 1304 is fully on the conveyor 1106, the side transfer chains cycle one zone and move the second elongated metal member from Zone 1 1202 to Zone 2 1204 and onto the aligning conveyor 1206. While FIG. 13 illustrates the aligning conveyor 1206 may tail justify the elongated metal members, the aligning conveyor 1206 may head justify the elongated metal members.

Figure 14:
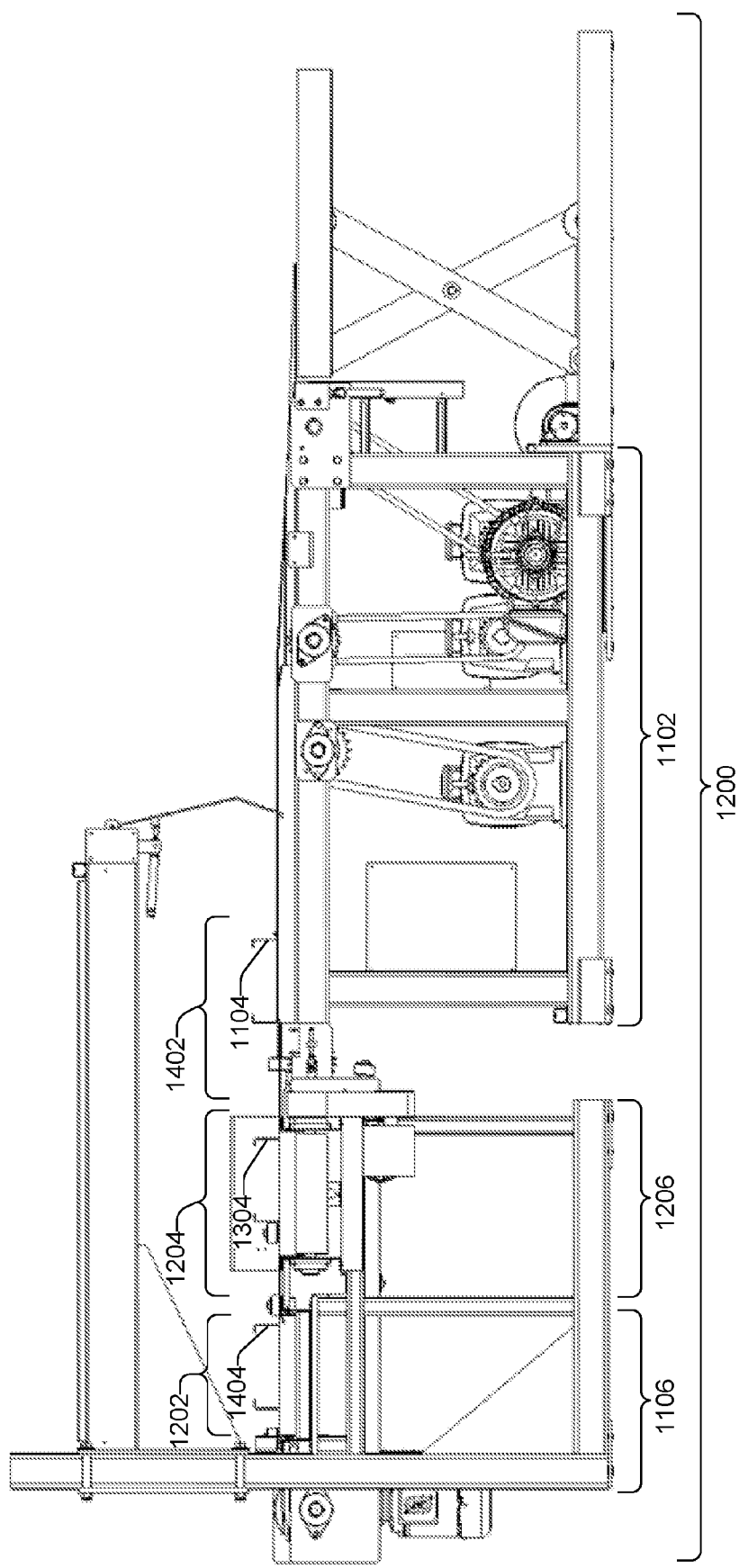
FIG. 14 illustrates the side view of the example stacking system illustrated in FIG. 12 with the first elongated metal member arranged in Zone 3 with legs up.

FIG. 14 illustrates the side view 1200 of the example stacking system 1102 illustrated in FIG. 12 with the first elongated metal member 1104 arranged in Zone 3 1402 with legs up. The transfer of the second elongated metal member 1304 to Zone 2 1204 simultaneously moves the first elongated metal member 1104 from Zone 2 1204 to Zone 3 1402. Aligning conveyor 1206 justifies the second elongated metal member 1304 against the backstop while a third elongated metal member 1404 comes onto the conveyor 1106.

Figure 15:
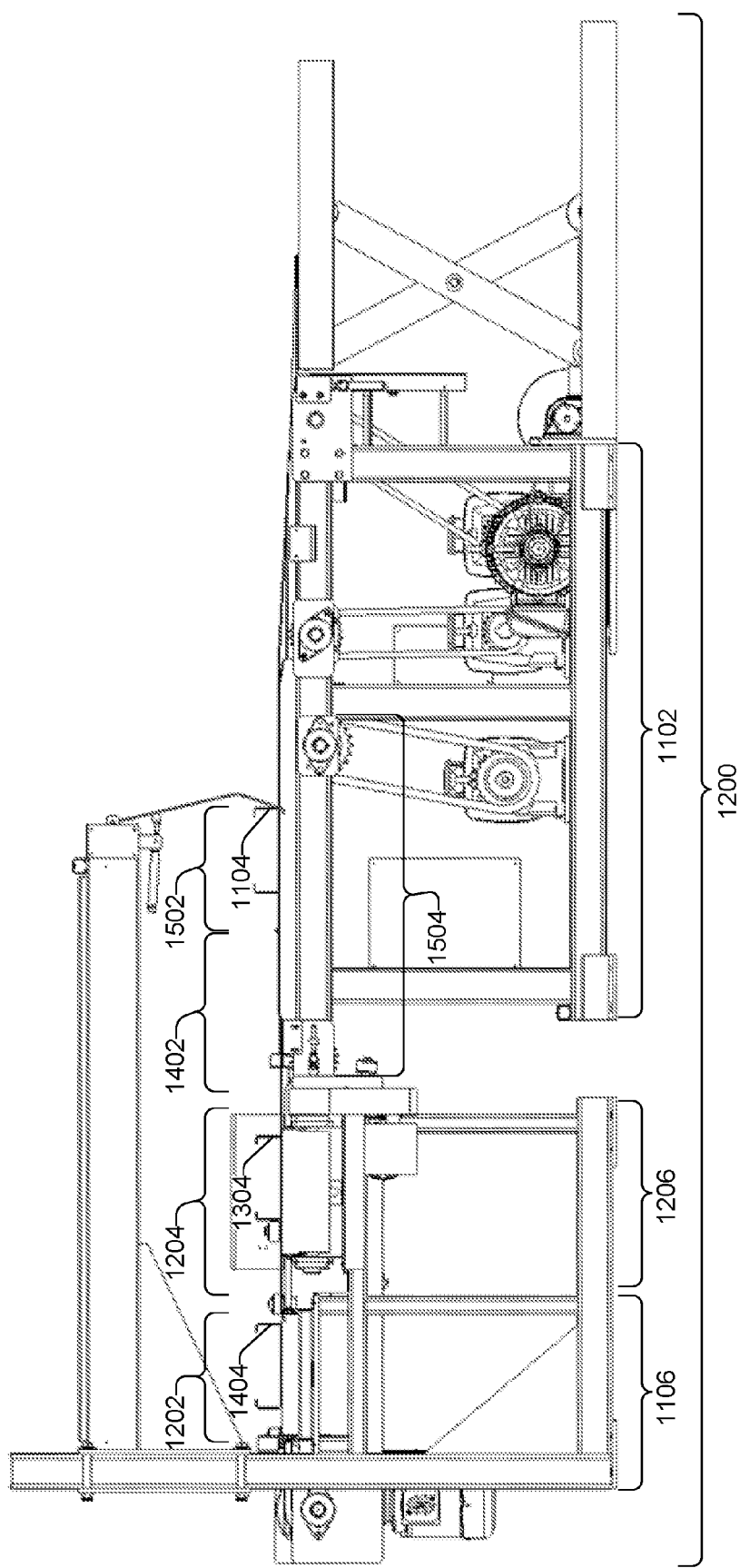
FIG. 15 illustrates the side view of the example stacking system illustrated in FIG. 12 with the first elongated metal member arranged in Zone 4 via a spacing conveyor.

FIG. 15 illustrates the side view 1200 of the example stacking system 1102 illustrated in FIG. 12 with the first elongated metal member 1104 arranged in Zone 4 1502 via a spacing conveyor 1504.

Figure 16:
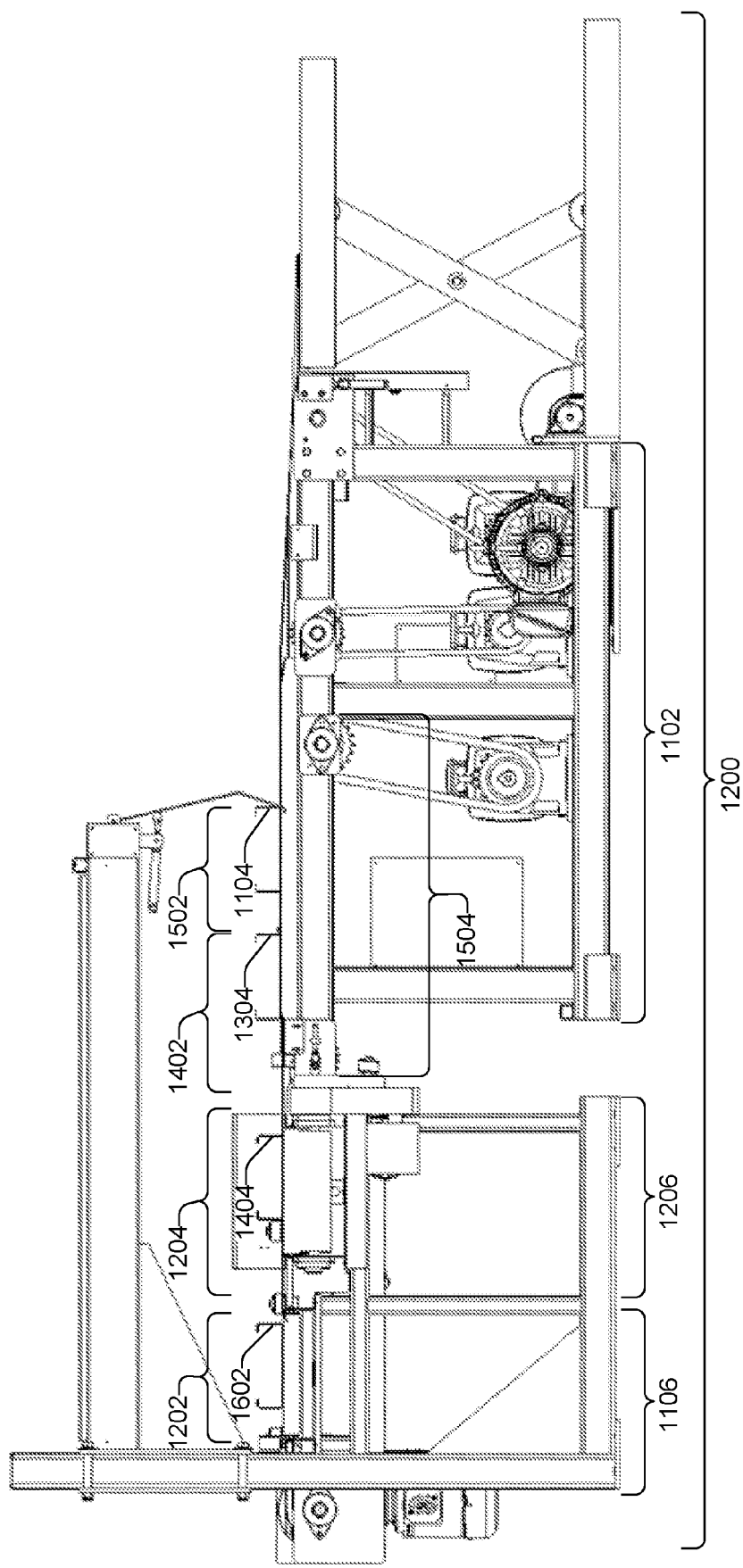
FIG. 16 illustrates the side view of the example stacking system illustrated in FIG. 12 and a second elongated metal member arranged in Zone 3 with legs up.

FIG. 16 illustrates the side view 1200 of the example stacking system 1102 illustrated in FIG. 12 and the second elongated metal member 1304 arranged in Zone 3 1402 with legs up. Once the third elongated metal member 1404 is fully on the conveyor, the side transfer chains cycle one zone and move the third elongated metal member 1404 from Zone 1 1202 to Zone 2 1204. Moving the third elongated metal member 1404 from Zone 1 1202 to Zone 2 1204 moves the second elongated metal member 1304 from Zone 2 1204 to Zone 3 1402. A fourth elongated metal member 1602 is received by the conveyor 1106 in Zone 1 1202.

Figure 17:
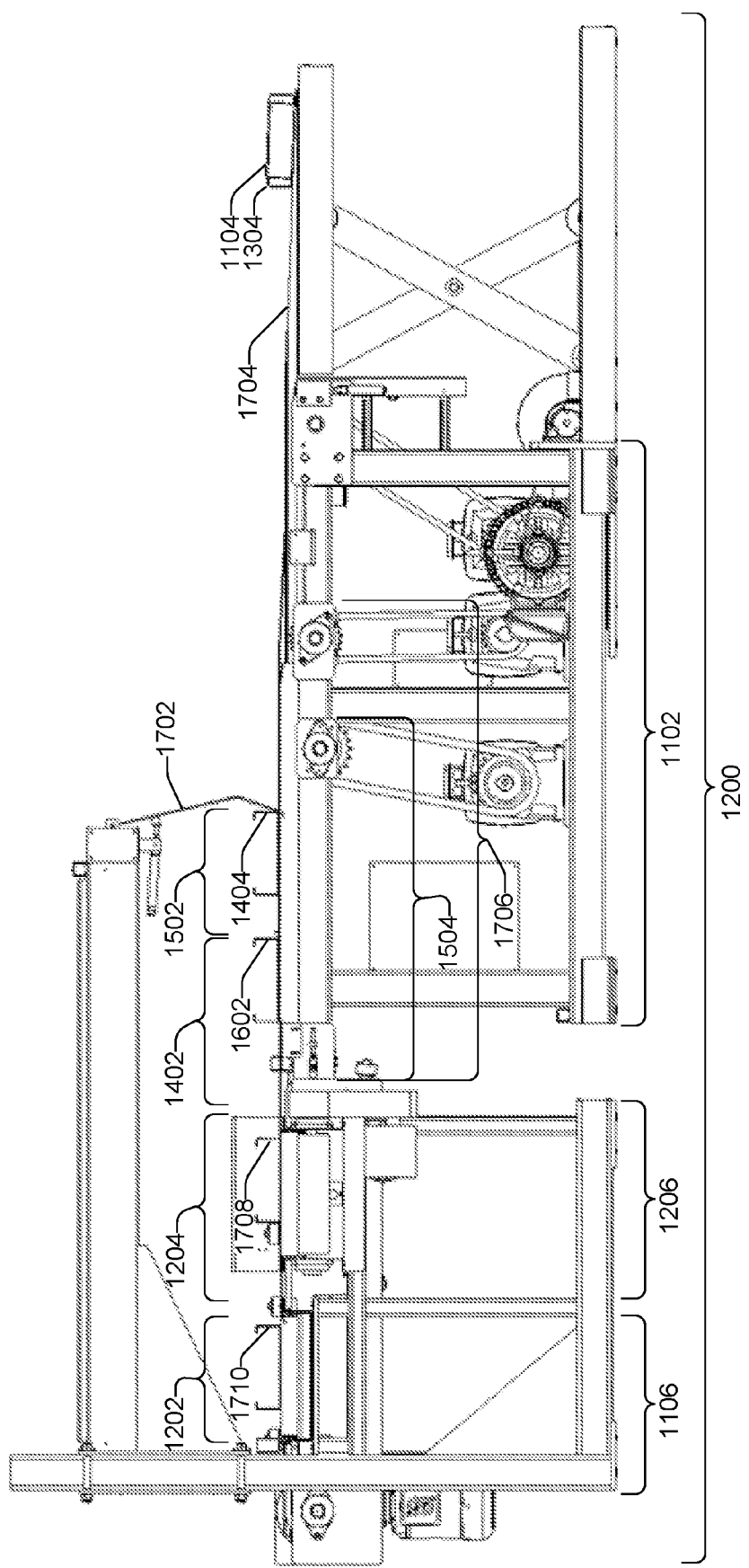
FIG. 17 illustrates the side view of the example stacking system illustrated in FIG. 12 with the first elongated metal member overturned, via an inverting arm, into the second elongated metal member and arranged on a fork.

FIG. 17 illustrates the side view 1200 of the example stacking system 1102 illustrated in FIG. 12 with the first elongated metal member 1104 overturned, via an inverting arm 1702, into the second elongated metal member 1304 and arranged on a fork 1704. When overturning the first elongated metal member 1104 into the second elongated metal member 1304, a side transfer conveyor 1706 moves synchronously with the spacing conveyor 1504, and the inverting arm 1702 overturns the first elongated metal member 1104 into the second elongated metal member 1304 (described in more detail below with regards to FIGS. 26-33). For example, the side transfer conveyor 1706 may position the second elongated metal member 1304 a distance from the first elongated metal member 1104 and subsequent the positioning of the second elongated metal member at the distance, the side transfer conveyor 1706 displaces the second elongated metal member 1304 synchronously with the first elongated metal member 1104 being displaced by the spacing conveyor 1504. The side transfer conveyor 1706 and the spacing conveyor 1504 displace the first and second elongated metal members 1104 and 1304 synchronously as the inverting arm overturns the first elongated metal member 1104 into the second elongated metal member 1304. The spacing conveyor 1504 and the side transfer conveyor 1706 may define a nesting conveyor. The distance between the first and second elongated metal members may vary depending on a geometry of the elongated metal members being overturned. In one example the distance may be about 1.5 inches (4 centimeters) from a trailing edge of the first elongated metal member 1104 to a leading edge of the second elongated metal member 1304. In another example the distance may be at least about 0.5 inches (1 centimeter) from a trailing edge of the first elongated metal member 1104 to a leading edge of the second elongated metal member 1304 to at most about 6 inches (15 centimeters) from a trailing edge of the first elongated metal member 1104 to a leading edge of the second elongated metal member 1304. The side transferring conveyor 1706 discharges the flipped pair of the first and second elongated metal members 1104 and 1304 onto the fork 1704. The fork 1704 extends out to make room for the next flipped pair on the fork 1704. During this time the third elongated metal member 1404 is transferred to Zone 4 1502, the fourth elongated metal member 1602 is transferred to Zone 3 1402, a fifth elongated metal member 1708 is transferred to Zone 2 1204, and a sixth elongated metal member 1710 is received by conveyor 1106 in Zone 1 1202.

Figure 18:
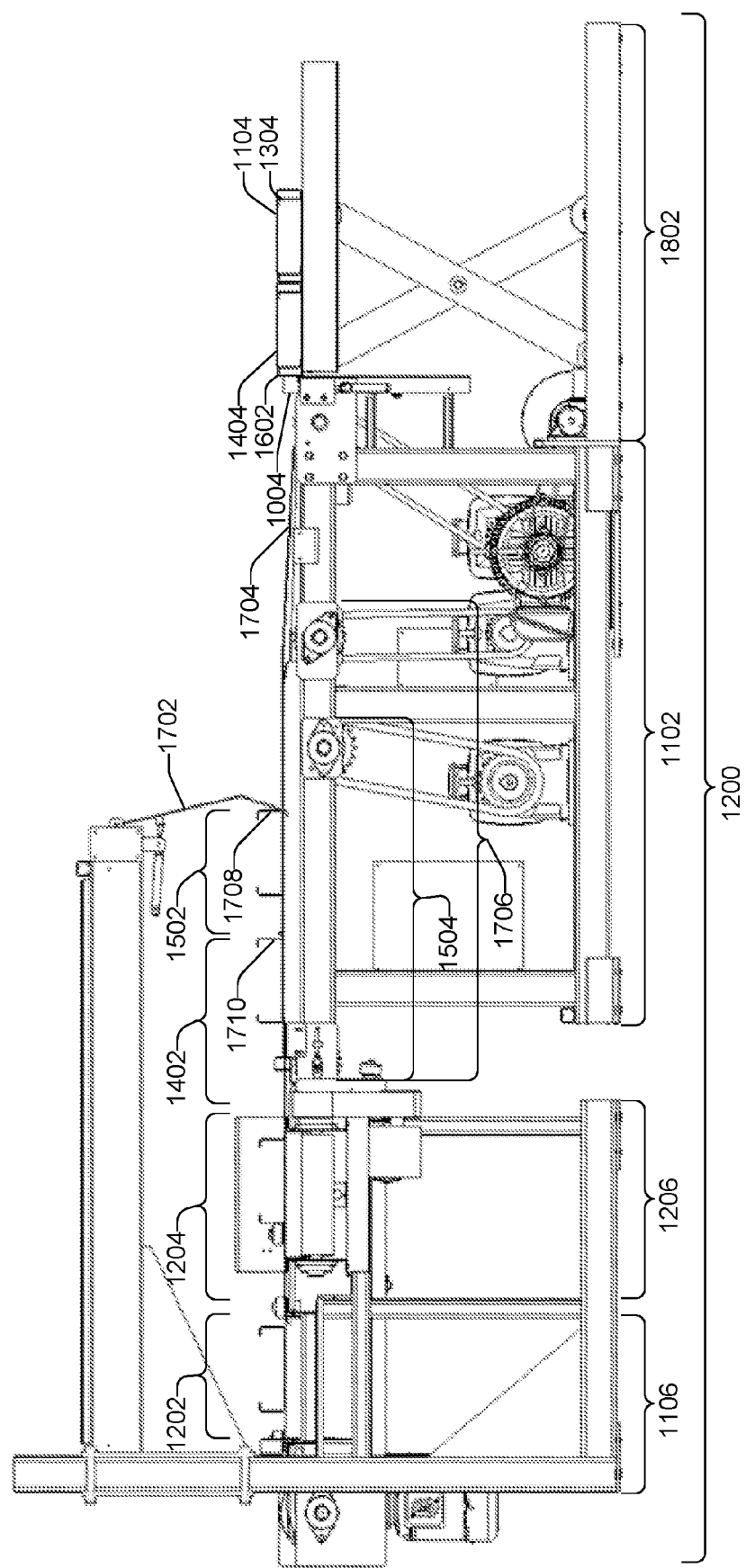
FIG. 18 illustrates the side view of the example stacking system illustrated in FIG. 12 with a third elongated metal member overturned, via the inverting arm, into a fourth elongated metal member and arranged adjacent to the first elongated member overturned into the second elongated member on a lift.

FIG. 18 illustrates the side view 1200 of the example stacking system 1102 illustrated in FIG. 12 with the third elongated metal member 1404 overturned, via the inverting arm 1702, into the fourth elongated metal member 1602 and arranged adjacent to the first elongated member 1104 overturned into the second elongated member 1304 on a lift 1802. The side transfer conveyor 1706 discharges the overturned pair of the third elongated metal member 1404 overturned in the fourth elongated metal member 1602 onto the fork 1704. The fork 1704 may be a tier fork and may slideably displace the nested pairs of elongated metal members. The fork 1704 may be coupled with the stacking system 1102 via an under constrained rack and pinion actuator, under constrained hydraulic cylinder, under constrained pneumatic cylinder, an under constrained screw and nut drive, a belt, a chain, a rope, etc. As discussed above, a stripper mechanism 1004 may selectively hold the nested pair of elongated metal members at a predefined position and the fork 1704 may retract, stripping the completed tier onto the lift 1802.

The stripper mechanism 1004 may retract, the lift 1802 may lower, and the fork 1704 may extend to receive another flipped pair of elongated metal members. The cycle continues until a full bundle is complete. For example, the cycle continues until the stacking system stacks the bundle 202 (A), 202(B), bundle 202(C), 202(D), bundle 202(E), etc.

Figure 19:
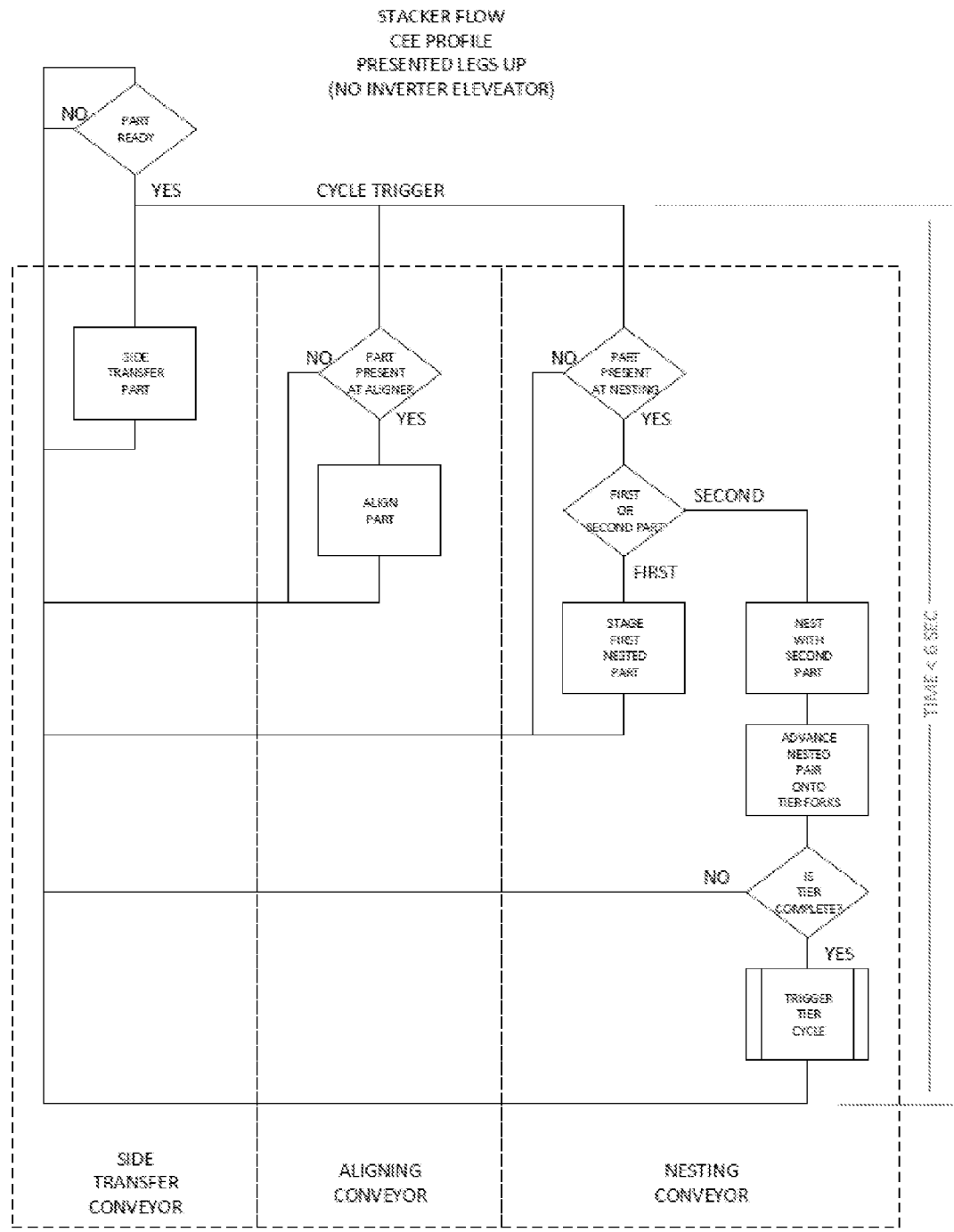
FIG. 19 is a flowchart which depicts an illustrative way of stacking elongated metal members having a cee cross-sectional profile with legs up without an inverting elevator.

FIG. 19 is a flowchart 1900 which depicts an illustrative way of stacking elongated metal members having the cee cross-sectional profile 102(A) with legs up without an inverting elevator 502.

Figure 20:
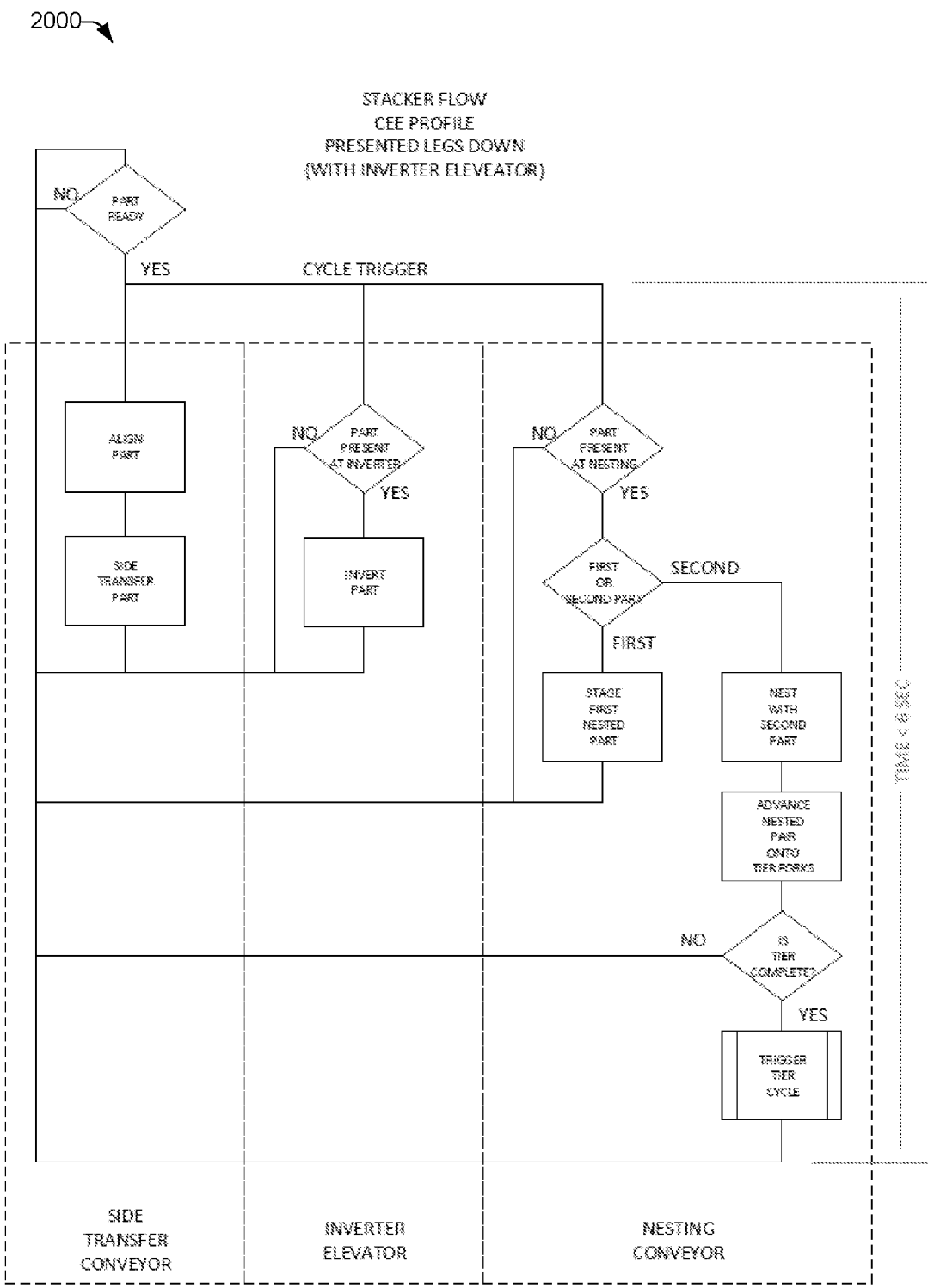
FIG. 20 is a flowchart which depicts an illustrative way of stacking elongated metal members having a cee cross-sectional profile with legs down with an inverting elevator.

FIG. 20 is a flowchart 2000 which depicts an illustrative way of stacking elongated metal members having the cee cross-sectional profile 102(A) with legs down with an inverting elevator 502 and the stacking system 1102.

Figure 21:
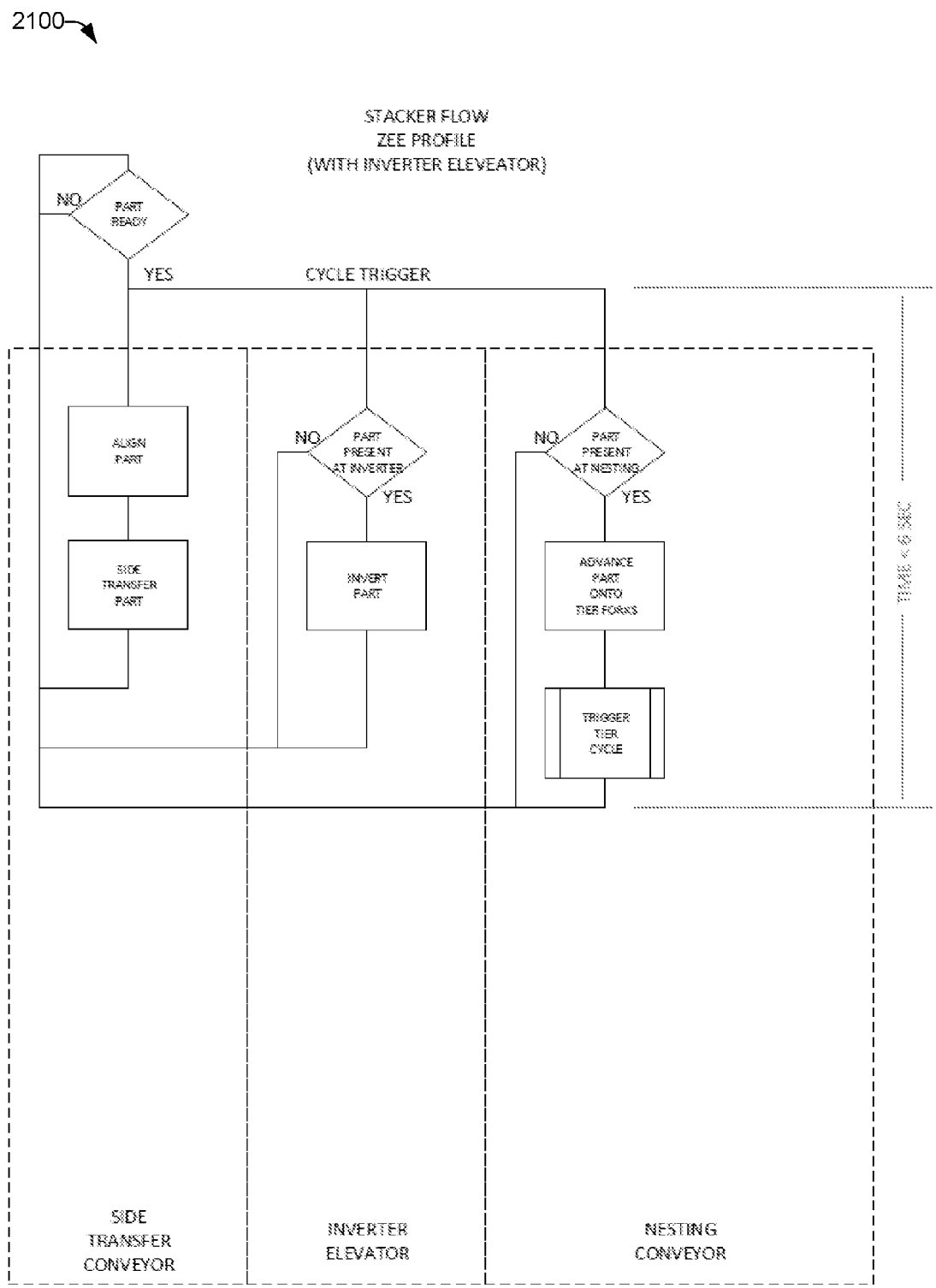
FIG. 21 is a flowchart which depicts an illustrative way of stacking elongated metal members having a zee cross-sectional profile with an inverting elevator.

FIG. 21 is a flowchart 2100 which depicts an illustrative way of stacking elongated metal members having the zee cross-sectional profile 102(B) with an inverting elevator 502 and the stacking system 1102.

Figure 22:
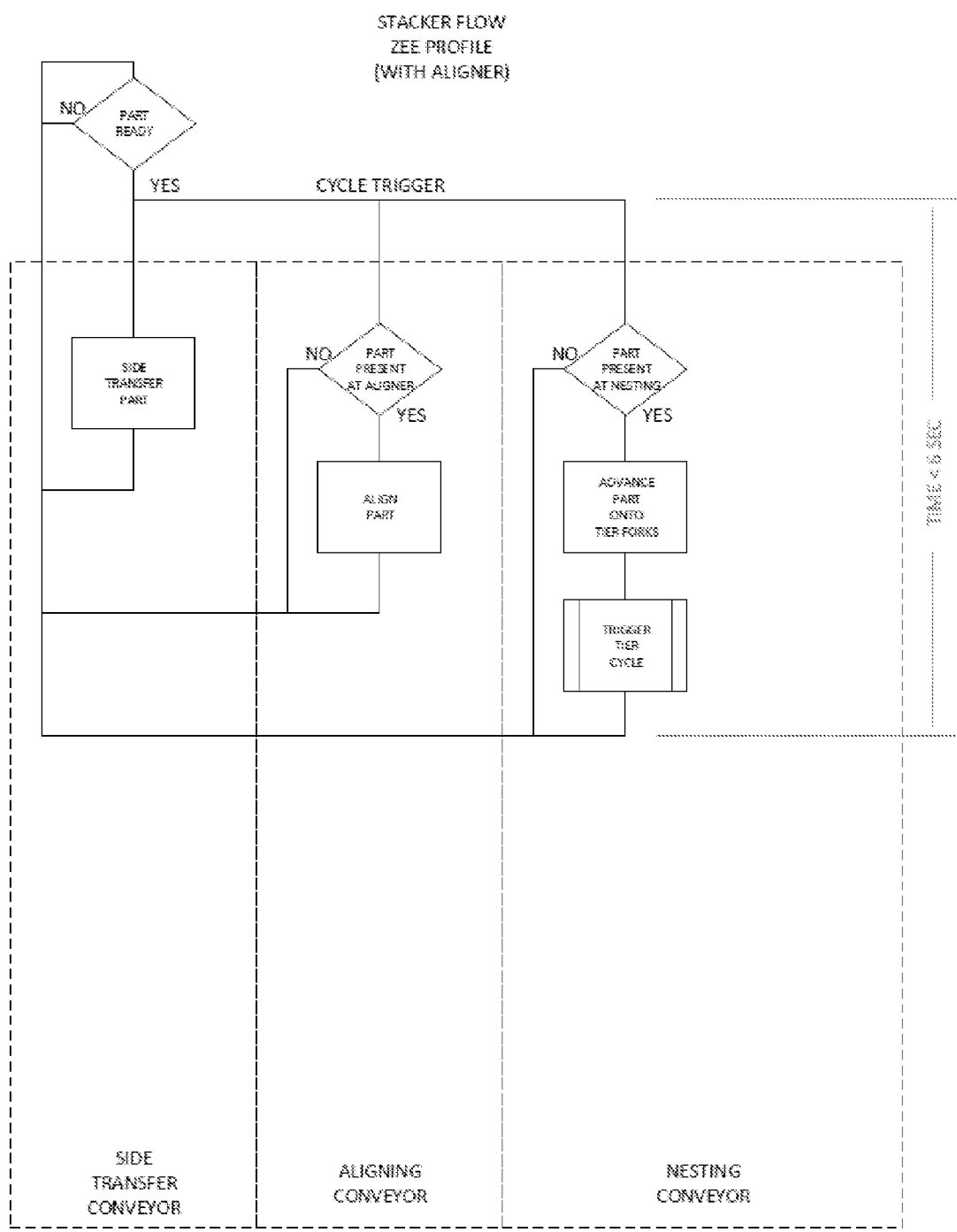
FIG. 22 is a flowchart which depicts an illustrative way of stacking elongated metal members having a zee cross-sectional profile with an aligning conveyor.

FIG. 22 is a flowchart 2200 which depicts an illustrative way of stacking elongated metal members having the zee cross-sectional profile 102(B) with an aligning conveyor 1206 and the stacking system 1102.

Figure 23:
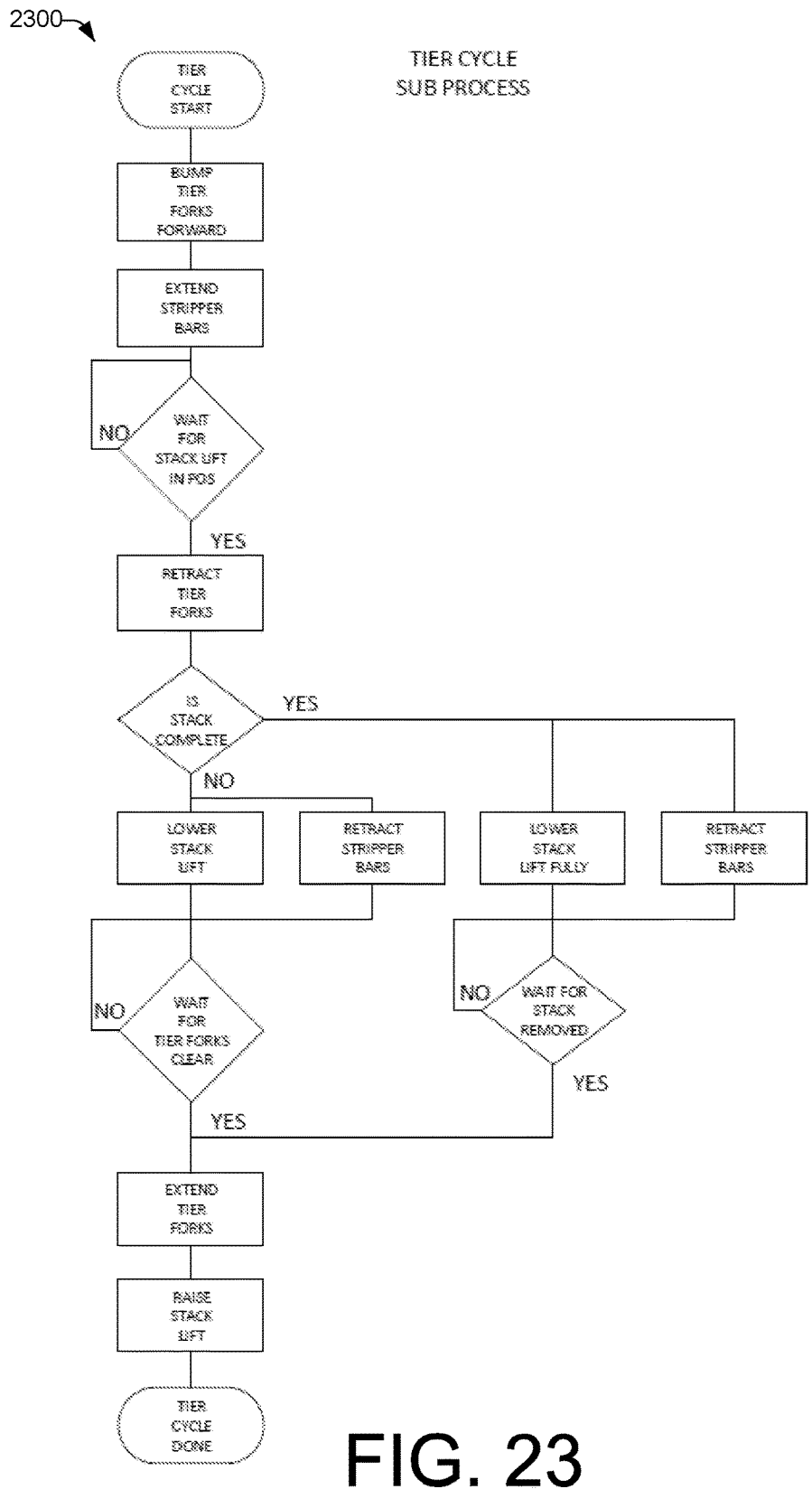
FIG. 23 is a flowchart which depicts an illustrative tier cycle sub process.

FIG. 23 is a flowchart 2300 which depicts an illustrative tier cycle sub process with the stacking system 1102.

Figure 24:
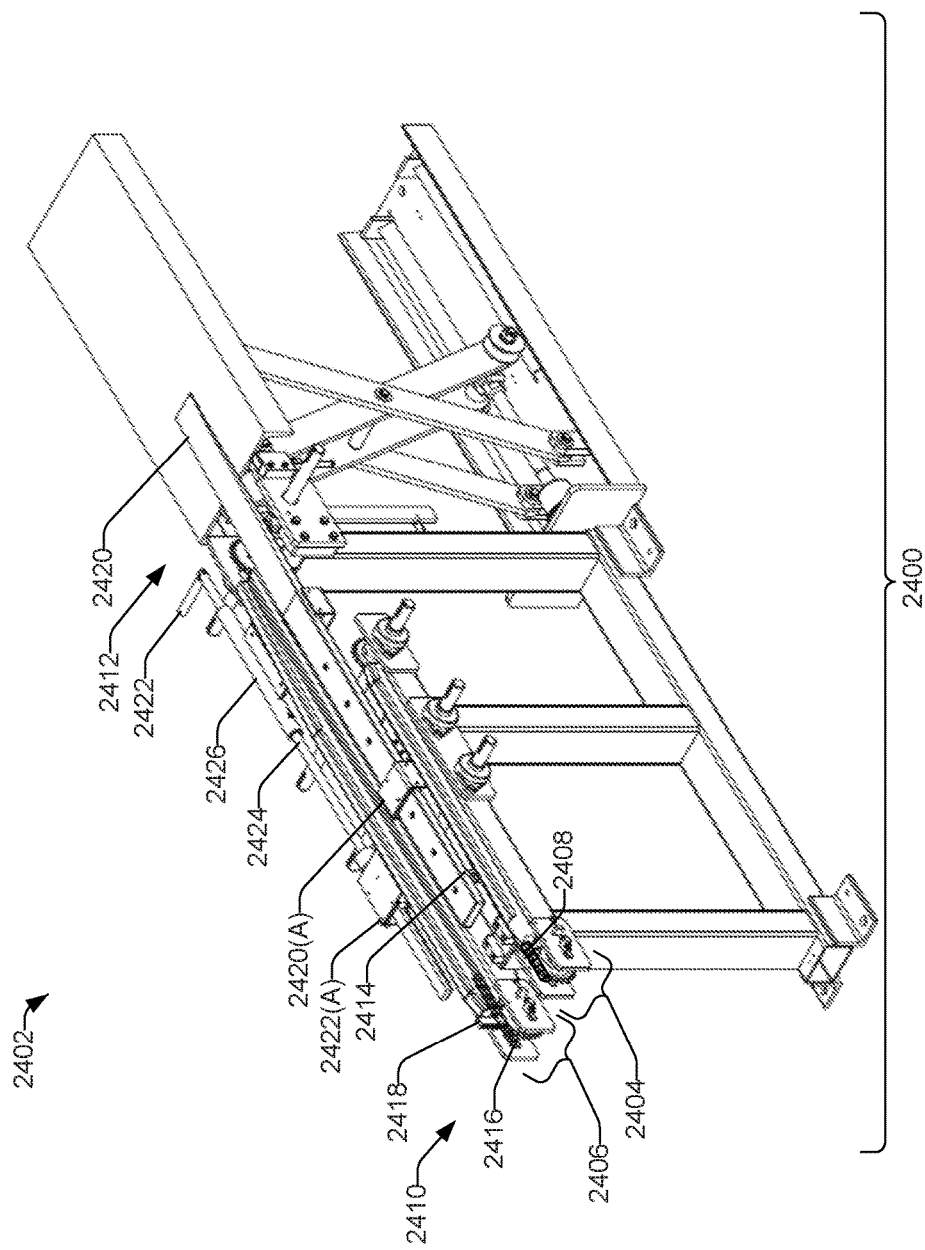
FIG. 24 depicts a perspective view of an illustrative stacking system.

FIG. 24 depicts a perspective view 2400 of an illustrative stacking system 2402, the illustrative stacking system 2402 can be an example of the stacking system 302 illustrated in FIGS. 3-10 or the example of the stacking system 1102 illustrated in FIGS. 11-18. FIG. 24 depicts the stacking system 2402 may include a spacing conveyor 2404 and a side transfer conveyor 2406. The spacing conveyor 2404 can be an example of the spacing conveyor 706 illustrated in FIGS. 7-10 or an example of the spacing conveyor 1504 illustrated in FIGS. 15-18. The spacing conveyor 2404 may include a deformable member 2408 arranged between a loading zone 2410 and an unloading zone 2412. For example, the spacing conveyor 2404 may include a chain, a belt, a cable, a rope, etc. arranged between the loading zone 2410 and the unloading zone 2412 that is selectively displaceable to transfer a first elongated metal member (e.g., first elongated metal members 304 or 1104 from one zone to another zone (e.g., from Zone 3 602 to Zone 4 702 illustrated in FIGS. 6 and 7, or from Zone 3 1402 to Zone 4 1502 illustrated in FIGS. 14 and 15).

FIG. 24 illustrates a drive cog 2414 may be coupled to the deformable member 2408. The drive cog 2414 may interface and contact with a trailing edge of the first elongated metal member to displace the first elongated metal member in a direction from the loading zone 2410 to the unloading zone 2412.

The side transfer conveyor 2406 can be an example of the side transfer conveyor 802 illustrated in FIGS. 8-10 or an example of the side transfer conveyor 1706 illustrated in FIGS. 17 and 18. The side transfer conveyor 2406 may include a deformable member 2416 arranged between the loading zone 2410 and the unloading zone 2412. For example, the side transfer conveyor 2406 may include a chain, a belt, a cable, a rope, etc. arranged between the loading zone 2410 and the unloading zone 2412 that is selectively displaceable to move synchronously (e.g., move at substantially the same rate and at a predetermined distance) with the spacing conveyor 2404 to displace a second elongated metal member (e.g., second elongated metal members 504 or 1304) in the direction from the loading zone 2410 to the unloading zone 2412. For example, the side transfer conveyor 2406 may position the second elongated metal member a distance from the first elongated metal member and subsequent to the positioning of the second elongated metal member at the distance, the side transfer conveyor 2406 displaces the second elongated metal member synchronously with the first elongated metal member being displaced by the spacing conveyor 2404. The side transfer conveyor 2406 and the spacing conveyor 2404 displace the first and second elongated metal members synchronously as the inverting arm overturns the first elongated metal member into the second elongated metal member. The spacing conveyor 2404 and the side transfer conveyor 2406 may define a nesting conveyor. The distance between the first and second elongated metal members may vary depending on a geometry of the elongated metal members being overturned. In one example the distance may be about 1.5 inches (4 centimeters) from a trailing edge of the first elongated metal member to a leading edge of the second elongated metal member. In another example the distance may be at least about 0.5 inches (1 centimeter) from a trailing edge of the first elongated metal member to a leading edge of the second elongated metal member to at most about 6 inches (15 centimeters) from a trailing edge of the first elongated metal member to a leading edge of the second elongated metal member.

FIG. 24 illustrates a drive cog 2418 may be coupled to the deformable member 2416. The drive cog 2418 may interface and contact with a trailing edge of the second elongated metal member to displace the second elongated metal member in a direction from the loading zone 2410 to the unloading zone 2412.

FIG. 24 illustrates the stacking system 2402 may include a fork 2420. The fork 2420 can be an example of the fork 902 illustrated in FIGS. 9 and 10 or an example of the fork 1704 illustrated in FIGS. 17 and 18. The fork 2420 may be coupled with the stacking system 2402 via an under constrained rack and pinion actuator, under constrained hydraulic cylinder, under constrained pneumatic cylinder, an under constrained screw and nut drive, a belt, a chain, a rope, etc. FIG. 24 illustrates an under constrained rack and pinion actuator 2420(A) coupling the fork 2420 to stacking systems 2402.

FIG. 24 illustrates the stacking system 2402 may include a stripper mechanism 2422. The stripper mechanism 2422 can be an example of the stripper mechanism 1004 illustrated in FIGS. 10 and 18. The stripper mechanism 2422 may be coupled with the stacking system 2402 and may be a bar 2424 slideably received in a tube 2426 having a cam that can selectively hold nested pairs of elongated metal members at a predefined position. The bar may be coupled to an actuator 2422(A) by at least one of a rack and pinion actuator, a hydraulic cylinder, a pneumatic cylinder, a screw and a nut drive, a belt, a chain, or a rope.

Figure 25:
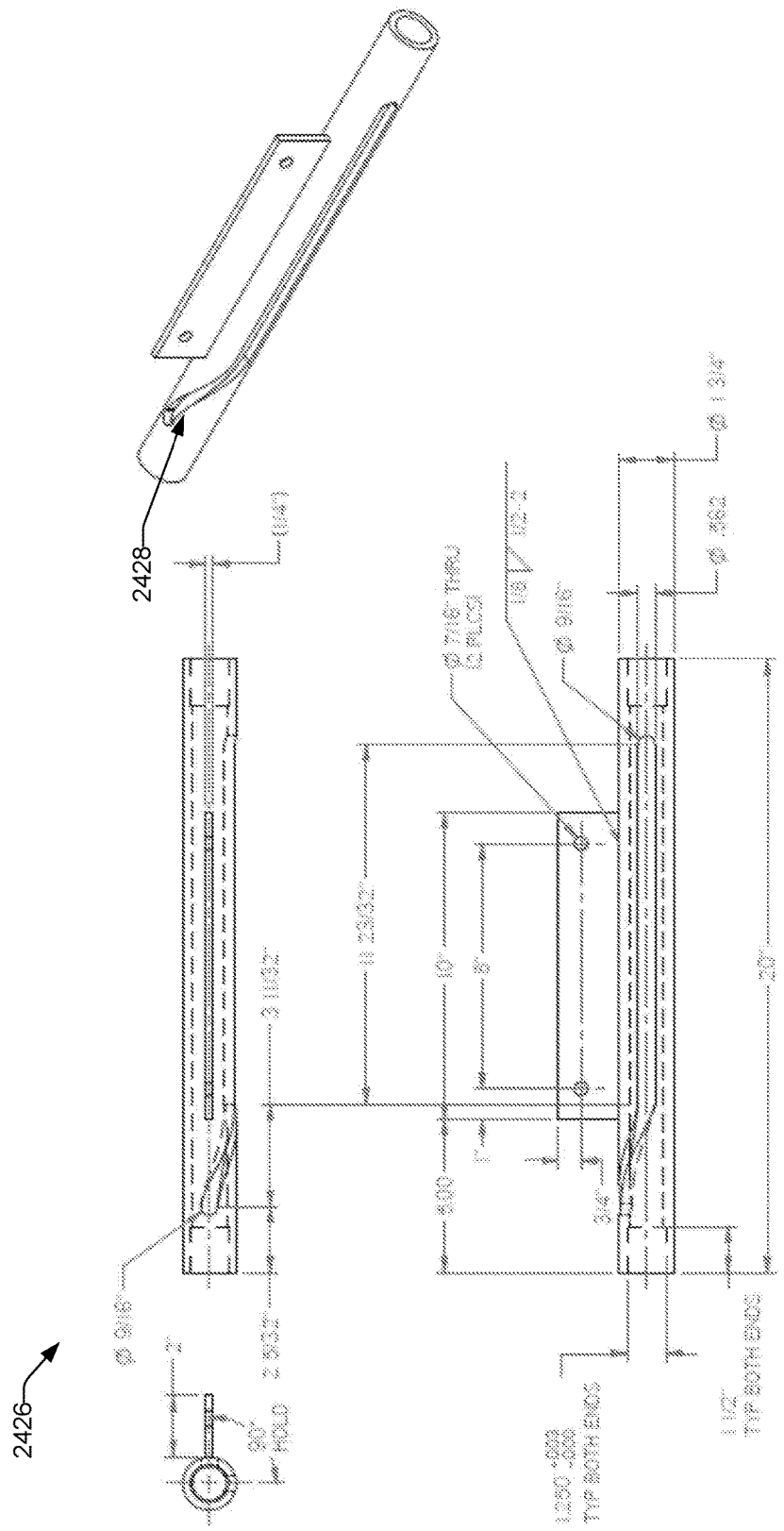
FIG. 25 depicts a detail view of the tube of the stripper mechanism illustrated in FIG. 24.

FIG. 25 depicts detail views of the tube 2426 of the stripper mechanism 2422 illustrated in FIG. 24.

Figure 26:
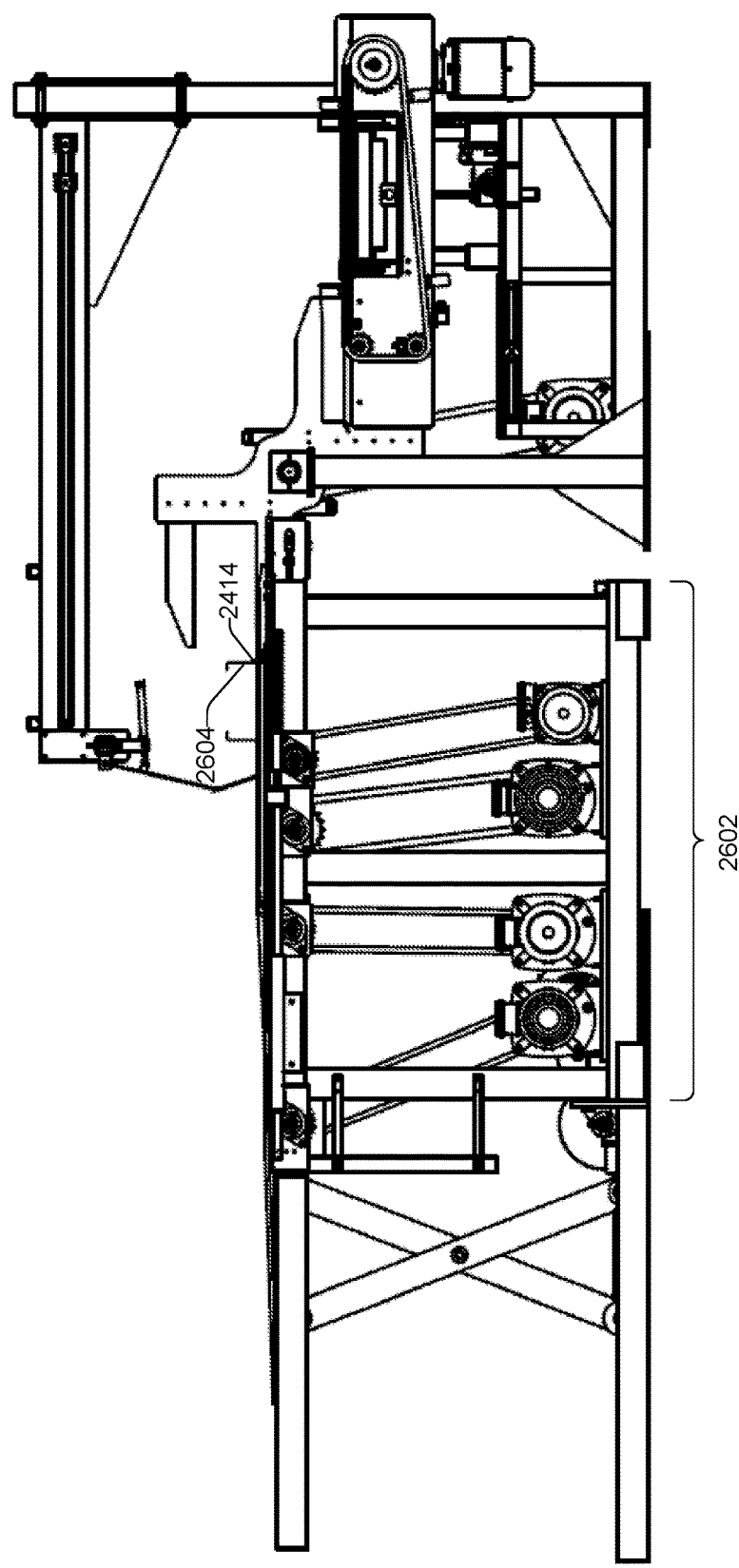
FIGS. 26-33 depict an illustrative sequence of a stacking system stacking elongated metal members.

FIGS. 26-33 depict an illustrative sequence of a stacking system 2602 stacking elongated metal members. The sequence may represent a cee cross-sectional shape stacking sequence. FIG. 26 illustrates a first elongated metal member 2604 entering the stacking system 2602. As discussed above with regard to FIG. 24 the drive cog 2414 may interface and contact with a trailing edge of the first elongated metal member to displace the first elongated metal member.

Figure 27:
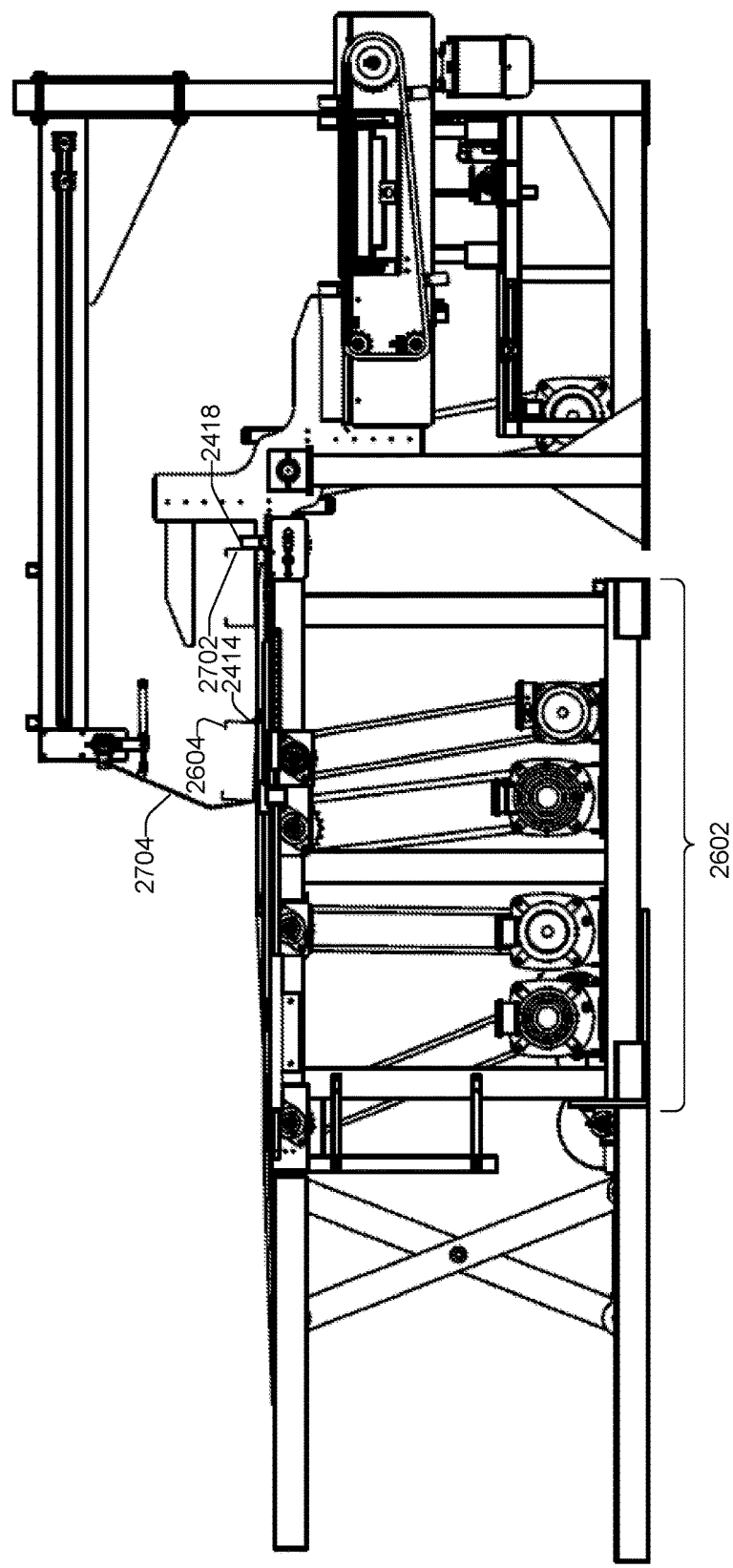

FIG. 27 illustrates the first elongated metal member 2604 staged and a second elongated metal member 2702 entering the stacking system 2602. For example, FIG. 27 illustrates the second elongated metal member 2702 entering the stacking system 2602 and an inverting arm 2704 catching hold of a leading edge of the first elongated metal member 2702. As discussed above with regard to FIG. 24 the drive cog 2418 may interface and contact with a trailing edge of the second elongated metal member to displace the second elongated metal member.

Figure 28:
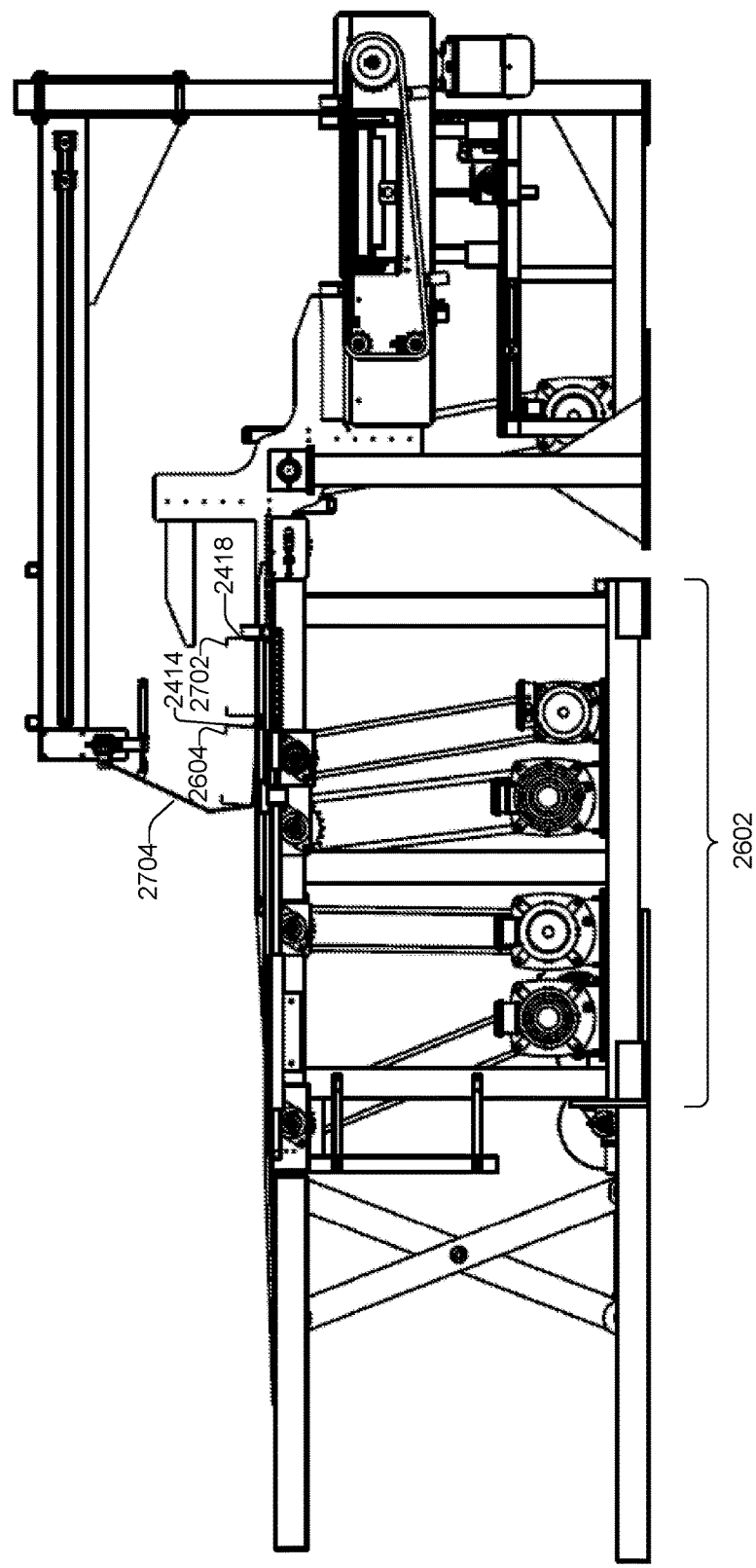

FIG. 28 illustrates the second elongated metal member 2702 positioned adjacent to the first elongated metal member 2604. The first and second elongated metal members 2604 and 2702 are now positioned to be nested (e.g., overturn the first elongated metal member 2604 into the second elongated metal member 2702).

Figure 29:
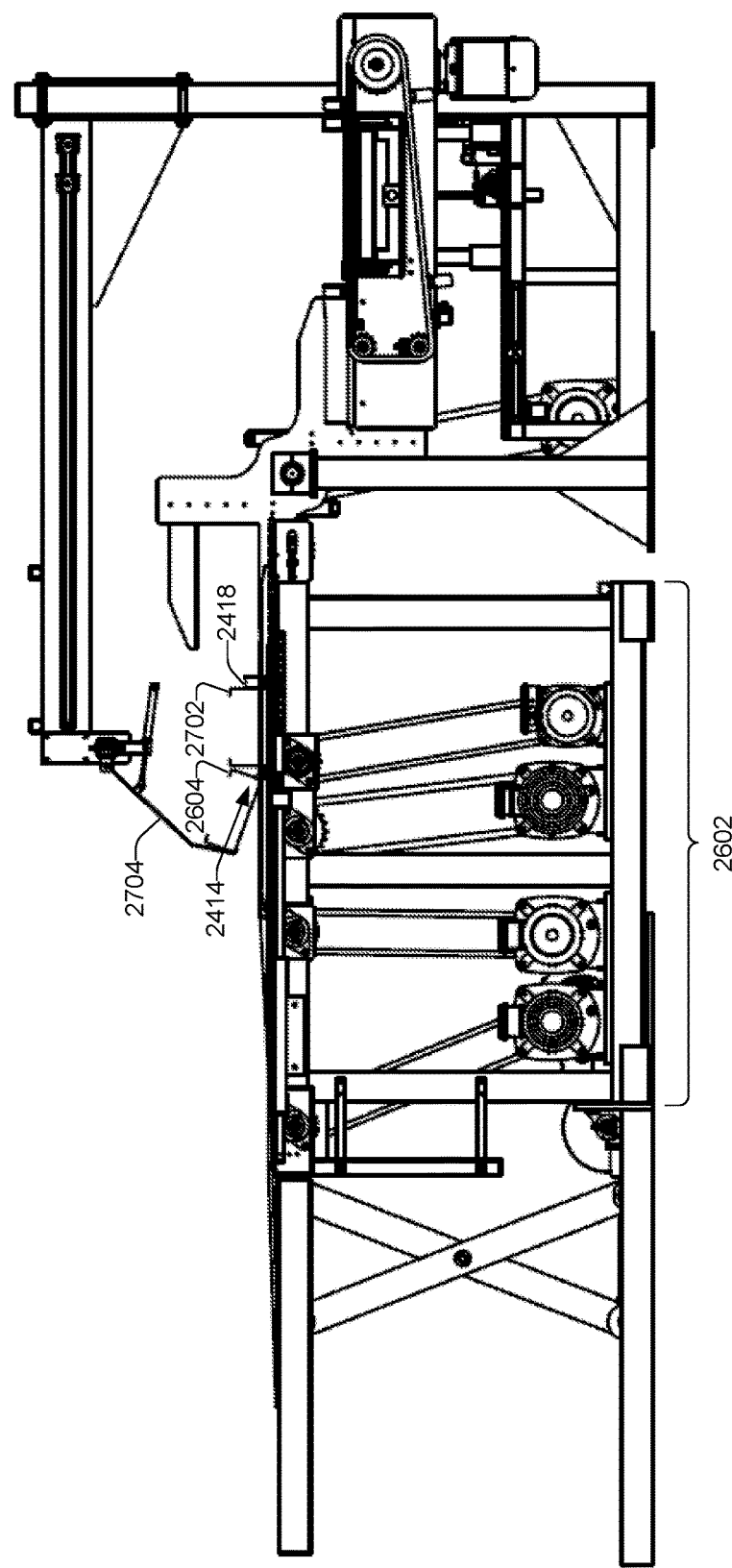

FIG. 29 illustrates the inverting arm 2704 lifting the trailing edge of the first elongated metal member 2702 to overturn the first elongated metal 2604 member into the second elongated metal member 2702. As discussed above with regard to FIG. 24 the drive cog 2418 of the side transfer conveyor 2406 moves synchronously with the drive cog 2414 of the spacing conveyor 2404 to overturn the first elongated metal member 2604 into the second elongated metal member 2702.

Figure 30:
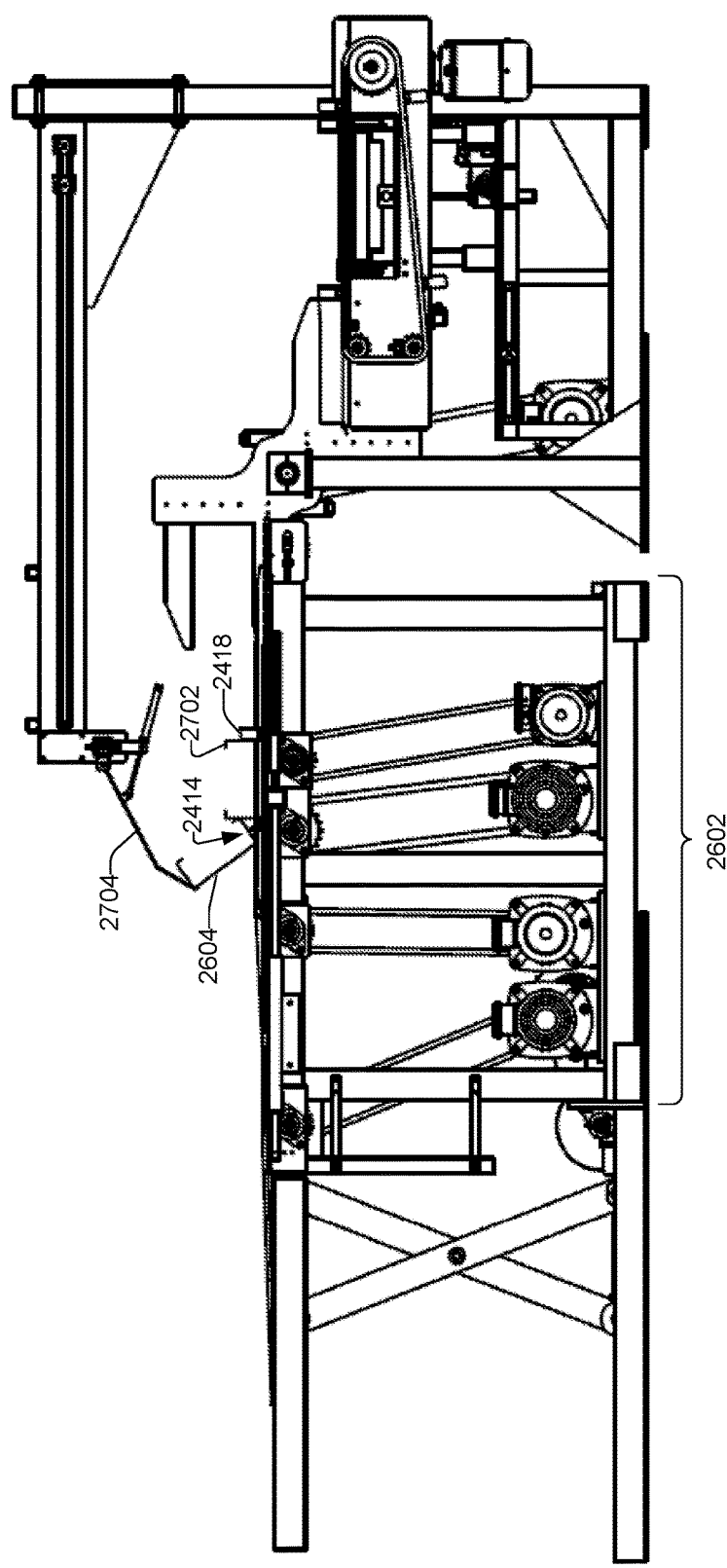
Figure 31:
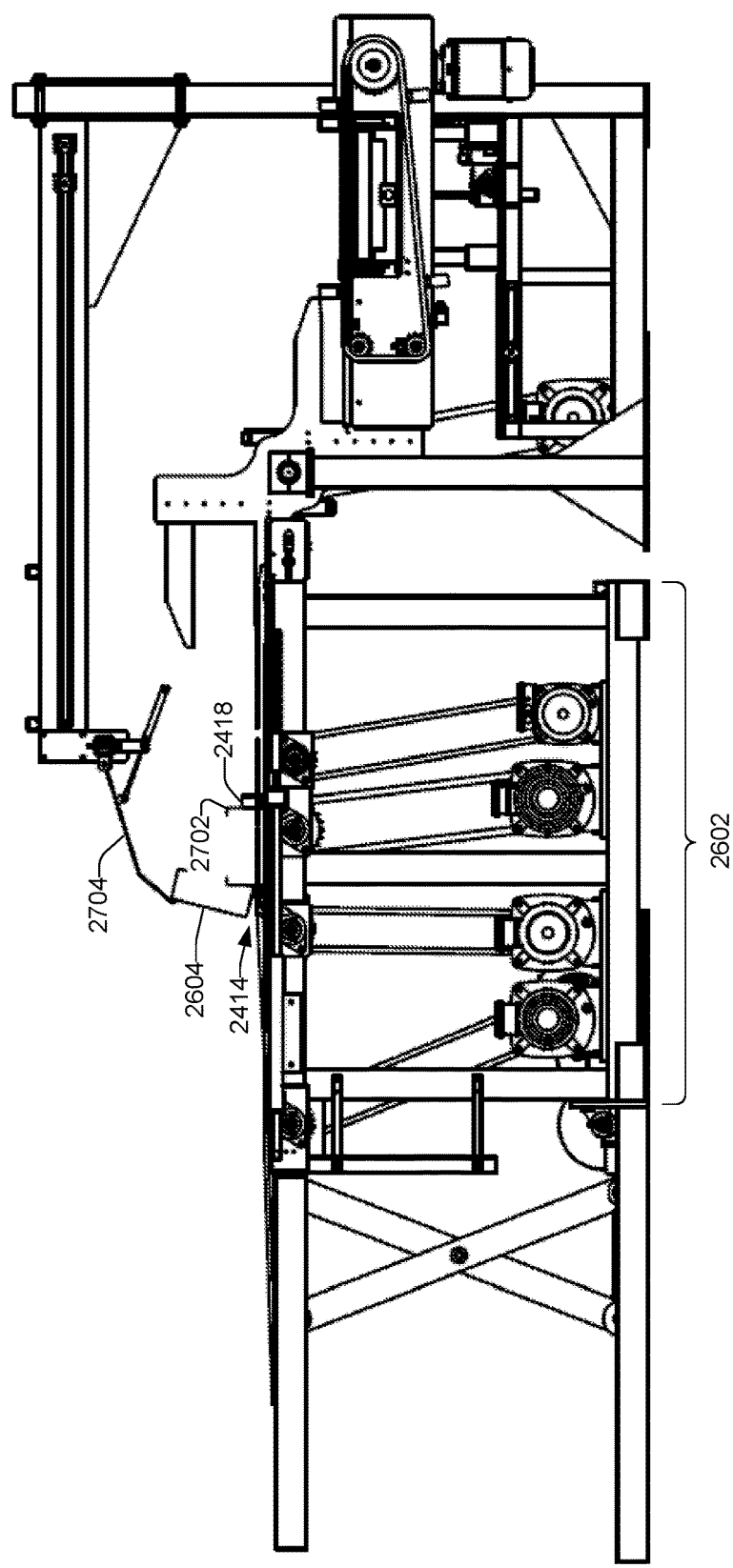

FIGS. 30 and 31 illustrate the inverting arm 2704 further lifting the leading edge of the first elongated metal member 2604 to overturn the first elongated metal 2604 member into the second elongated metal member 2702. FIG. 30 illustrates the inverting arm 2704 lifting the leading edge of the first elongated metal member 2604 and pivoting the trailing edge of the first elongated metal member 2604 on the drive cog 2414 as the inverting arm 2704 overturns the first elongated metal member 2604 into the second elongated metal member 2702.

Figure 32:
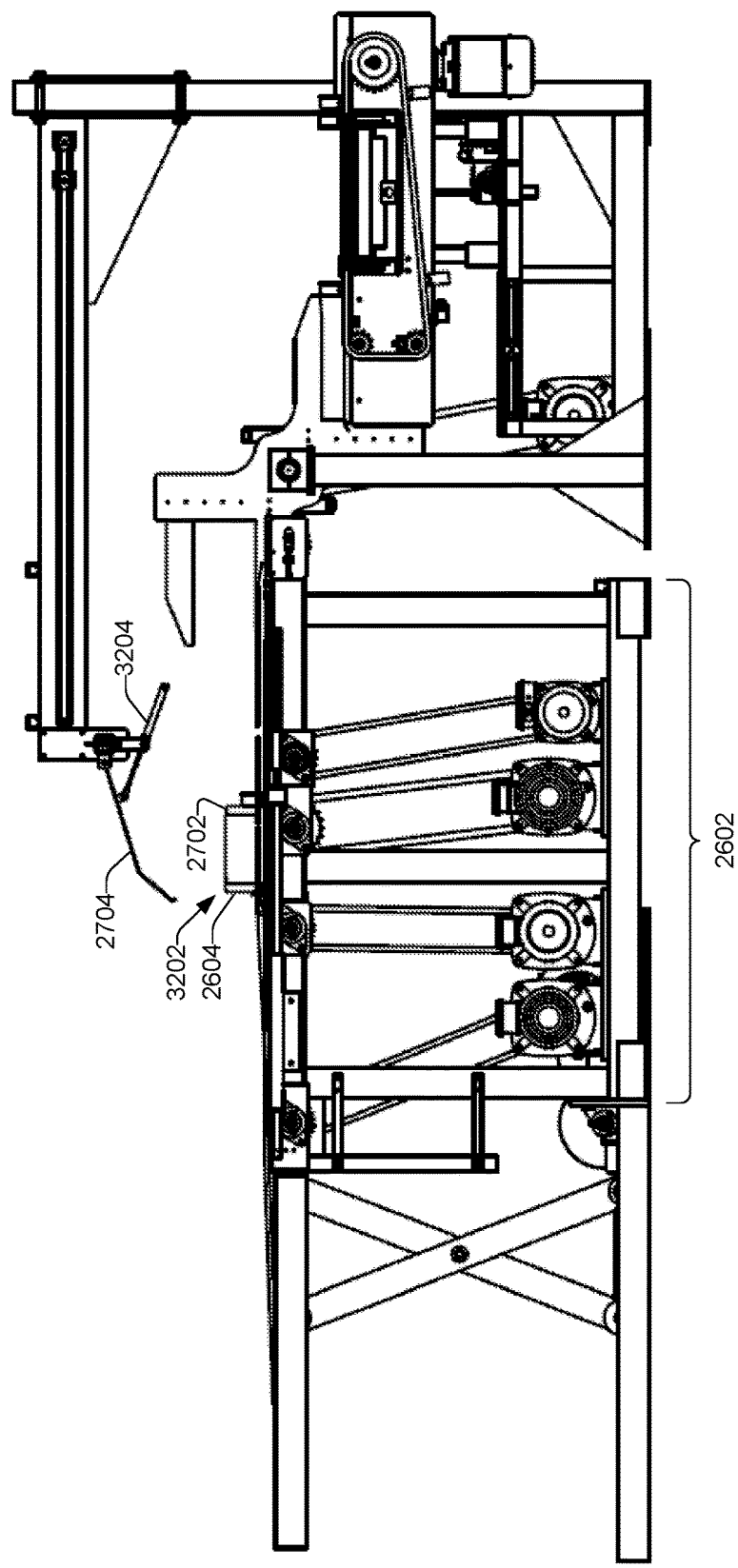

FIG. 32 illustrates the first elongated metal member 2604 overturned into the second elongated metal member 2702. The first elongated metal member 2604 overturned into the second elongated metal member 2702 defining a nest pair 3202. FIG. 32 illustrates a brake mechanism 3204 arranged with the inverting arm 2704 and holding the inverting arm 2704 in a raised position.

Figure 33:
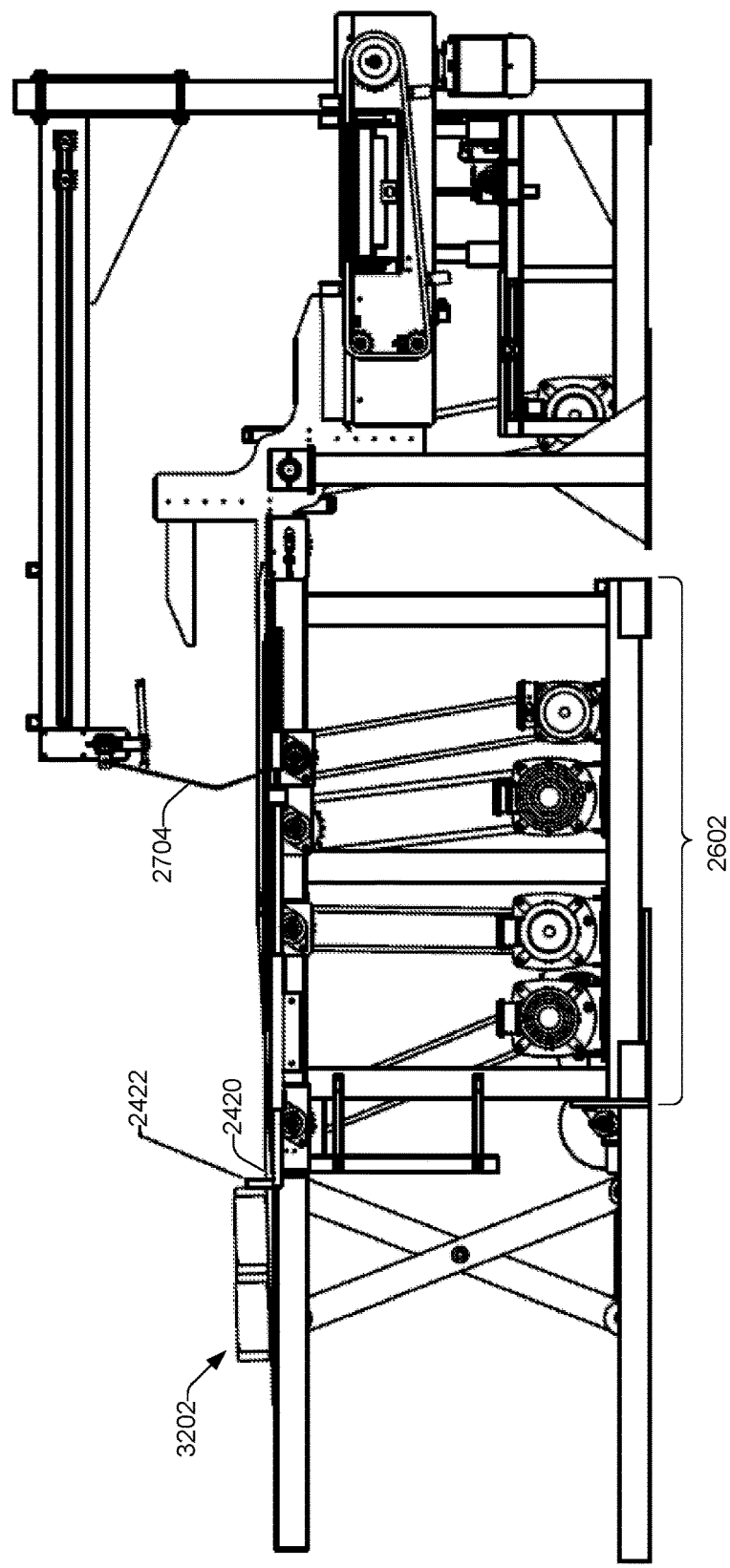

FIG. 33 illustrates the stripper mechanism 2422 selectively holding nested pairs of elongated metal members at a predefined position to remove the nested pairs from the stacking system 2602. For example, the stripper mechanism 2422 may selectively hold the nested pairs of elongated metal members at a predefined position as the fork 2420 is retracted to place the nested pairs onto a lift, a crate, a pallet, a cart, etc.

Figure 34:
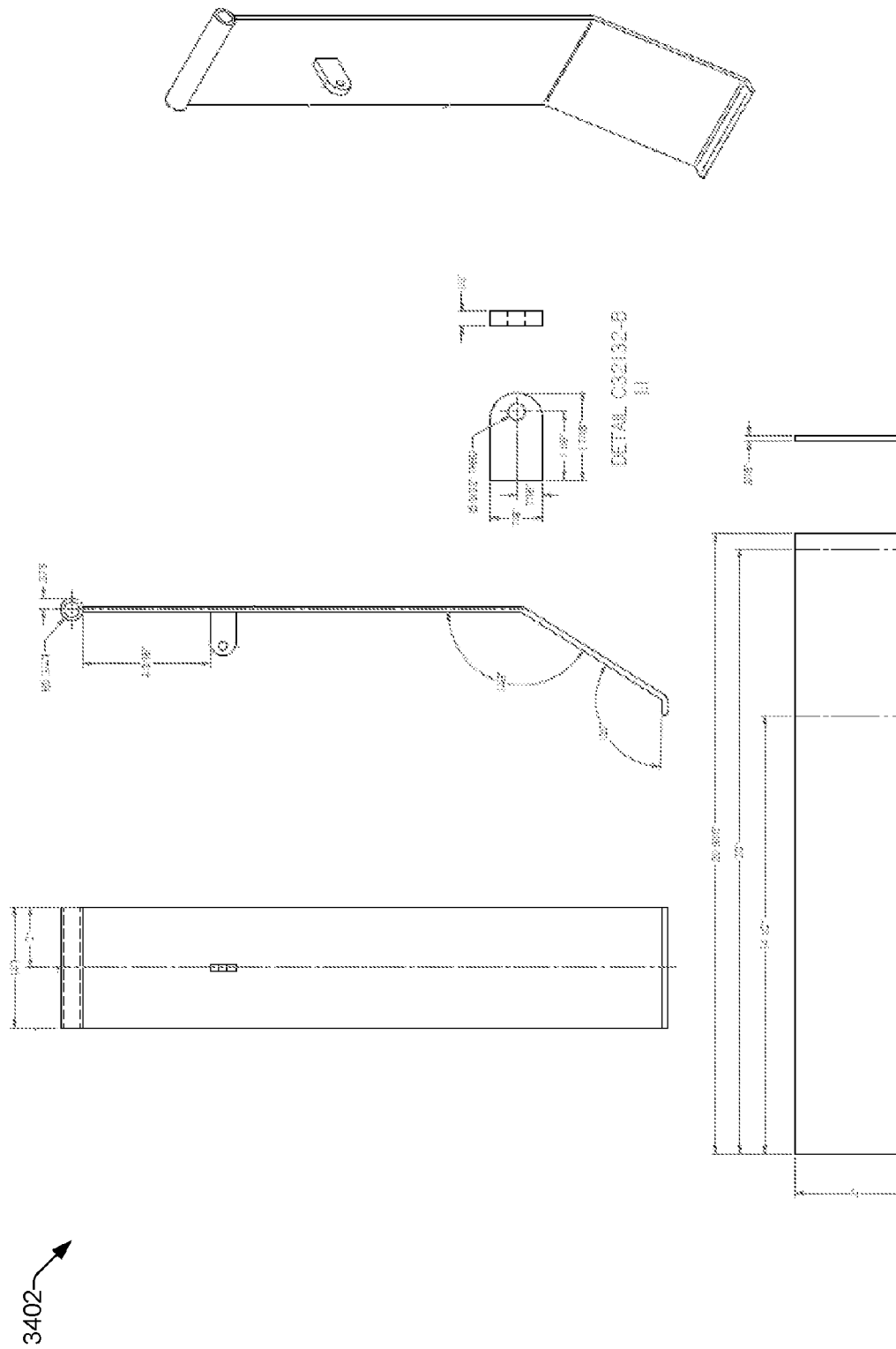
FIG. 34 illustrates example geometries of an example stripper arm.

FIG. 34 illustrates example geometries of an example inverting arm 3402.

Figure 35:
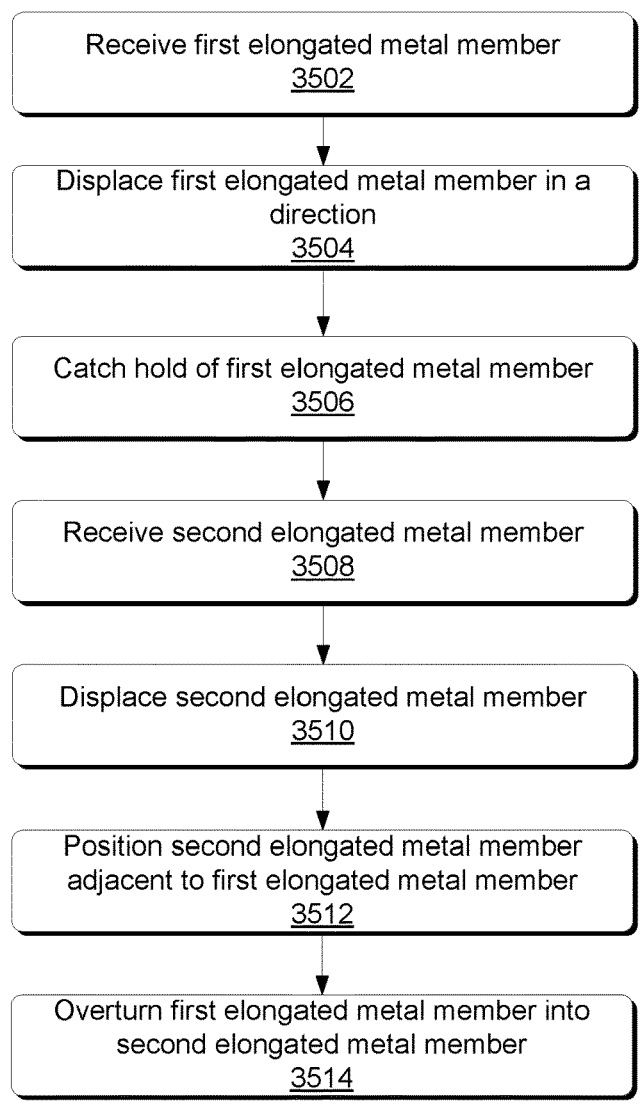
FIG. 35 is a flow diagram illustrating an example process of stacking elongated metal members.

FIG. 35 illustrates an exemplary flow diagram 3500 for a method of stacking a plurality of elongated metal members.

At act 3502, a stacking system (e.g., stacking system 302, 1102 or 2402) may receive a first elongated metal member (e.g., first elongated metal member 304 or 1104) of the plurality of elongated metal members. Next, at act 3504 the stacking system may displace the first elongated metal member in a direction (e.g., a direction from a loading zone 2410 to an unloading zone 2412 or a direction substantially perpendicular to a direction 308).

Act 3504 may be followed my act 3506. At act 3506 an inverting arm (e.g., inverting arm 804, 1702, 2704, or 3402) may catch hold of the first elongated metal member being displaced in the direction. At act 3508, the stacking system may receive a second elongated metal member (e.g., second elongated metal member 504 or 1304) of the plurality of elongated metal members. At operation 3510 the second elongated metal member may be displaced in the direction.

At operation 3512 the second elongated metal member may be positioned adjacent to the first elongated metal member as the second elongated metal member is displaced in the direction.

The method may be complete at operation 3514 which represents overturning, by the inverting arm, the first elongated metal member into the second elongated metal member arranged adjacent to the first elongated metal member.

Each of the flowcharts 1900, 2000, 2100, 2200, 2300, and 3500 represent computer-implemented methods which may be performed under control of one or more processors configured with executable instructions that instruct one or more of the stacking systems (e.g., stacking systems 502 and 1102) to stack the elongated members having a cross-sectional profile (e.g., cross-sectional profile 102(A)-102(J) and/or 4502(A)-4502(C)). One or more non-transitory computer-readable storage media may store the computer-readable instructions that, when executed by one or more processors, causes the one or more processors to perform the computer-implemented methods above. Moreover, each of the blocks illustrated in the flowcharts 1900, 2000, 2100, 2200, 2300, and 3500 may represent instructions to perform a respective operation in the computer-implemented methods above, which instructions may be implemented in software, hardware, or a combination of software and hardware.

Figure 36:
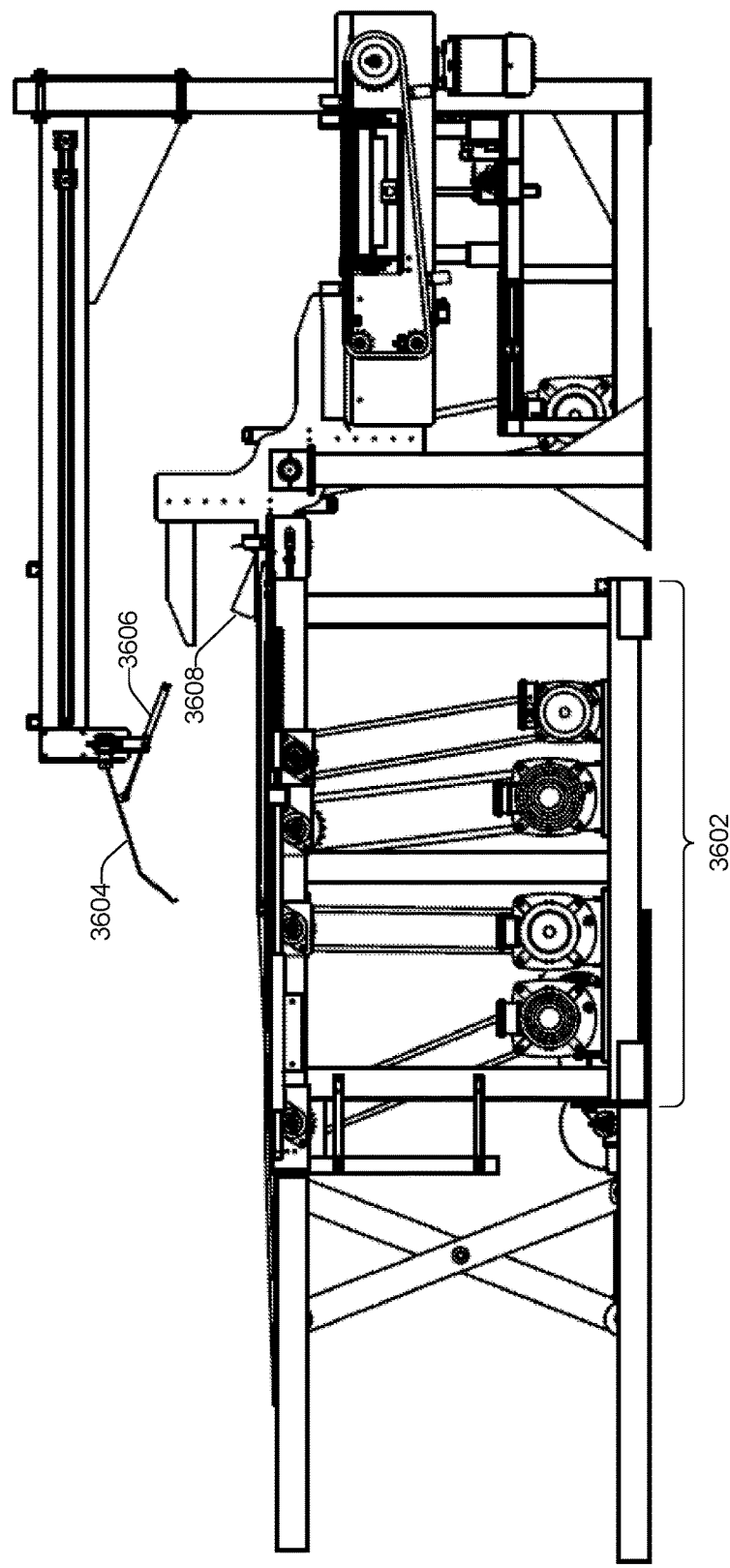
FIGS. 36-39 depict another illustrative sequence of a stacking system stacking elongated metal members.

FIGS. 36-39 depict another illustrative sequence of a stacking system 3602 stacking elongated metal members. The sequence may represent a zee cross-sectional shape stacking sequence. Here, an inverting arm 3604 is selectively held by a brake mechanism 3606 arranged with the inverting arm 3604 in a raised position. FIG. 36 illustrates a first elongated metal member 3608 entering the stacking system 3602.

Figure 37:
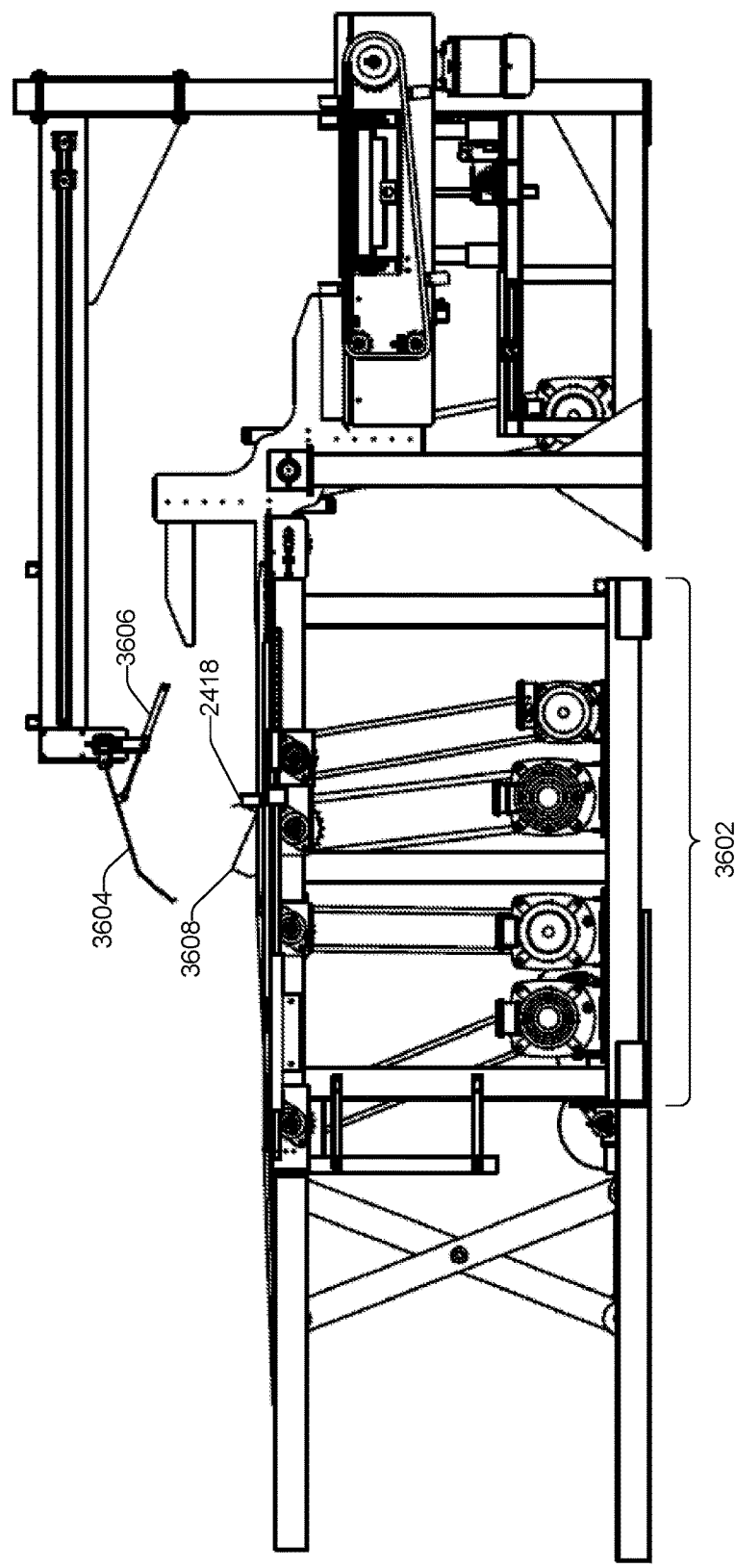

FIG. 37 illustrates the first elongated metal member 3608 being displaced by the drive cog 2418. The drive cog 2418 may interface and contact with a trailing edge of the first elongated metal member to displace the second elongated metal member.

Figure 38:
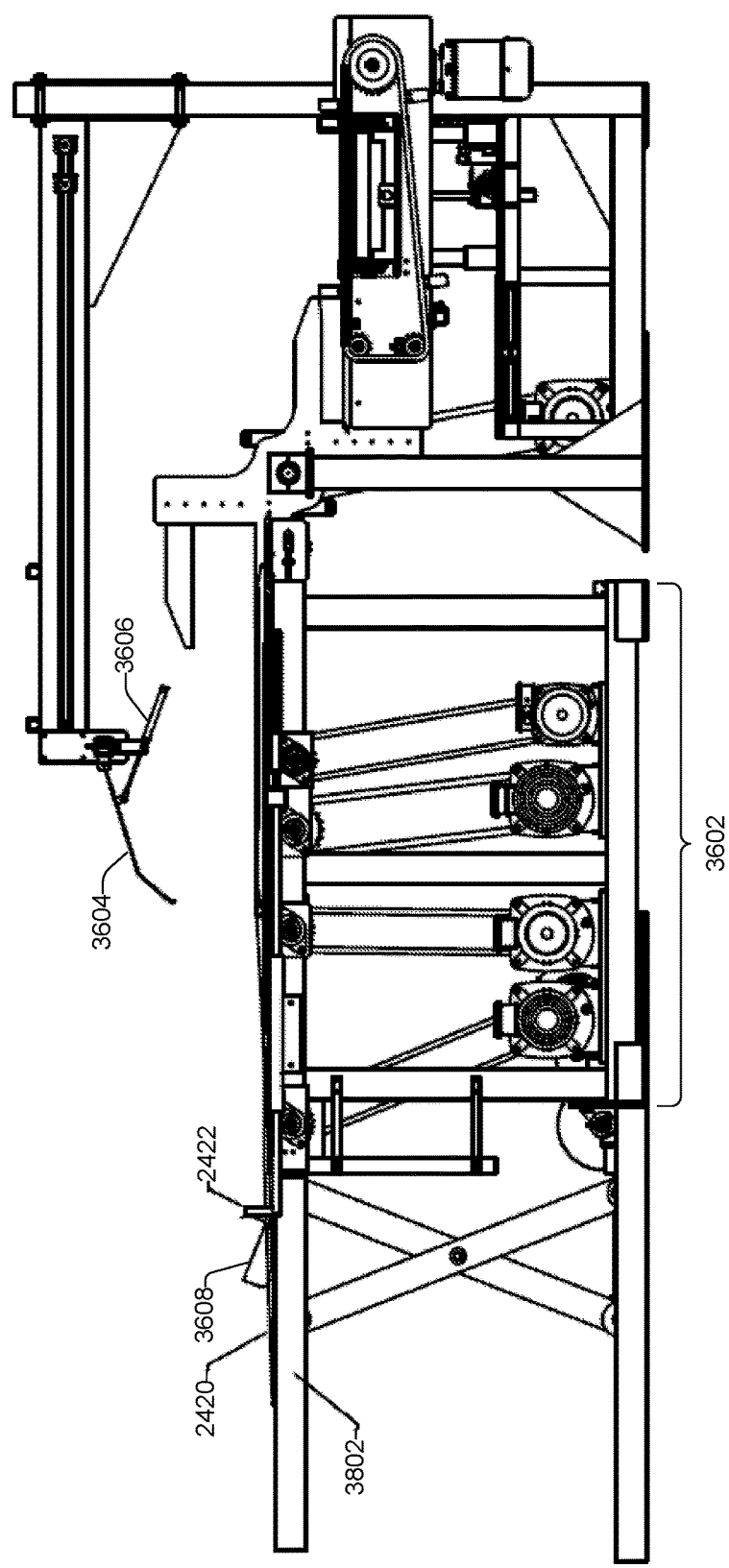

FIG. 38 illustrates the stripper mechanism 2422 may selectively hold the first elongated metal member 3608 at a predefined position as the fork 2420 is retracted to place the first elongated metal member onto a lift 3802.

Figure 39:
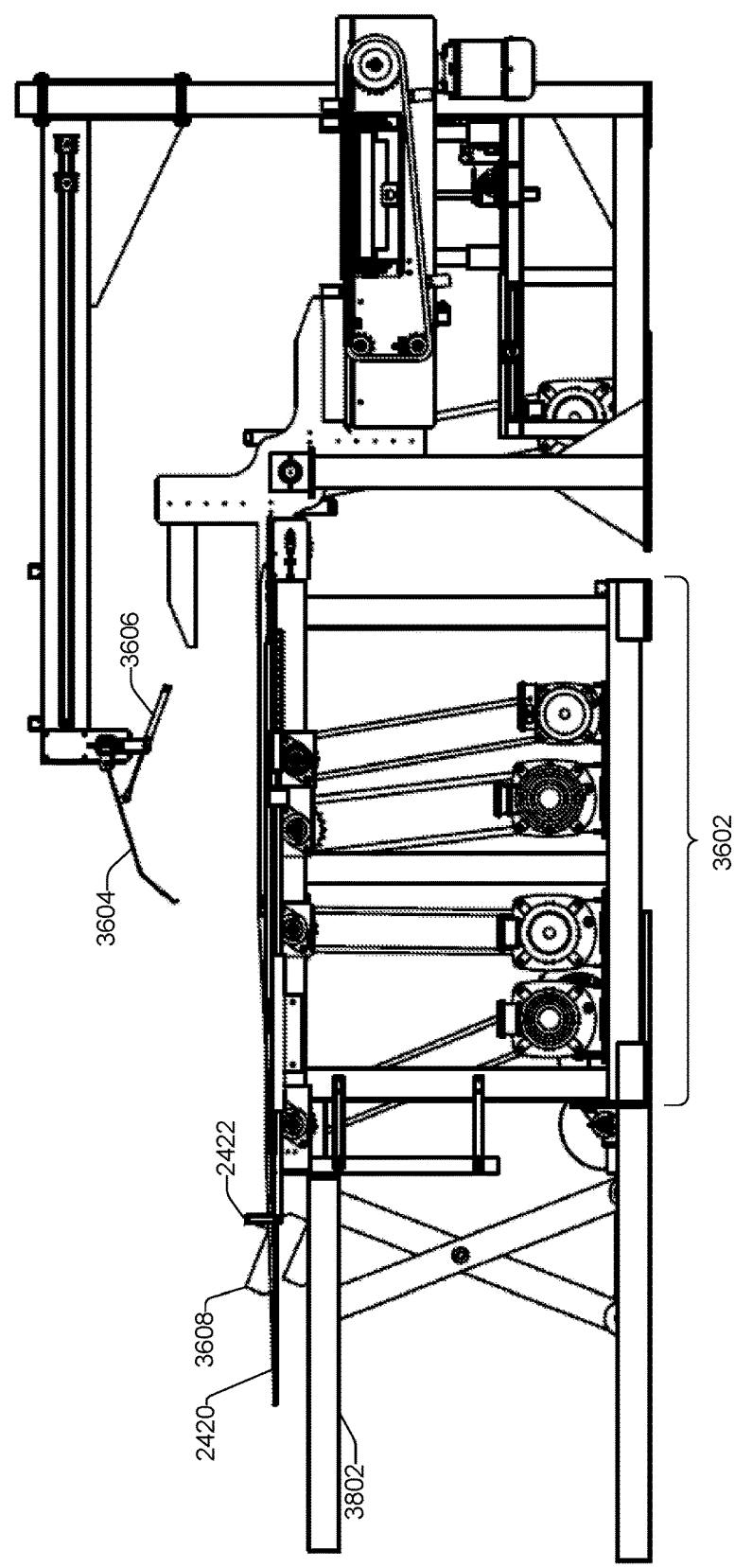

FIG. 39 illustrates the stripper mechanism 2422 may selectively hold a second elongated metal member 3902 at a predefined position as the fork 2420 is retracted to nest the second elongated metal member with the first elongated metal member arranged on the lift 3802.

Figure 40:
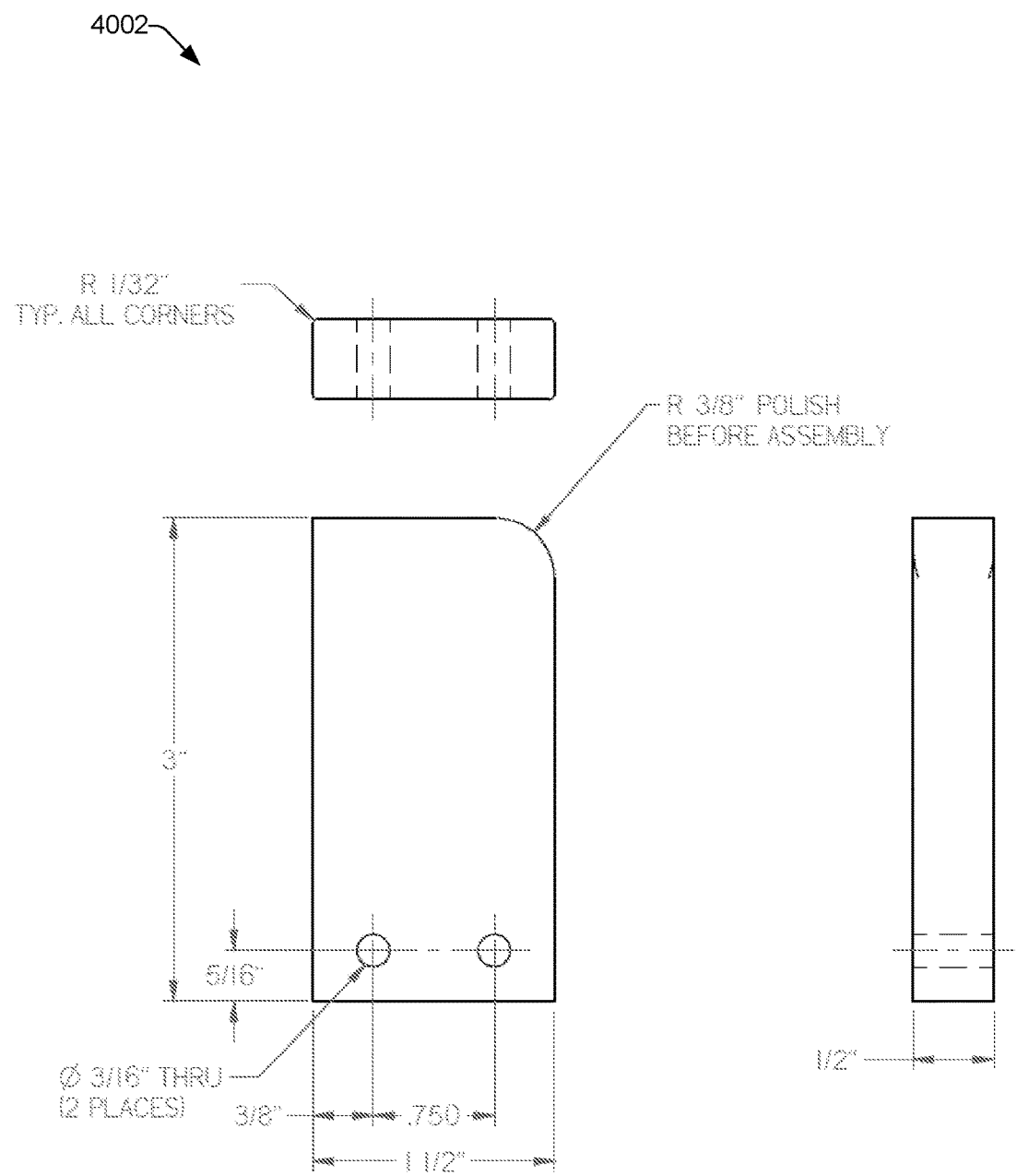
FIGS. 40 and 41 illustrate example geometries of example drive cogs for displacing an elongated metal member.

FIG. 40 illustrates example geometries of an example drive cog 4002 for displacing an elongated metal member. The drive cog 4002 can be an example of drive cog 2418 illustrated in FIG. 24.

Figure 41:
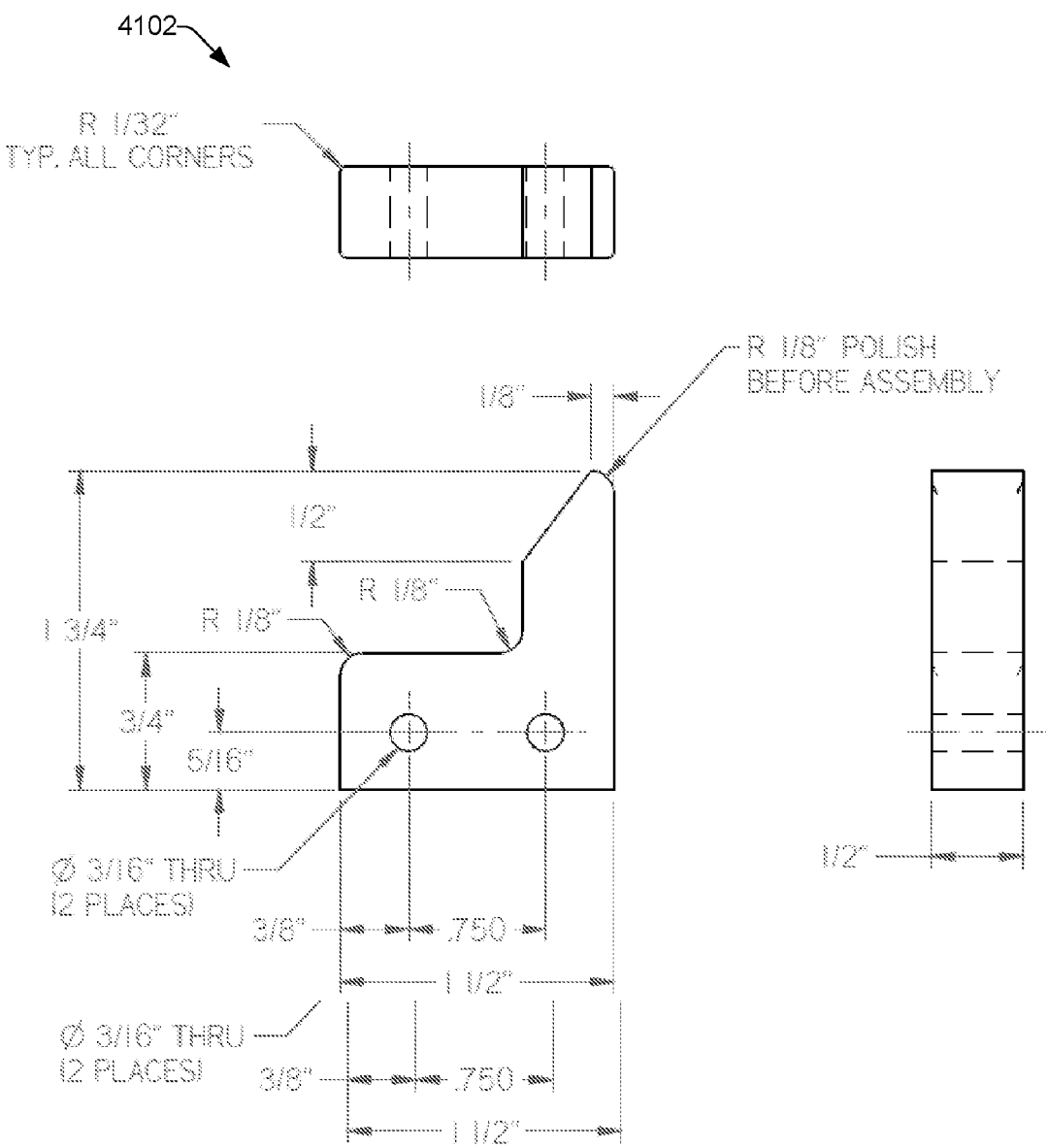

FIG. 41 illustrates example geometries of an example drive cog 4102 for displacing an elongated metal member. The drive cog 4102 can be an example of drive cog 2414 illustrated in FIG. 24. The geometries of the drive cog 4102 may provide for an elongated metal member to roll over or pivot about the drive cog 4102 when nesting a first elongated metal member with a second elongated metal member.

Figure 42:
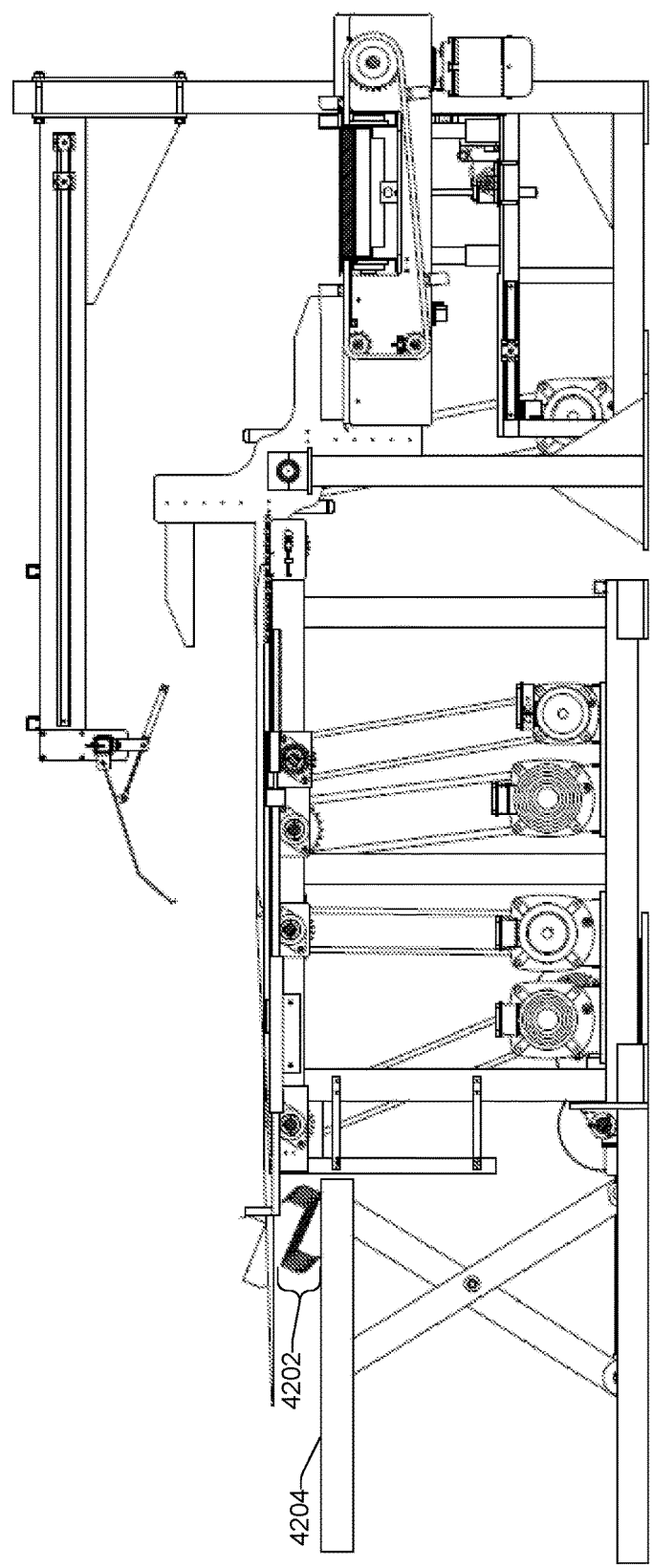
FIGS. 42-44 depict illustrative stacks of elongated metal members.
Figure 43:
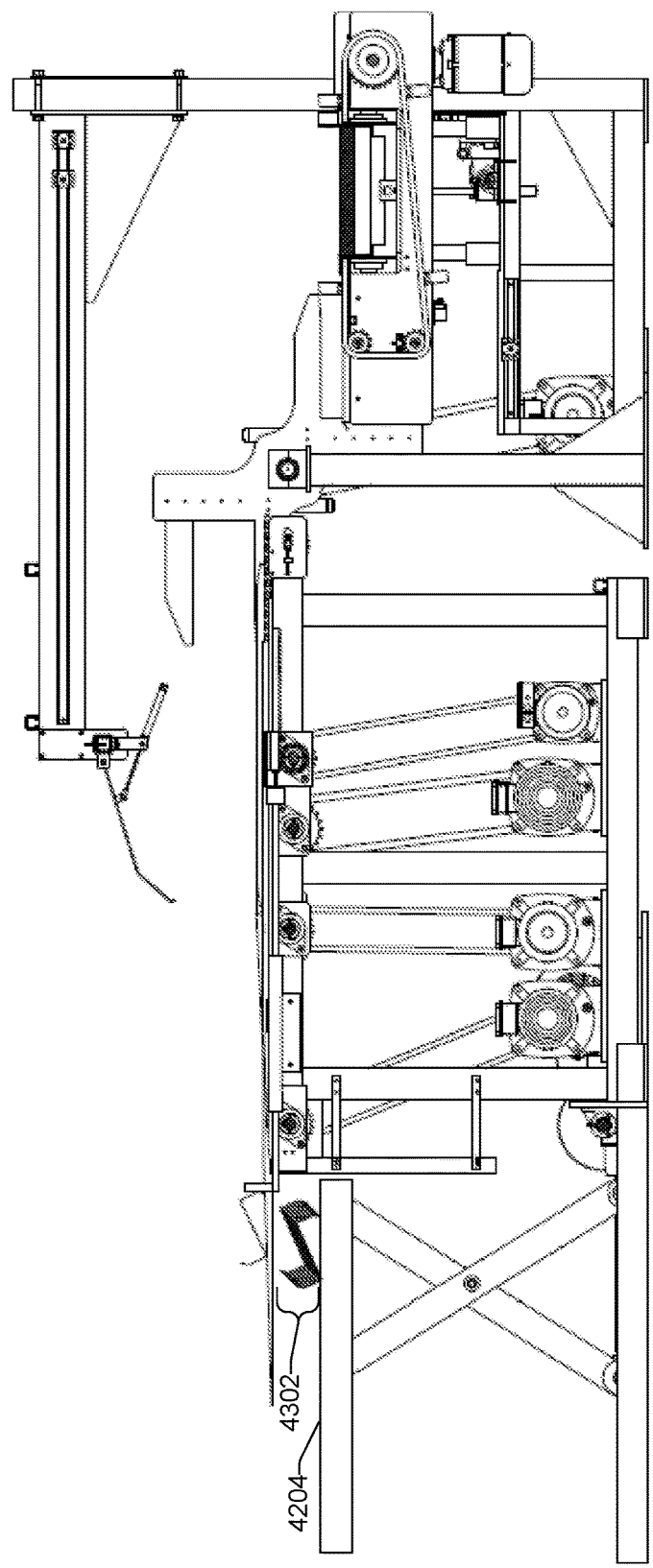
Figure 44:
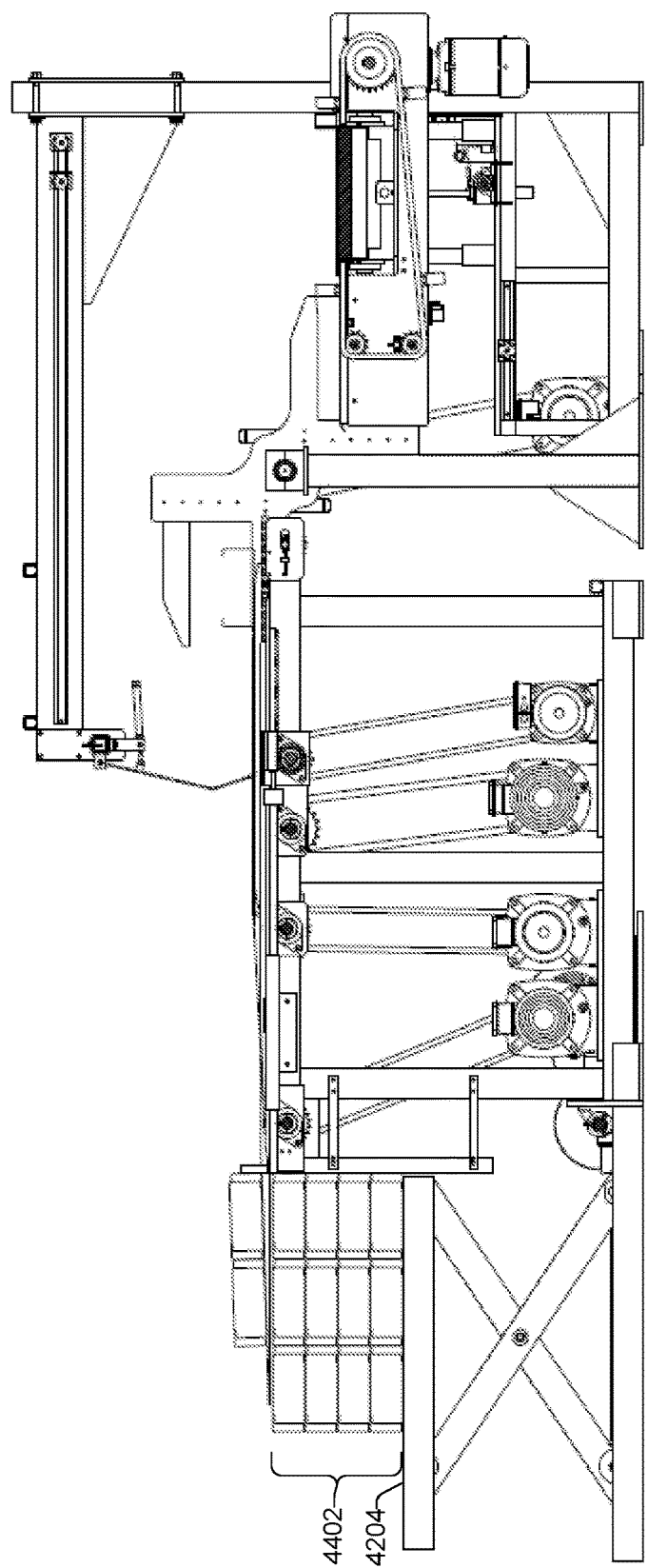

FIGS. 42-44 depict illustrative stacks of elongated metal members. FIG. 42 depicts an illustrative stack 4202 of a plurality of elongated metal members having a zee cross-section (e.g., zee cross-section 102(B)). FIG. 42 depicts a stacker system (e.g., stacker system 302, 1102, 2402, 2602 or 3602) stacking the plurality of elongated metal members in a direction away from the stacker system. The plurality of elongated metal members arranged in the stack 4202 may define a complete stack. While FIG. 42 illustrates the stack 4202 arranged on a lift 4204, the stack 4202 may be arranged on a crate, a pallet, a cart, etc.

FIG. 43 depicts another illustrative stack 4302 of the plurality of elongated metal members having the zee cross-section (e.g., zee cross-section 102(B)). Here, FIG. 43 illustrates a stacker system (e.g., stacker system 302, 1102, 2402, 2602 or 3602) stacking the plurality of elongated metal members in a direction toward the stacker system.

FIG. 44 depicts an illustrative stack 4402 of a plurality of elongated metal members having a cee cross-section (e.g., cee cross-section 102(A)). FIG. 44 depicts a stacker system (e.g., stacker system 302, 1102, 2402, 2602 or 3602) stacking multiple rows and/or columns of the elongated metal members having the cee cross-section. The multiple rows and/or columns of elongated metal members may define one or more bundles.

FIG. 45 illustrates cross-sections 4502(A), 4502(B), and 4502(C) of elongated metal members that a stacking system (e.g., stacker system 302, 1102, 2402, 2602 or 3602) may stack. Cross-section 4502(A) illustrates a cee cross-section without turned lips, 4502(B) illustrates a zee cross-section with 90 degree lips, and 4502(C) illustrates a hat cross-section. Cross-sections 4502(A)-4502(C) may have a width of at least about 2 inches (5 centimeters) to at most about 21 inches (53 centimeters). In one example, cross-sections 4502(A)-4502(C) may have a width of at least about 4 inches (10 centimeters) to at most about 14 inches (35 centimeters). In another example, cross-sections 4502(A)-4502(C) may have a width of at least about 2 inches (5 centimeters) to at most about 5 inches (13 centimeters).

CONCLUSION

Although the invention has been described in language specific to structural features and/or methodological acts, it is to be understood that the invention is not necessarily limited to the specific features or acts described. Rather, the specific features and acts are disclosed as illustrative forms of implementing the invention. For example, while embodiments are described having certain shapes, sizes, and configurations, these shapes, sizes, and configurations are merely illustrative.

What is claimed is:

1. A system comprising:
    a conveyor for receiving a plurality of elongated metal members from a rollformer, the conveyor displacing the plurality of elongated metal members in a first direction;
    a stacking system for receiving the plurality of elongated metal members, the stacking system displacing the plurality of elongated metal members in a second direction substantially perpendicular to the first direction;
    a stripper mechanism including a bar slideably received by a tube having a cam, and the bar coupled to an actuator by at least one of a rack and pinion actuator, a hydraulic cylinder, a pneumatic cylinder, a screw and nut drive, a belt, a chain, or a rope; and
    an inverting arm suspended above the stacking system via a first end of the inverting arm, the inverting arm having a second end opposite the first end,
    wherein when the stacking system displaces a first elongated metal member of the plurality of elongated metal members in the second direction, the stacking system displaces the first elongated metal member into contact with the second end of the inverting arm, the inverting arm catching hold of the first elongated metal member being displaced by the stacking system in the second direction and overturning the first elongated metal member into a second elongated metal member of the plurality of elongated metal members arranged adjacent to the first elongated metal member, and wherein the first elongated metal member overturned into the second elongated metal member define a nested pair of elongated metal members, and wherein the stripper mechanism is configured to selectively hold the nested pair of elogated metal member at a predefined position to remove the nested pair from the stacking system.

2. The system of claim 1, further comprising an inverting elevator, the inverting elevator including a jaw, the jaw to grip a respective one of the plurality of elongated metal members positioned on the conveyor and rotatably displace and elevate the respective one of the plurality of elongated metal members onto the stacking system.

3. The system of claim 1, further comprising an aligning conveyor arranged between the conveyor and the stacking system, the aligning conveyor to justify respective ones of the plurality of elongated metal members received from the conveyor to be slideably displaced onto the stacking system.

4. A system comprising:
a stacking system having a loading zone and an unloading zone, the stacking system displacing respective ones of a plurality of elongated metal members in a direction from the loading zone to the unloading zone;
a stripper mechanism including a bar slideably received by a tube having a cam, and the bar coupled to an actuator by at least one of a rack and pinion actuator, a hydraulic cylinder, a pneumatic cylinder, a screw and nut drive, a belt, a chain, or a rope; and
an inverting arm suspended above the stacking system via a first end of the inverting arm, the inverting arm having a second end opposite a first end,
wherein when the stacking system displaces a first elongated metal member of the plurality of elongated metal members in the direction, the stacking system displaces the first elongated metal member into contact with the portion of the second end of the inverting arm, the inverting arm catching hold of the first elongated metal member being displaced by the stacking system in the direction and overturning the first elongated metal member into a second elongated metal member of the plurality of elongated metal members arranged adjacent to the first elongated metal member, and
wherein the first elongated metal member overturned into the second elongated metal member define a nested pair of elongated metal members, and the stripper mechanism is configured to selectively hold the nested pair of elongated metal members at a predefined position to remove the nested pair from the stacking system.

5. The system of claim 4, wherein the stacking system comprises a nesting conveyor for positioning the second elongated metal member adjacent to the first elongated metal member as the second elongated metal member is displaced in the direction.

6. The system of claim 5, wherein the nesting conveyor comprises a drive cog, the drive cog in contact with a trailing edge of the first elongated metal member to displace the first elongated metal member in the direction, and
the inverting arm for catching hold of a leading edge of the first elongated metal member and pivoting the trailing edge of the first elongated metal member on the drive cog as the inverting arm overturns the first elongated metal member into the second elongated metal member.

7. The system of claim 5, wherein the nesting conveyor comprises a deformable member arranged between the loading zone and the unloading zone, and the drive cog is coupled to the deformable member.

8. The system of claim 7, wherein the deformable member comprises a chain, a belt, a cable, or a rope.

9. The system of claim 4, further comprising a brake mechanism arranged with the inverting arm to hold the inverting arm in a raised position and selectively prevent the inverting arm from being displaced down toward the stacking system.

10. The system of claim 9, wherein the inverting arm comprises a first inverting arm, and further comprising at least a second inverting arm and a second brake mechanism arranged with the second inverting arm to hold the second inverting arm in a raised position and selectively prevent the second inverting arm from being displaced down toward the stacking system.

11. The system of claim 9, wherein the inverting arm comprises a first inverting arm, and further comprising at least a second inverting arm, and wherein the brake mechanism is arranged with the first inverting arm and the second inverting arm to hold the first inverting arm and the second inverting arm in a raised position and selectively prevent the first inverting arm and the second inverting arm from being displaced down toward the stacking system.

12. The system of claim 4, wherein the first elongated metal member overturned into the second elongated metal member define a nested pair of elongated metal members, and further comprising a fork coupled with the stacking conveyor, the fork for slideably displacing the nested pair of elongated metal members.

13. The system of claim 12, wherein the fork is coupled with the stacking system by at least one of a rack and pinion actuator, a hydraulic cylinder, a pneumatic cylinder, a screw and nut drive, a belt, a chain, or a rope.

14. A method of stacking a plurality of elongated metal members, the method comprising:
receiving, by a stacking system, a first elongated metal member of the plurality of elongated metal members;
displacing, by the stacking system, the first elongated metal member in a direction;
catching hold of the first elongated metal member being displaced in the direction by at least a portion of a first end of an inverting arm, the inverting arm suspended above the stacking system via a second end of the inverting arm;
receiving, by the stacking system, a second elongated metal member of the plurality of elongated metal members;
displacing, by the stacking system, the second elongated metal member in the direction;
positioning the second elongated metal member adjacent to the first elongated metal member as the second elongated metal member is displaced, by the stacking system, in the direction,
wherein when the stacking system displaces the first elongated metal member in the direction, the stacking system displaces the first elongated metal member into contact with the portion of the first end of the inverting arm, and the inverting arm overturns the first elongated metal member into the second elongated metal member arranged adjacent to the first elongated metal member, the first elongated metal member overturned into the second elongated metal member define a nested pair of elongated metal members, and wherein the method further comprises selectively holding, via a stripper mechanism, the nested pair of elongated metal members at a predefined position to remove the nested pair from the stacking system the stripper mechanism including a bar slideably received by a tube having a cam, and the bar coupled to an actuator by at least one of a rack and pinion actuator, a hydraulic cylinder, a pneumatic cylinder, a screw and nut drive, a belt, a chain, or a rope.

* * * * *